United States Patent
Lin et al.

(10) Patent No.: US 10,484,890 B2
(45) Date of Patent: Nov. 19, 2019

(54) METHOD AND APPARATUS FOR DETERMINING NUMEROLOGY BANDWIDTH FOR MEASUREMENT IN A WIRELESS COMMUNICATION SYSTEM

(71) Applicant: ASUSTek Computer Inc., Taipei (TW)

(72) Inventors: Ko-Chiang Lin, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 83 days.

(21) Appl. No.: 15/674,492

(22) Filed: Aug. 10, 2017

(65) Prior Publication Data
US 2018/0049047 A1    Feb. 15, 2018

Related U.S. Application Data

(60) Provisional application No. 62/374,392, filed on Aug. 12, 2016.

(51) Int. Cl.
| | | |
|---|---|---|
| *H04W 24/02* | (2009.01) | |
| *H04W 72/04* | (2009.01) | |
| *H04L 5/00* | (2006.01) | |
| *H04L 27/26* | (2006.01) | |

(52) U.S. Cl.
CPC ........... *H04W 24/02* (2013.01); *H04L 5/0007* (2013.01); *H04L 27/2602* (2013.01); *H04W 72/04* (2013.01); *H04L 5/0048* (2013.01)

(58) Field of Classification Search
CPC . H04W 24/02; H04W 72/04; H04W 72/0406; H04W 72/0453; H04W 72/048; H04L 5/0007; H04L 27/2602; H04L 5/0048; H04L 5/0053; H04L 5/0064; H04L 5/0073; H04J 11/005
See application file for complete search history.

(56) References Cited

U.S. PATENT DOCUMENTS

| | | | | |
|---|---|---|---|---|
| 2011/0256861 A1* | 10/2011 | Yoo | ........................ | H04L 5/005 455/423 |
| 2012/0281548 A1* | 11/2012 | Lin | ...................... | H04W 76/18 370/242 |
| 2013/0301454 A1 | 11/2013 | Seol | | |
| 2017/0041948 A1* | 2/2017 | Cheng | ................... | H04L 5/0051 |
| 2017/0331670 A1* | 11/2017 | Parkvall | ............ | H04W 52/0274 |

(Continued)

FOREIGN PATENT DOCUMENTS

| | | |
|---|---|---|
| WO | 2010-135628 | 11/2010 |
| WO | 2010135628 | * 11/2010 |

OTHER PUBLICATIONS

MediaTeck Inc.,"Discussion on Forward Compatible System for NR", 3GPP TSG RAN WG1 Meeting #85, R1-165160, May 14, 2016 <http://www.3gpp.org/ftp/tsg_ran/WG1_RL1/TSGR1_85/Docs/R1-165160.zip>.*

"Mobility Performance Optimization for 3GPP LTE HetNets", Kathriavetpillai Sivanesan et al. pp. 1-10, Mar. 2016, ( Cambridge University Press) <www.cambridge.org>.*

(Continued)

*Primary Examiner* — Afsar M Qureshi
(74) *Attorney, Agent, or Firm* — Blue Capital Law Firm, P.C.

(57) ABSTRACT

Methods and apparatuses for performing a measurement in a wireless communication system are disclosed herein. In one method, a user equipment (UE) is served by a cell supporting multiple numerologies. The UE is configured with a first numerology for data reception. The UE performs a measurement with a second numerology.

16 Claims, 26 Drawing Sheets

(56) References Cited

U.S. PATENT DOCUMENTS

2018/0234153 A1* 8/2018 Lincoln ................ H04B 7/0486
2018/0343153 A1* 11/2018 Zhang ................ H04L 27/2602

OTHER PUBLICATIONS

Huawei, "Forward compatibility consideration on reference signals and control information/channels", 3GPP TSG-RAN WG1, Meeting #85, R1-164046, May 23-27, 2016, pp. 1-3.

Office Action from Japan Patent Office in corresponding JP Appiication No. 2017-155312, dated Nov. 13, 2018.

MediaTeck Inc., "Discussion on Forward Compatible System Design for NR", 3GPP TSG RAN WG1 Meeting #85, R1-165160, May 14, 2016 <http://www.3gpp.org/ftp/tsg_ran/WG1_RL1/TSGR1_85/Docs/R1-165160.zip>.

Notice of Submission of Opinion from Korean Intellectual Property Office in corresponding KR Application No. 10-2017-0102231, dated Nov. 15, 2018.

3GPF TSG RAN WG1 Meeting #85 R1-165160; Discussion on Forward Compatible System Design for NR; May 23-27, 2016.

3GPP TSG RAN WG1 Meeting #85 R1-164561 ;Support different numerology and different usage scenarios; May 23-27, 2016.

Office Action from Taiwan Intellectual Property Office in corresponding TW Application No. 106127179, dated May 21, 2018.

Mediatek Inc:"Discussion on Forward Compatible System Design for NR", 3GPP Draft; R1-165160 Discussion on Forward Compatible System Design for NR, 3rd Generation Partnership (3GPP), Mobile Competence Centre ; 650, Route Des Lucioles ; F-06921 Sophia-Antipolis CE vol. RAN WG1, No. Nanjing, China; 20160523 -20160527 May 14, 2016.

LG Electronics: "Support different numerology and different usage scenarios", 3GPP Draft; R1-164561 NR Vertical V3, 3rd Generation Partnership Project (3GPP), Mobile Competence Centre ; Route Des Lucioles ; F-06921 Sophia-Antipolis Cedex ;France vol. RAN WG1, No. Nanjing, China; 20160523 -20160527 May 14, 2016 (May 14, 2016), XP051096378.

European search report from corresponding EP Application No. 17185705.5, dated Dec. 22, 2017.

* cited by examiner

| Configuration | | $N_{sc}^{RB}$ | $N_{symb}^{DL}$ |
|---|---|---|---|
| Normal cyclic prefix | $\Delta f = 15$ kHz | 12 | 7 |
| Extended cyclic prefix | $\Delta f = 15$ kHz | | 6 |
| | $\Delta f = 7.5$ kHz | 24 | 3 |

FIG. 6 (PRIOR ART)

| Configuration | | Cyclic prefix length $N_{CP,l}$ |
|---|---|---|
| Normal cyclic prefix | $\Delta f = 15$ kHz | 160 for $l = 0$<br>144 for $l = 1,2,...,6$ |
| Extended cyclic prefix | $\Delta f = 15$ kHz | 512 for $l = 0,1,...,5$ |
| | $\Delta f = 7.5$ kHz | 1024 for $l = 0,1,2$ |

FIG. 7 (PRIOR ART)

| Physical channel | Modulation schemes |
|---|---|
| PBCH | QPSK |

| $l$ | Frame offset, slot and symbol number triplets $(i,n'_s,l')$ | |
|---|---|---|
| | Normal cyclic prefix | Extended cyclic prefix |
| 0 | (1,18,3), (1,19,0), (1,19,4), (0,0,4) | (1,18,3), (1,19,0), (1,19,5) |
| 1 | (1,18,4), (1,19,1), (1,19,5), (0,1,4) | (1,18,4), (1,19,1), (0,0,3) |
| 2 | (1,18,5), (1,19,2), (1,19,6), (0,1,5) | (1,18,5), (1,19,2), (0,1,4) |
| 3 | (1,18,6), (1,19,3), (0,0,3), (0,1,6) | (1,19,3), (1,19,4), (0,1,5) |

FIG. 10 (PRIOR ART)

| $l$ | Slot and symbol number pairs $(n'_s,l')$ | |
|---|---|---|
| | Normal cyclic prefix | Extended cyclic prefix |
| 0 | (0,3), (1,4), (10,3), (11,0), (11,4) | (0,3), (10,3), (11,0) |
| 1 | (0,4), (1,5), (10,4), (11,1), (11,5) | (0,4), (10,4), (11,1) |
| 2 | (0,5), (10,5), (11,2) | (0,5), (10,5), (11,2) |
| 3 | (0,6), (10,6), (11,3) | (1,4), (11,3), (11,4) |

FIG. 11 (PRIOR ART)

| Value of codebookConfig | $g(\cdot)$ |
|---|---|
| 1 | {0,4,8,10} |
| 2 | {0,16,32,48} |
| 3 | {0,16,32,48} |
| 4 | {0,16,32,48} |

FIG. 12 (PRIOR ART)

| Spatial differential CQI value | Offset level |
|---|---|
| 0 | 0 |
| 1 | 1 |
| 2 | 2 |
| 3 | ≥3 |
| 4 | ≤-4 |
| 5 | -3 |
| 6 | -2 |
| 7 | -1 |

FIG. 13 (PRIOR ART)

| Value of CSI request field | Description |
|---|---|
| '00' | No aperiodic CSI report is triggered |
| '01' | Aperiodic CSI report is triggered for serving cell $c$ |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

FIG. 14 (PRIOR ART)

| Value of CSI request field | Description |
|---|---|
| '00' | No aperiodic CSI report is triggered |
| '01' | Aperiodic CSI report is triggered for a set of CSI process(es) configured by higher layers for serving cell $c$ |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

FIG. 15 (PRIOR ART)

|  | | PMI Feedback Type | | |
|---|---|---|---|---|
|  | | No PMI | Single PMI | Multiple PMI |
| PUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

FIG. 16 (PRIOR ART)

| Differential CQI value | Offset level |
|---|---|
| 0 | ≤1 |
| 1 | 2 |
| 2 | 3 |
| 3 | ≥4 |

FIG. 17 (PRIOR ART)

| System Bandwidth $N_{RB}^{DL}$ | Subband Size k (RBs) | M |
|---|---|---|
| 6 – 7 | NA | NA |
| 8 – 10 | 2 | 1 |
| 11 – 26 | 2 | 3 |
| 27 – 63 | 3 | 5 |
| 64 – 110 | 4 | 6 |

FIG. 18 (PRIOR ART)

|  | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

FIG. 19 (PRIOR ART)

| $I_{CQI/PMI}$ | Value of $N_{pd}$ | Value of $N_{OFFSET,CQI}$ |
|---|---|---|
| $0 \le I_{CQI/PMI} \le 1$ | 2 | $I_{CQI/PMI}$ |
| $2 \le I_{CQI/PMI} \le 6$ | 5 | $I_{CQI/PMI} - 2$ |
| $7 \le I_{CQI/PMI} \le 16$ | 10 | $I_{CQI/PMI} - 7$ |
| $17 \le I_{CQI/PMI} \le 36$ | 20 | $I_{CQI/PMI} - 17$ |
| $37 \le I_{CQI/PMI} \le 76$ | 40 | $I_{CQI/PMI} - 37$ |
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |
| $I_{CQI/PMI} = 317$ | Reserved | |
| $318 \le I_{CQI/PMI} \le 349$ | 32 | $I_{CQI/PMI} - 318$ |
| $350 \le I_{CQI/PMI} \le 413$ | 64 | $I_{CQI/PMI} - 350$ |
| $414 \le I_{CQI/PMI} \le 541$ | 128 | $I_{CQI/PMI} - 414$ |
| $542 \le I_{CQI/PMI} \le 1023$ | Reserved | |

FIG. 20 (PRIOR ART)

| $I_{RI}$ | Value of $M_{RI}$ | Value of $N_{OFFSET,RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | Reserved | |

FIG. 21 (PRIOR ART)

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | Reserved | |

FIG. 22 (PRIOR ART)

| $I_{CRI}$ | Value of $M_{CRI}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| $7 < I_{CRI} \leq 1023$ | Reserved |

FIG. 23 (PRIOR ART)

| $I_{CRI}$ | Value of $M_{CRI}$ | Value of $N_{OFFSET,CRI}$ |
|---|---|---|
| $0 \leq I_{CRI} \leq 160$ | 1 | $-I_{CRI}$ |
| $161 \leq I_{CRI} \leq 321$ | 2 | $-(I_{CRI} - 161)$ |
| $322 \leq I_{CRI} \leq 482$ | 4 | $-(I_{CRI} - 322)$ |
| $483 \leq I_{CRI} \leq 643$ | 8 | $-(I_{CRI} - 483)$ |
| $644 \leq I_{CRI} \leq 804$ | 16 | $-(I_{CRI} - 644)$ |
| $805 \leq I_{CRI} \leq 965$ | 32 | $-(I_{CRI} - 805)$ |
| $966 \leq I_{CRI} \leq 1023$ | Reserved | |

FIG. 24 (PRIOR ART)

| System Bandwidth $N_{RB}^{DL}$ | Subband Size k (RBs) | Bandwidth Parts (J) |
|---|---|---|
| 6 – 7 | NA | NA |
| 8 – 10 | 4 | 1 |
| 11 – 26 | 4 | 2 |
| 27 – 63 | 6 | 3 |
| 64 – 110 | 8 | 4 |

FIG. 25 (PRIOR ART)

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4+L | NA | 4+L |
| | | RI > 1 | NA | 7+L | NA | 4+L$^1$ / 7+L$^2$ |
| 1a | Sub-band CQI / second PMI | 8 antenna ports or 8/12/16 antenna ports with codebookConfig={2,3,4}, RI = 1 | NA | 8+L | NA | NA |
| | | 8 antenna ports or 8/12/16 antenna ports with codebookConfig={2,3,4}, 1 < RI < 5 | NA | 9+L | NA | NA |
| | | 8 antenna ports or 8/12/16 antenna ports with codebookConfig={1,2,3,4} RI > 4 | NA | 7+L | NA | NA |
| | | 8/12/16 antenna ports with codebookConfig=1, RI = 1 | NA | 6+L | NA | NA |
| | | 8/12/16 antenna ports with codebookConfig=1, RI = 2 | NA | 9+L | NA | NA |
| | | 8/12/16 antenna ports with codebookConfig=1, 2<RI<5 | NA | 8+L | NA | NA |
| | | 4 antenna ports RI=1 | NA | 8+L | NA | NA |
| | | 4 antenna ports 1<RI≤4 | NA | 9+L | NA | NA |
| 2 | Wideband CQI/PMI | 2 antenna ports RI = 1 | 6 | 6 | NA | NA |
| | | 4 antenna ports RI = 1, Note$^5$ | 8 | 8 | NA | NA |
| | | 2 antenna ports RI > 1 | 8 | 8 | NA | NA |
| | | 4 antenna ports RI > 1, Note$^5$ | 11 | 11 | NA | NA |
| | | 4 antenna ports RI = 1, Note$^6$ | 7 | 7 | NA | NA |
| | | 4 antenna ports RI = 2, Note$^6$ | 10 | 10 | NA | NA |
| | | 4 antenna ports RI = 3, Note$^6$ | 9 | 9 | NA | NA |
| | | 4 antenna ports RI = 4, Note$^6$ | 8 | 8 | NA | NA |
| | | 8 antenna ports RI = 1 | 8 | 8 | NA | NA |
| | | 8 antenna ports 1<RI<4 | 11 | 11 | NA | NA |
| | | 8 antenna ports RI = 4 | 10 | 10 | NA | NA |
| | | 8 antenna ports RI > 4 | 7 | 7 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| | | 4 antenna ports 1≤RI≤2 | NA | 4 | NA | NA |
| | | 4 antenna ports 2≤RI≤4 | NA | NA | NA | NA |
| | | 8/12/16 antenna ports with codebookConfig=1, 1≤RI≤8 | Note$^3$ | Note$^3$ | NA | NA |
| | | 8/12/16 antenna ports with codebookConfig={2,3,4} | Note$^4$ | Note$^3$ | NA | NA |
| 2b | Wideband CQI / second PMI | 8 antenna ports or 8/12/16 antenna ports with codebookConfig = {2,3,4}, RI = 1 | 8 | 8 | NA | NA |
| | | 8 antenna ports or 8/12/16 antenna ports with codebookConfig = {2,3,4}, 1 < RI < 4 | 11 | 11 | NA | NA |
| | | 8 antenna ports or 8/12/16 antenna ports with codebookConfig = {2,3,4}, RI = 4 | 10 | 10 | NA | NA |
| | | 8 antenna ports or 8/12/16 antenna ports with codebookConfig = {1,2,3,4}, RI > 4 | 7 | 7 | NA | NA |
| | | 4 antenna ports RI=1 | 8 | 8 | NA | NA |
| | | 4 antenna port 1<RI≤4 | 11 | 11 | NA | NA |
| | | 8/12/16 antenna ports with codebookConfig=1, RI = 1 | 6 | 6 | NA | NA |
| | | 8/12/16 antenna ports with codebookConfig=1, RI = 2 | 9 | 9 | NA | NA |
| | | 8/12/16 antenna ports with codebookConfig=1, 2<RI<5 | 8 | 8 | NA | NA |
| 2c | Wideband CQI / first PMI / second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| | | 4 antenna ports RI=1 | 8 | NA | NA | NA |
| | | 4 antenna port 1<RI≤4 | 11 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA$^1$ / 1$^2$ | NA$^1$ / 1$^2$ |
| | | 4 antenna ports, 4-layer spatial multiplexing | 2 | 2 | 2 | 2 |
| | | 8 antenna ports, 4-layer spatial multiplexing | 2 | NA | NA$^1$ / 2$^2$ | NA$^1$ / 2$^2$ |
| | | 8-layer spatial multiplexing | 3 | NA | NA$^1$ / 3$^2$ | NA$^1$ / 3$^2$ |
| | | 12/16 antenna ports, 2-layer spatial multiplexing | 1 | NA | NA | NA |
| | | 12/16 antenna ports, 4-layer spatial multiplexing | 2 | NA | NA | NA |
| | | 12/16 antenna ports, 8-layer spatial multiplexing | 3 | NA | NA | NA |

FIG. 26 (PRIOR ART)

| | | | | | | |
|---|---|---|---|---|---|---|
| 4 | Wideband CQI | RI = 1 or RI>1, without PMI/RI reporting | NA | NA | 4 | 4 |
| | | RI = 1 without PMI reporting | NA | NA | 4 | 4 |
| | | RI>1 without PMI reporting | NA | NA | 7 | 7 |
| 5 | RI/ first PMI | 8 antenna ports, 2-layer spatial multiplexing | 4 | NA | NA | NA |
| | | 8 antenna ports, 4 and 8-layer spatial multiplexing | 5 | | | |
| | | 4 antenna ports, 2-layer spatial multiplexing | 4 | | | |
| | | 4 antenna ports, 4-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |
| | | 4 antenna ports, 2-layer spatial multiplexing | NA | 2 | NA | NA |
| | | 4 antenna ports, 4-layer spatial multiplexing | NA | 3 | NA | NA |
| 7 | CRI/RI | 2-layer spatial multiplexing | $k$+1 | $k$+1 | $k$+1 | $k$+1 |
| | | 4-layer spatial multiplexing | $k$+2 | $k$+2 | $k$+2 | $k$+2 |
| | | 8-layer spatial multiplexing | $k$+3 | $k$+3 | $k$+3 | $k$+3 |
| 8 | CRI/RI/first PMI | 2-layer spatial multiplexing | $k$+4 | NA | NA | NA |
| | | 4 and 8-layer spatial multiplexing | $k$+5 | NA | NA | NA |
| 9 | CRI/RI/PTI | 2-layer spatial multiplexing | NA | $k$+2 | NA | NA |
| | | 4-layer spatial multiplexing | NA | $k$+3 | NA | NA |
| | | 8-layer spatial multiplexing | NA | $k$+4 | NA | NA |
| 10 | CRI | Without PMI/RI reporting | NA | NA | $k$ | $k$ |

NOTE : For wideband CQI reporting types, the stated payload size applies to the full bandwidth.
NOTE 1: Without PMI/RI reporting
NOTE 2: Without PMI reporting $k = \lceil \log_2(K) \rceil$ where $K$ is the number of configured CSI-RS resources
NOTE 3: Sum of Wideband first PMI i1,1 bit width and Wideband first PMI i1,2 bit width in Table 5.2.3.3.2-3B-1 of [4] with PTI=0
NOTE 4: Sum of Wideband first PMI i1,1 bit width and Wideband first PMI i1,2 bit width in Table 5.2.3.3.2-3B-2 of [4] with PTI=0
NOTE 5: Not configured with parameter *eMIMO-Type* by higher-layers
NOTE 6: Configured with parameter *eMIMO-Type* by higher-layers

FIG. 26 CONT'D. (PRIOR ART)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |
| 9 | For a non-BL/CE UE, if the UE is configured without PMI/RI reporting: if the number of PBCH antenna ports is one, single-antenna port, port 0; otherwise transmit diversity<br><br>For a non-BL/CE UE, if the UE is configured with PMI/RI reporting or without PMI reporting: if the number of CSI-RS ports is one, single-antenna port, port 7; otherwise up to 8 layer transmission, ports 7-14 (see subclause 7.1.5B)<br><br>For a BL/CE UE: if the number of PBCH antenna ports is one, single-antenna port, port 0; otherwise transmit diversity |
| 10 | If a CSI process of the UE is configured without PMI/RI reporting: if the number of CSI-RS ports is one, single-antenna port, port7; otherwise transmit diversity<br><br>If a CSI process of the UE is configured with PMI/RI reporting or without PMI reporting: if the number of CSI-RS ports is one, single-antenna port, port 7; otherwise up to 8 layer transmission, ports 7-14 (see subclause 7.1.5B) |

FIG. 27 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 28 (PRIOR ART)

| Attribute | Value |
|---|---|
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |
| Ratio of PCFICH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |
| Note 1: DCI format 1A is defined in clause 5.3.3.1.3 in TS 36.212 [21].<br>Note 2: A hypothetical PCFICH transmission corresponding to the number of control symbols shall be assumed. | |

FIG. 29 (PRIOR ART)

| Attribute | Value |
|---|---|
| DCI format | 1C |
| Number of control OFDM symbols | 2; Bandwidth ≥ 10 MHz<br><br>3; 3 MHz ≤ Bandwidth ≤ 10 MHz<br><br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell or PSCell.<br><br>-3 dB; when two or four antenna ports are used for cell-specific reference signal transmission by the PCell or PSCell. |
| Ratio of PCFICH RE energy to average RS RE energy | 4 dB; when single antenna port is used for cell-specific reference signal transmission by the PCell or PSCell.<br><br>1 dB; when two or four antenna ports are used for cell-specific reference signal transmission by the PCell or PSCell. |
| Note 1: | DCI format 1C is defined in clause 5.3.3.1.4 in TS 36.212 [21]. |
| Note 2: | A hypothetical PCFICH transmission corresponding to the number of control symbols shall be assumed. |

FIG. 30 (PRIOR ART)

| Gap Pattern Id | MeasurementGap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 31 (PRIOR ART)

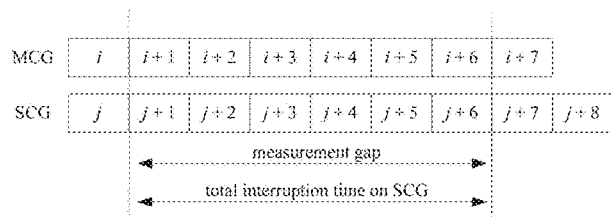

(a) measurement GAP for synchronous dual connectivity

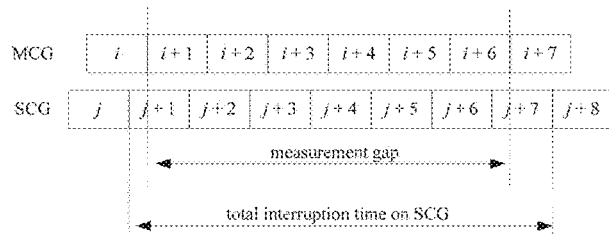

(b) measurement GAP for asynchronous dual connectivity

METHOD AND APPARATUS FOR DETERMINING NUMEROLOGY BANDWIDTH FOR MEASUREMENT IN A WIRELESS COMMUNICATION SYSTEM

CROSS-REFERENCE TO RELATED APPLICATIONS

The present Application claims the benefit of U.S. Provisional Patent Application Ser. No. 62/374,392 filed on Aug. 12, 2016, the entire disclosure of which is incorporated herein in its entirety by reference.

FIELD

This disclosure generally relates to wireless communication networks, and more particularly, to a method and apparatus for determining numerology bandwidth in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for performing a measurement in a wireless communication system are disclosed herein. In one method, a user equipment is served by a cell supporting multiple numerologies. The UE is configured with a first numerology for data reception. The UE performs a measurement with a second numerology.

BRIEF DESCRIPTION OF THE DRAWINGS

FIG. 6 is a reproduction of Table 6.2.3-1 from 3GPP TR 36.211 V13.1.0 providing physical resource block parameters.

FIG. 7 is a reproduction of Table 6.12-1 from 3GPP TR 36.211 V13.1.0 providing Orthogonal Frequency Division Multiplexing (OFDM) parameters.

FIG. 10 is a reproduction of Table 6.6.4-1 from 3GPP TR 36.211 V13.1.0 providing frame offset, slot and symbol number triplets for repetition of PBCH for frame structure type 1.

FIG. 11 is a reproduction of Table 6.6.4-2 from 3GPP TR 36.211 V13.1.0 providing slot and symbol number pairs for repetition of PBCH for frame structure type 2.

FIG. 12 is a reproduction of Table 7.2-1 from 3GPP TR 36.211 V13.1.0 providing for a CSI process with eMIMO-Type set to 'Class A'.

FIG. 13 is a reproduction of Table 7.2-2 from 3GPP TR 36.211 V13.1.0 providing mapping spatial differential CQI value to offset level.

FIG. 14 is a reproduction of Table 7.2.1-1A from 3GPP TR 36.211 V13.1.0 providing a CSI Request field for PDCCH/EPDCCH with uplink DCI format in UE specific search space.

FIG. 15 is a reproduction of Table 7.2.1-1B from 3GPP TR 36.211 V13.1.0 providing a CSI Request field for PDCCH/EPDCCH with uplink DCI format in UE specific search space.

FIG. 16 is a reproduction of Table 7.2.1-1 from 3GPP TR 36.211 V13.1.0 providing a CQI and PMI Feedback Types for PUSCH CSI reporting modes.

FIG. 17 is a reproduction of Table 7.2.1-4 from 3GPP TR 36.211 V13.1.0 providing mapping differential CQI value to offset level.

FIG. 18 is a reproduction of Table 7.2.1-5 from 3GPP TR 36.211 V13.1.0 providing Sub-band size (k) and number of sub-bands (M) in S. vs. Downlink System Bandwidth.

FIG. 19 is a reproduction of Table 7.2.2-1 from 3GPP TR 36.211 V1.3.1.0 providing CQI and PMI Feedback for PUCCH CSI reporting modes.

FIG. 20 is a reproduction of Table 7.2.2-1A from 3GPP TR 36.211 V13.1.0 providing mapping of $I_{CQI/PMI}$ to $N_{pd}$ and $N_{OFFSET,CQI}$ for FDD or for FDD-TDD and primary cell frame structure type 1.

FIG. 21 is a reproduction of Table 7.2.2-1B from 3GPP TR 36.211 V13.1.0 providing mapping of $I_{RI}$ to $M_{RI}$ and $N_{OFFSET,RI}$.

FIG. 22 is a reproduction of Table 7.2.2-1C from 3GPP TR 36.211 V13.1.0 providing mapping of $I_{CQI/PMI}$ to $N_{pd}$ and $N_{OFFSET,CQI}$ for TDD or for FDD-TDD and primary cell frame structure type 2.

FIG. 23 is a reproduction of Table 7.2.2-1D from 3GPP TR 36.21.1 V13.1.0 providing mapping of $I_{CRI}$ to $M_{CRI}$ when RI reporting is configured.

FIG. 24 is a reproduction of Table 7.2.2-1E from 3GPP TR 36.211 V13.1.0 providing mapping of $I_{CRI}$ to $M_{CRI}$ and $N_{OFFSET,CRI}$ when the number of antenna ports in each configured CSI-RS resource is one.

FIG. 25 is a reproduction of Table 7.2.2-2 from 3GPP TR 36.211 V13.1.0 providing sub-band Size (k) and Bandwidth Parts (J) vs. Downlink System Bandwidth.

FIG. 26 is a reproduction of Table 7.2.2-3 from 3GPP TR 36.211 V13.1.0 providing PUCCH Reporting Type Payload size per PUCCH Reporting Mode and Mode State.

FIG. 27 is a reproduction of Table 7.2.3-0 from 3GPP TR 36.211 V13.1.0 providing a PDSCH transmission scheme assumed for CSI reference resource.

FIG. 28 is a reproduction of Table 7.2.3-1 from 3GPP TR 36.211 V13.1.0 providing a 4-bit CQI Table.

FIG. 29 is a reproduction of Table 7.6.1-1 from 3GPP TS 36.133 V13.4.0 providing PDCCH/PCFICH transmission parameters for out-of-sync.

FIG. 30 is a reproduction of Table 7.6.1-2 from 3GPP TS 36.133 V13.4.0 providing PDCCH/PCFICH transmission parameters for in-sync.

FIG. 31 is a reproduction of Table 8.1.2.1-1 from 3GPP TS 36.133 V13.4.0 providing gap pattern configurations supported by the UE.

FIG. 32 is a reproduction of Figure 8.1.2.1-1 from 3GPP TS 36.133 V13.4.0 providing measurement GAP and total interruption time on MCG and SCG.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE"; TR 36.211 V13.1.0, "E-UTRA Study on latency reduction techniques for LTE (Release 13)"; TS 36.331, V13.2.0, "Evolved Universal Terrestrial Radio Access (E-UTRA); Radio Resource Control (RRC); Protocol specification (Release 13)"; TS 36.212 v13.1.0, "Evolved Universal Terrestrial Radio Access (E-UTRA); Multiplexing and channel coding (Release 13)"; TS 36.213 v13.1.1, "E-UTRA Physical layer procedures (Release 13)"; TS 36.133 v13.4.0, "Evolved Universal Terrestrial Radio Access (E-UTRA); Requirements for support of radio resource management"; TS 36.331 v13.2.0, "E-UTRA Radio Resource Control (RRC); Protocol specification"; and TS 36.321 V13.1.0, "E-UTRA Medium Access Control (MAC) protocol specification". The standards and documents listed above are hereby expressly incorporated by reference in their entirety.

Figure 1:
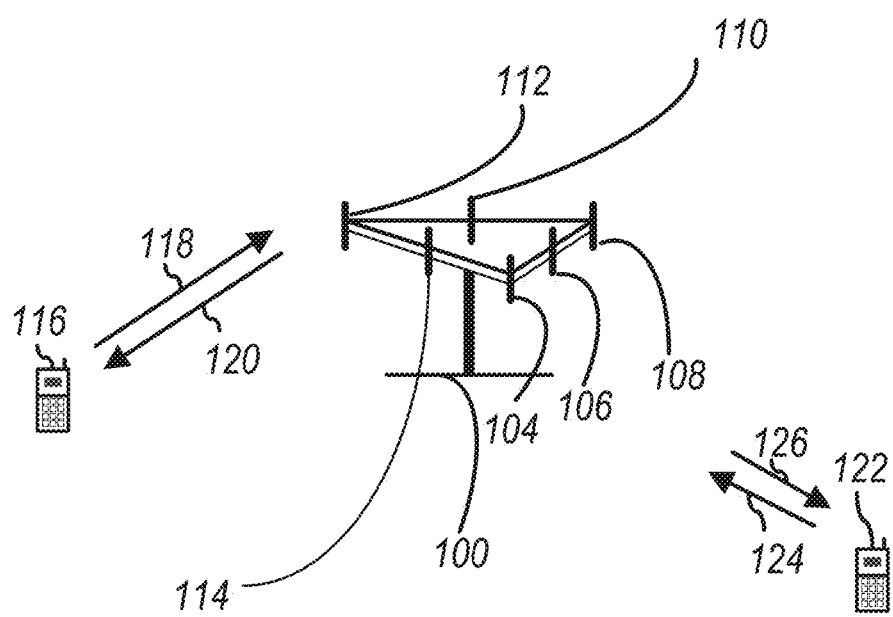
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may he a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
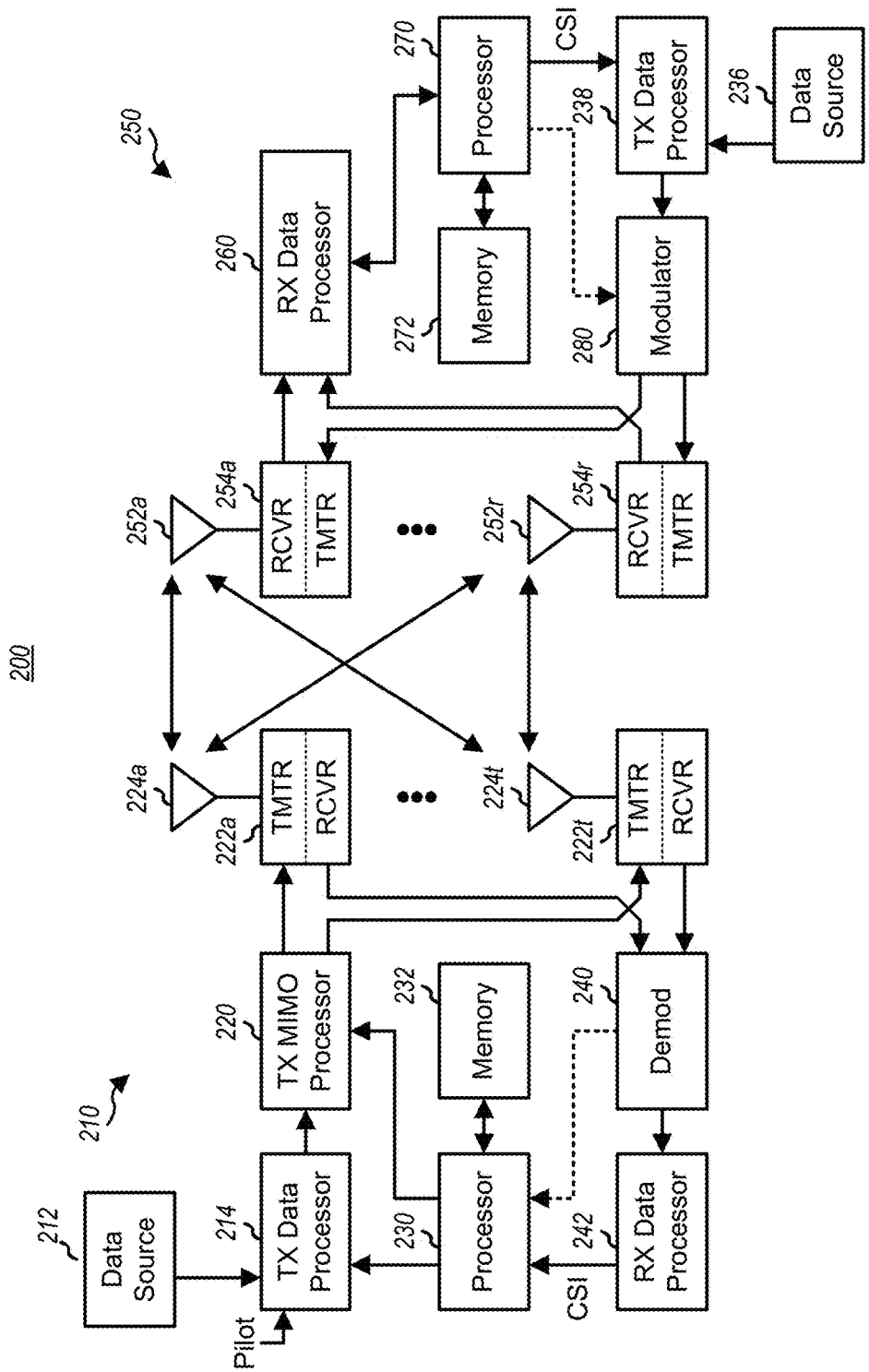
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may he determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
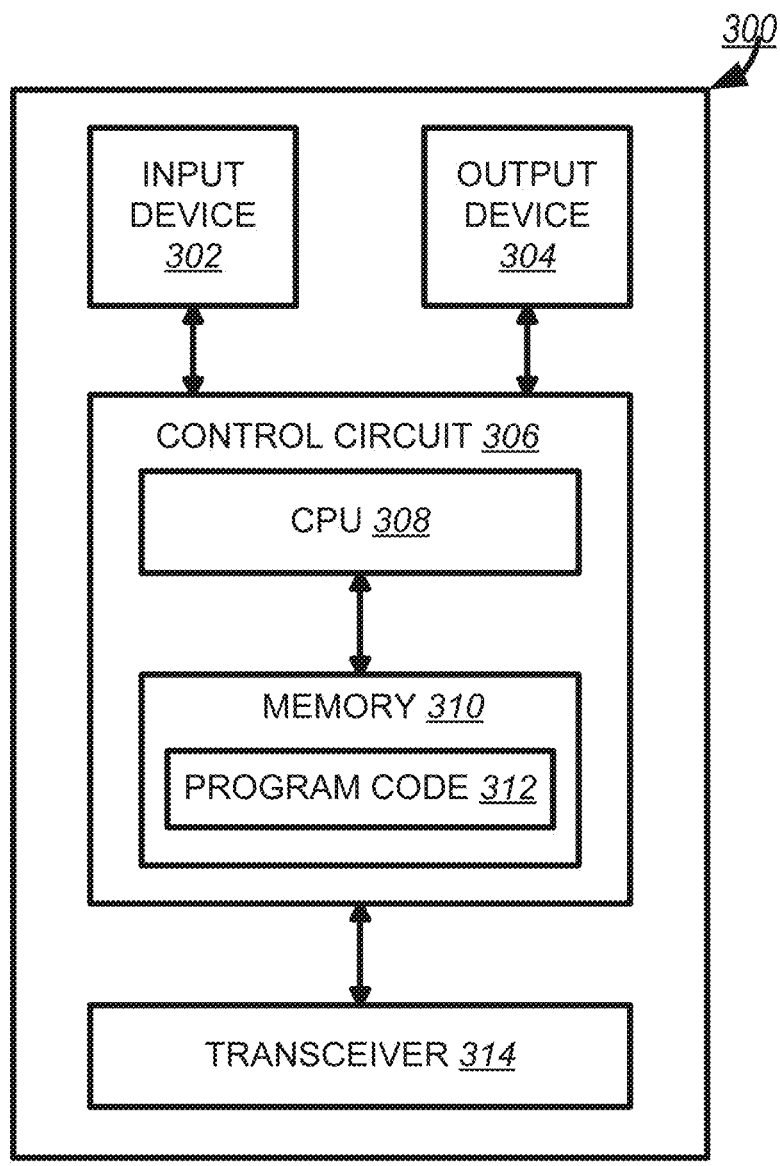
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also he utilized for realizing the AN 100 in FIG. 1.

Figure 4:
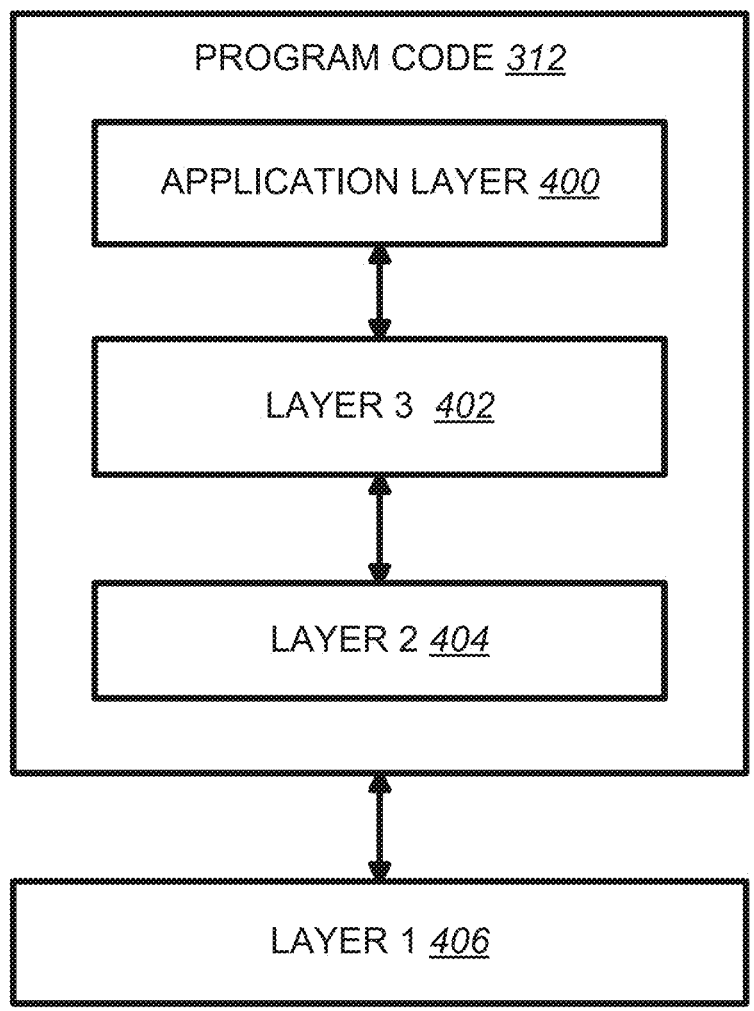
FIG. 4 is a functional block diagram of the program code of FIG. 3 according to one exemplary embodiment.
Figure 5:
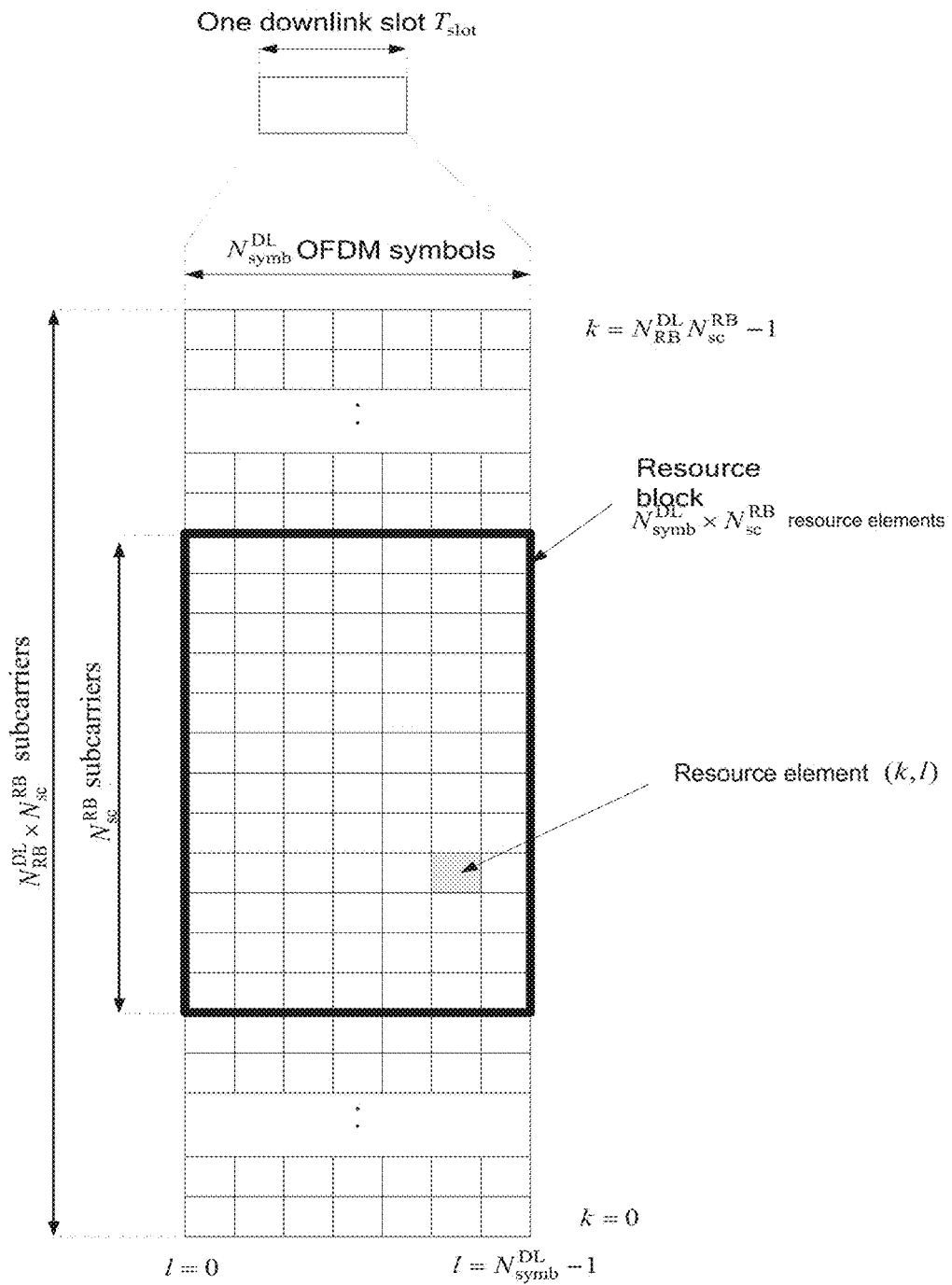
FIG. 5 is a reproduction of FIG. 6.2.2-1 from 3GPP TR 36.211 V13.1.0 illustrating a downlink resource grid.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item aims to investigate and standardize some techniques of latency reduction.

According to 3GPP RP-150465, the objective is to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both Frequency Division Duplex (FDD) and Time Division Duplex (TDD) modes are considered.

According to 3GPP RP-150465, the two areas studied and documented are as follows:
  Fast uplink access solutions
    For active UEs and UEs that have been inactive a long time, but are kept in Radio Resource Control (RRC) Connected, the focus should be on reducing user plane latency for the scheduled Uplink (UL) transmission and getting a more resource efficient solution with protocol and signaling enhancements, compared to the pre-scheduling solutions allowed by the standard today, both with and without preserving the current Transmission Time Interval (TTI) length and processing times
  TTI shortening and reduced processing times
Assess specification impact and study feasibility and performance of TTI lengths between 0.5 ms and one Orthogonal Frequency Division Multiplexing (OFDM) symbol, taking into account impact on reference signals and physical layer control signaling TTI shortening and processing time reduction can be considered as an effective solution for reducing latency as the time unit for transmission can be reduced, for example, from 1 ms (14 OFDM) symbol to 1~7 OFDM symbols and the delay caused by decoding can be reduced as well. Another benefit of shortening TTI length is to support a finer granularity of transport block (TB) size so that unnecessary padding can be reduced. On the other hand, reducing the length of TTI may also have significant impact to current system design as the physical channels are developed based on a 1 ms structure. A shortened TTI is also called an sTTI.

3GPP RP-150465 discloses a frame structure used in New RAT (NR) for 5G that accommodates various types of requirements for time and frequency resource such as, for example, ultra-low latency (~0.5 ms) to delay-tolerant traffic for machine-type communication (MTC), high peak rate for enhanced mobile broadband (eMBB) to very low data rate for MTC. An important focus of this study is low latency aspect, e.g. short TTI, while another aspect of mixing/ adapting different TTIs is also considered in the study. In addition to diverse services and requirements, forward compatibility is an important consideration in initial NR frame structure design as not all features of NR would be included in the beginning phase/release.

Reducing latency of a protocol is an important improvement between the different generations/releases. This can improve efficiency and meet new application requirements such as real-time service. One method adopted to reduce latency is to reduce the length of TTIs, from 10 ms in 3G to 1 ms in LTE. In the context of LTE-A Pro in REl-14, SI/WI was proposed to reduce the TTI to sub-ms level (e.g., 0.1~0.5 ms) by reducing the number of OFDM symbols within a TTI without changing any existing LTE numerology (i.e., there is only one numerology in LTE). This improvement can be used to solve the TCP slow start issue, extremely low but frequent traffic, or to meet foreseen ultra-low latency in NR to some extent. Processing time reduction is another consideration to reduce the latency. The study has not yet concluded that whether short TTI and short processing time always come together. The study suffers from some limitation, as the method adopted should preserve backward compatibility, e.g. the existence of legacy control region. As disclosed in 3GPP TR 36.211 V13.1.0, a brief description of LTE numerology is quoted as follows:

6 Downlink 6.1 Overview

The smallest time-frequency unit for dow c transmission is denoted a resource element and is defined in clause 6.2.2.

A subset of the downlink subframes in a radio frame on a carrier supporting PDSCH transmission can be configured as MBSFN subframes by higher layers. Each MBSFN subframe is divided into a non-MBSFN region and an MBSFN region.

- The non-MBSFN region spans the first one or two OFDM symbols in an MBSFN subframe where the length of the non-MBSFN region is given according to Subclause 6.7.
- The MBSFN region in an MBSFN subframe is defined as the OFDM symbols not used for the non-MBSFN region.

For frame structure type 3, MBSFN configuration shall not be applied to downlink subframes in which at least one OFDM symbol is not occupied or discovery signal is transmitted.

Unless otherwise specified, transmission in each downlink subframe shall use the same cyclic prefix length as used for downlink subframe #0.

6.1.1 Physical Channels

A downlink physical channel corresponds to a set of resource elements carrying information originating from higher layers and is the interface defined between 3GPP TS 36.212 and the present document 3GPP TS 36.211.

The following downlink physical channels are defined:
Physical Downlink Shared Channel, PDSCH
Physical Broadcast Channel, PBCH
Physical Multicast Channel, PMCH
Physical Control Format Indicator Channel, PCFICH
Physical Downlink Control Channel, PDCCH
Physical Hybrid ARQ Indicator Channel, PHICH
Enhanced Physical Downlink Control Channel, EPDCCH
MTC Physical Downlink Control Channel, MPDCCH 6.1.2 Physical Signals A downlink physical signal corresponds to a set of resource elements used by the physical layer but does not carry information originating from higher layers. The following downlink physical signals are defined:

Reference signal
Synchronization signal
Discovery signal 6.2 Slot Structure and Physical Resource Elements 6.2.1 Resource Grid The transmitted signal in each slot is described by one or several resource grids of $N_{RB}^{DL} N_{sc}^{RB}$ subcarriers and $N_{symb}^{DL}$ OFDM symbols. The resource grid structure is illustrated in Figure 6.2.2-1.

The quantity $N_{RB}^{DL}$ depends on the downlink transmission bandwidth configured in the cell and shall fulfill $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of this specification.

The set of allowed values for $N_{RB}^{DL}$ is given by 3GPP TS 36.104. The number of OFDM symbols in a slot depends on the cyclic prefix length and subcarrier spacing configured and is given in FIG. 6 (a reproduction of Table 6.2.3-1 from 3GPP TR 36.211 V1.3.1.0).

An antenna port is defined such that the channel over which a symbol on the antenna port is conveyed can be inferred from the channel over which another symbol on the same antenna port is conveyed. For MBSFN reference signals, positioning reference signals, UE-specific reference signals associated with PDSCH and demodulation reference signals associated with EPDCCH, there are limits given below within which the channel can be inferred from one symbol to another symbol on the same antenna port. There is one resource grid per antenna port. The set of antenna ports supported depends on the reference signal configuration in the cell:

- Cell-specific reference signals support a configuration of one, two, or four antenna ports and are transmitted on antenna ports p=0, p ∈{0, 1}, and p ∈{0, 1, 2, 3}, and respectively.
- MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.
- UE-specific reference signals associated with PDSCH are transmitted on antenna port(s) p=5, p=7, p=8, or one or several of p∈{7, 8, 9, 10, 11, 12, 13, 14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.
- Demodulation reference signals associated with EPDCCH are transmitted on one or several of p∈{107, 108, 109, 110}. The channel over which a symbol on one of these antenna ports is conveyed can be inferred from the channel over which another symbol on the same antenna port is conveyed only if the two symbols are in the same PRB pair.
- Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15, 16, p=15, . . . , 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

6.2.2 Resource Elements

Each element in the resource grid for antenna port p is called a resource element and is uniquely identified by the index pair (k, l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k, l) on antenna port p corresponds to the complex value $a_{k,l}^{(p)}$.

When there is no risk for confusion, or no particular antenna port is specified, the index p may be dropped.

6.2.3 Resource Blocks

Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by FIG. 6 (a reproduction of Table 6.2.3-1 from 3GPP TR 36.211 V13.1.0). A physical resource block thus consists of $N_{symb}^{DL} \times N_{sc}^{RB}$ resource elements, corresponding to one slot in the time domain and 180 kHz in the frequency domain.

Physical resource blocks are numbered from 0 to $N_{RB}^{DL}-1$ in the frequency domain. The relation between the physical resource block number $n_{PRB}$ in the frequency domain and resource elements (k, l) in a slot is given by $$n_{PRB} = \left\lfloor \frac{k}{N_{sc}^{RB}} \right\rfloor$$

A physical resource-block pair is defined as the two physical resource blocks in one subframe having the same physical resource-block number $n_{PRB}$.

A virtual resource block is of the same size as a physical resource block. Two types of virtual resource blocks are defined:

Virtual resource blocks of localized type

Virtual resource blocks of distributed type

For each type of virtual resource blocks, a pair of virtual resource blocks over two slots in a subframe is assigned together by a single virtual resource block number, $n_{VRB}$.

< . . . >

6.12 OFDM Baseband Signal Generation

The time-continuous signal $s_l^{(p)}(t)$ on antenna port p in OFDM symbol l in a downlink slot is defined by $$s_l^{(p)}(t) = \sum_{k=-\lfloor N_{RB}^{DL}N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lceil N_{RB}^{DL}N_{sc}^{RB}/2 \rceil} a_{k^{(+)},l}^{(p)} \cdot e^{j2\pi k \Delta f(t-N_{CP,l}T_s)}$$

for $0 \le t < (N_{CP,l}+N) \times T_s$ where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor -1$. The variable N equals 2048 for $\Delta f=15$ kHz subcarrier spacing and 4096 for $\Delta f=7.5$ kHz subcarrier spacing.

The OFDM symbols in a slot shall be transmitted in increasing order of l, starting with l=0, where OFDM symbol l>0 starts at time $\Sigma_{l'=0}^{l-1}(N_{CP,l'}+N)T_s$ within the slot. In case the first OFDM symbol(s) in a slot use normal cyclic prefix and the remaining OFDM symbols use extended cyclic prefix, the starting position the OFDM symbols with extended cyclic prefix shall be identical to those in a slot where all OFDM symbols use extended cyclic prefix. Thus there will be a part of the time slot between the two cyclic prefix regions where the transmitted signal is not specified.

FIG. 7 (a reproduction of Table 6.12-1 from 3GPP TR 36.211 V13.1.0) lists the value of $N_{CP,l}$ that shall be used. Note that different OFDM symbols within a slot in some cases have different cyclic prefix lengths.

6.13 Modulation and Upconversion

Modulation and upconversion to the carrier frequency of the complex-valued OFDM baseband signal for each antenna port is shown in Figure 6.13-1. The filtering required prior to transmission is defined by the requirements in 3GPP TS 36.104 [6].

In LTE, there is only one downlink (DL) numerology defined for initial access, which is 15 KHz subcarrier spacing and the signal and channel to be acquired during initial access is based on 15 KHz numerology. To access a cell, the UE may need to acquire some fundamental information. For example, the UE first acquires time/frequency synchronization of cell, which is done during cell search or cell selection/reselection. The time/frequency synchronization can be obtained by receiving a synchronization signal, such as a primary synchronization signal (PSS) or a secondary synchronization signal (SSS). During synchronization, the center frequency of a cell is known, and the subframe/frame boundary is obtained. When PSS or SSS are acquired, the Cyclic prefix (CP) of the cell (e.g., normal CP or extended CP) and the duplex mode of the cell (e.g. FDD or TDD) can be obtained. When the master information block (MIB) carried on physical broadcast channel (PBCH) is received, some fundamental system information such as the system frame number (SFN), system bandwidth, physical control channel related information can be obtained. UE would receive the DL control channel (e.g. PDCCH) on proper resource elements and with proper payload size according to the system bandwidth and can acquire some more system information required to access the cell in system information block (SIB), such as whether the cell can be access, UL bandwidth and frequency, random access parameter, and so on. UE then can perform random access and request the connection to the cell. After the connection set up is complete, UE would enter connected mode and be able to perform data transmission to the cell or perform data reception from the cell. The resource allocation for data reception and transmission is done according to system bandwidth (e.g. $N_{RB}^{DL}$ or $N_{RB}^{UL}$ in the following quotation) signaled in MIB or SIB. The following are quotations from 3GPP TR 36.211 V13.1.0, 3GPP TS 36.331, V13.2.0, 3GPP TS 36.212 v13.1.0, and 3GPP TS 36.213 v13.1.1 as follows:

Physical Broadcast Channel

The PBCH is not transmitted for frame structure type 3.

6.6.1 Scrambling

The block of bits b(0), . . . , b($M_{bit}-1$), where $M_{bit}$, the number of bits transmitted on the physical broadcast channel, equals 1920 for normal cyclic prefix and 1728 for extended cyclic prefix, shall be scrambled with a cell-specific sequence prior to modulation, resulting in a block of scrambled bits $\tilde{b}(0), \ldots, \tilde{b}(M_{bit}-1)$ according to $$\tilde{b}(i)=(b(i)+c(i))\bmod 2$$

where the scrambling sequence c(i) is given by clause 7.2. The scrambling sequence shall be initialised with $c_{init}=N_{ID}^{cell}$ in each radio frame fulfilling $n_f \bmod 4=0$.

6.6.2 Modulation

Figures 8, 9:
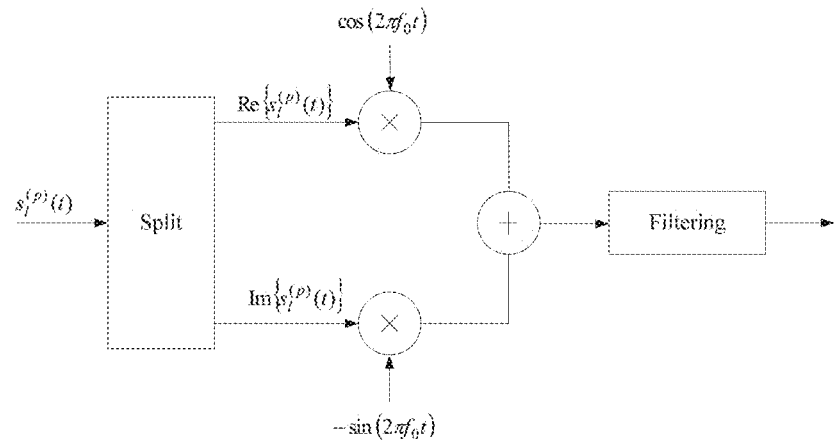
FIG. 8 is a reproduction of FIG. 6.13-1 from 3GPP TR 36.211 V13.1.0 illustrating downlink modulation.
FIG. 9 is a reproduction of Table 6.6.2-1 from 3GPP TR 36.211 V13.1.0 providing PBCH modulation schemes.

The block of scrambled bits $\tilde{b}(0), \ldots, \tilde{b}(M_{bit}-1)$ shall be modulated as described in clause 7.1, resulting in a block of complex-valued modulation symbols $d(0), \ldots, d(M_{symb}-1)$. FIG. 9 (a reproduction of Table 6.6.2-1 from 3GPP TR 36.211 V13.1.0) specifies the modulation mappings applicable for the physical broadcast channel.

6.6.3 Layer Mapping and Precoding

The block of modulation symbols $d(0), \ldots, d(M_{symb}-1)$ shall be mapped to layers according to one of clauses 6.3.3.1 or 6.3.3.3 with $M_{symb}^{(0)}=M_{symb}$ and precoded according to one of clauses 6.3.4.1 or 6.3.4.3, resulting in a block of vectors $y(i)=[y^{(0)}(i) \ldots y^{(P-1)}(i)]^T$, $i=0, \ldots, M_{symb}-1$, where $y^{(p)}(i)$ represents the signal for antenna port p and where $p=0, \ldots, P-1$ and the number of antenna ports for cell-specific reference signals $P \in \{1, 2, 4\}$.

6.6.4 Mapping to Resource Elements

The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$ and shall be mapped in sequence starting with y(0) to resource elements (k, l) constituting the core set of PBCH resource elements. The mapping to resource elements (k, l) not reserved for transmission of reference signals shall be in increasing order of first the index k, then the index l in slot 1 in subframe 0 and finally the radio frame number. The resource-element indices are given by $$k = \frac{N_{RB}^{DL} N_{sc}^{RB}}{2} - 36 + k', \quad k' = 0, 1, \ldots, 71$$

$$l = 0, 1, \ldots, 3$$

where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH transmission. The UE shall not make any other assumptions about these resource elements.

If a cell is configured with repetition of the physical broadcast channel symbols mapped to core resource element (k, l) in slot 1 in subframe 0 within a radio frame $n_f$ according to the mapping operation above, and cell-specific reference signals in OFDM symbols l in slot 1 in subframe 0 within a radio frame $n_f$ with l according to the mapping operation above shall additionally be mapped to resource elements (k, l') in slot number $n'_s$ within radio frame $n_f$-i unless resource element (k, l') is used by CSI reference signals.

For frame structure type 1, l', $n'_s$, and i are given by FIG. 10 (a reproduction of Table 6.6.4-1 from 3GPP TR 36.211 V13.1.0).

For frame structure type 2, if $N_{RB}^{DL}>15$, l' and $n'_s$ are given by FIG. 11 (a reproduction of Table 6.6.4-2 from 3GPP TR 36.211 V13.1.0) and i=0;

if $7 \leq N_{RB}^{DL} \leq 15$, l' and $n'_s$ are given by FIG. 11 (a reproduction of Table 6.6.4-2 from 3GPP TR 36.211 V13.1.0) and i=0, except that repetitions with $n'_s=10$ and $n'_s=11$ are not applied.

For both frame structure type 1 and frame structure type 2, repetition of the physical broadcast channel is not applicable if $N_{RB}^{DL}=6$.

Resource elements already used for transmission of cell-specific reference signals in absence of repetition shall not be used for additional mapping of cell-specific reference signals.

< . . . >

MasterInformationBlock

The MasterInformationBlock includes the system information transmitted on BCH.

Signalling radio bearer: N/A

RLC-SAP: TM

Logical channel: BCCH

Direction: E-UTRAN to UE

| MasterInformationBlock |
|---|
| -- ASN1START |
| MasterInformationBlock ::=   SEQUENCE { |
|    dl-Bandwidth   ENUMERATED { |
|      n6, n15, n25, n50, n75, n100}, |
|    phich-Config   PHICH-Config, |
|    systemFrameNumber   BIT STRING (SIZE (8)), |
|    schedulingInfoSIB1-BR-r13   INTEGER (0..31), |
|    spare   BIT STRING (SIZE (5)) |
| } |
| -- ASN1STOP |

| MasterInformationBlock field descriptions |
|---|
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| phich-Config |
| Specifies the PHICH configuration. If the UE is a BL UE or UE in CE, it shall ignore this field. |
| schedulingInfoSIB1-BR |
| This field contains an index to a table that defines SystemInformationBlockType1-BR scheduling information. The table is specified in TS 36.213 [23, Table 7.1.6-1 and Table 7.1.7.2.7-1]. Value 0 means that SystemInformationBlockType1-BR is not scheduled. |
| SystemFrameNumber |
| Defines the 8 most significant bits of the SFN. As indicated in TS 36.211 [21, 6.6.1], the 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the |

| MasterInformationBlock field descriptions |
|---|
| second radio frame: 01, the third radio frame: 10, the last radio frame: 11). One value applies for all serving cells of a Cell Group (i.e. MCG or SCG). The associated functionality is common (i.e. not performed independently for each cell). |

In LTE, a UE in connected mode would need to perform measurements for several purposes. To schedule the resource to the UE properly, the network would configure a channel state information (CSI) measurement for the UE, so as to understand the channel quality of each frequency portion. The CSI measurement would be performed on either Cell Specific Reference Signal (CRS) or Channel State Information-Reference Signal (CSI-RS) on a specific time frequency resource. Wideband measurement and sub-band measurement may be performed by the UE, in which wideband corresponds to a measurement on the whole system bandwidth, e.g. 100 physical resource blocks (PRBs) and sub-band measurement corresponds to a smaller amount of the frequency resource, e.g. 4 or 6 PRBs. With the configuration of the CSI reporting mode, the UE would report the corresponding results properly. A CSI report may be periodic or aperiodic. A periodic report would be measured and reported periodically on a control channel with a configured periodical resource. An aperiodic report is triggered by a uplink (UL) grant for a specific TTI and the corresponding measurement results would be transmitted on that TTI. 3GPP TS 36.213 V13.1.1 provide the following:

7.2 UE Procedure for Reporting Channel State Information (CSI)

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

The time and frequency resources that can be used by the UE to report CSI which consists of Channel Quality Indicator (CQI), precoding matrix indicator (PMI), precoding type indicator (PTI), CSI-RS resource indicator (CRI), and/or rank indication (RI) are controlled by the eNB.

For spatial multiplexing, as given in [3], the UE shall determine a RI corresponding to the number of useful transmission layers. For transmit diversity as given in [3], RI is equal to one.

A non-BL/CE UE in transmission mode 8 or 9 is configured with or without PMI/RI reporting by the higher layer parameter pmi-RI-Report.

A UE in transmission mode 8 or 9 is configured with or without PMI/RI reporting by the higher layer parameter pmi-RI-Report.

A UE in transmission mode 10 can be configured with one or more CSI processes per serving cell by higher layers.

For a UE in transmission mode 10,

If a UE is not configured with higher layer parameter eMIMO-Type, each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSI,0}$ and $C_{CSI,1}$ by the higher layer parameter csi-SubFramePattern-Config-r12 for the CSI process.

If the UE is configured with higher layer parameter eMIMO-Type, and eMIMO-Type is set to 'CLASS A', each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSI,0}$ and $C_{CSI,1}$ by the higher layer parameter csi-SubFramePatternConfig-r12 for the CSI process.

If the UE is configured with higher layer parameter eMIMO-Type, and eMIMO-Type is set to 'CLASS B', each CSI process is associated with one or more CSI-RS resource (defined in subclause 7.2.5) and one or more CSI-interference measurement (CSI-IM) resource (defined in subclause 7.2.6). Each CSI-RS resource is associated with a CSI-IM resource by higher layers. For a CSI process with one CSI-RS resource, a UE can be configured with CSI-IM resource for each CSI subframe sets if the UE is configured with CSI subframe sets $C_{CSI,0}$ and $C_{CSI,1}$ by the higher layer parameter csi-SubFramePatternConfig-r12 for the CSI process.

For a UE in transmission mode 10, a CSI reported by the UE corresponds to a CSI process configured by higher layers. Each CSI process can be configured with or without PMI/RI reporting by higher layer signalling.

For UE in transmission mode 9 and the UE configured with higher layer parameter eMIMO-Type, the term 'CSI process' in this subclause refers to the CSI configured for the UE.

For a UE in transmission mode 9, and if the UE is configured with higher layer parameter eMIMO-Type, and, eMIMO-Type is set to 'CLASS A', each CSI process is associated with a CSI-RS resource (defined in subclause 7.2.5).

eMIMO-Type is set to 'CLASS B', each CSI process is associated with one or more CSI-RS resource (defined in subclause 7.2.5).

For a CSI process, and if a UE is configured in transmission mode 9 or 10, and UE is not configured with higher layer parameter pmi-RI-Report, and UE is configured with higher layer parameter eMIMO-Type, and eMIMO-Type is set to 'CLASS B', and the number of CSI-RS antenna ports in at least one of the one or more configured CSI-RS resource is more than one, the UE is considered to be configured without PMI reporting.

A UE is configured with resource-restricted CSI measurements if the subframe sets $C_{CSI,0}$ and $C_{CSI,1}$ are configured by higher layers.

For a serving cell with frame structure type 1, a UE is not expected to be configured with csi-SubframePatternConfig-r12.

CSI reporting is periodic or aperiodic.

A BL/CE UE configured with CEModeB is not expected to be configured with either aperiodic CSI or periodic CSI reporting.

If the UE is configured with more an one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.
Table 7.24: Void In case both periodic and aperiodic CSI reporting would occur in the same subframe, the UE shall only transmit the aperiodic CSI report in that subframe.

If the higher layer parameter altCQI-Table-r12 is configured and is set to allSubframes-r12,
    the UE shall report CQI according to Table 7.2.3-2.
Else if the higher layer parameter altCQI-Table-r12 is configured and is set to csi-SubframeSet1-r12 or csi-SubframeSet2-r12,
    the UE shall report CQI according to Table 7.2.3-2 for the corresponding CSI subframe set configured by altCQI-Table-r12
    the UE shall report CQI for the other CSI subframe set according to FIG. 28 (a reproduction of Table 7.2.3-1 from 3GPP TR 36.211 V13.1.0).
Else
    the UE shall report CQI according to FIG. 28 (a reproduction of Table 7.2.3-1 from 3GPP TR 36.211 V13.1.0).

For a non-BL/CE UE, when reporting RI the UE reports a single instance of the number of useful transmission layers. For each RI reporting interval when the UE is configured in transmission modes 4 or when the UE is configured in transmission mode 8, 9 or 10 with PMI/RI reporting, a UE shall determine a RI from the supported set of RI values as defined in subclause 5.2.2.6 of [4] and report the number in each RI report. For each RI reporting interval when the UE is configured in transmission mode 3, a UE shall determine RI as defined in subclause 5.2.2.6 of [4] in each reporting interval and report the detected number in each RI report to support selection between transmit diversity and large delay CDD.

For a UE configured in transmission mode 9 or 10, when reporting CRI the UE reports a single instance of a selected CSI-RS resource. For each CRI reporting interval when a UE is configured with higher layer parameter eMIMO-Type, and eMIMO-Type is set to 'CLASS B', and the number of configured CSI-RS resources is more than one for a CSI process, the UE shall determine a CRI from the supported set of CRI values as defined in subclause 5.2.2.6 of [4] and report the number in each CRI report.

For a non-BL/CE UE, when reporting PMI the UE reports either a single or a multiple PMI report. The number of RBs represented by a single UE PMI report can be $N_{RB}^{DL}$ or a smaller subset of RBs. The number of RBs represented by a single PMI report is semi-statically configured by higher layer signalling. A UE is restricted to report PMI, RI and PTI within a precoder codebook subset specified by one or more bitmap parameter(s) codebookSubsetRestriction, codebookSubsetRestriction-1, codebookSubsetRestriction-2, codebookSubsetRestriction-3 configured by higher layer signalling.

For a UE configured in transmission mode 10 and the UE not configured with higher layer parameter eMIMO-Type for a CSI process, or for a UE configured in transmission mode 9 or 10 and the UE configured with higher layer parameter eMIMO-Type, and eMIMO-Type is set to 'CLASS B', and one CSI-RS resource configured and except with higher layer parameter alternativeCodebookEnabledCLASSB_K1=TRUE configured and except with higher layer parameter alternativeCodebookEnabledCLASSB_K1=TRUE configured for a CSI process, the bitmap parameter codebookSubsetRestriction is configured for each CSI process and each subframe sets (if subframe sets $C_{CSI,0}$ and $C_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS A', the bitmap parameters codebookSubsetRestriction-1, codebookSubsetRestriction-2 is configured for the CSI process and each subframe sets (if subframe sets $C_{CSI,0}$ and $C_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS B', and one CSI-RS resource configured, and higher layer parameter alternativeCodebookEnabledCLASSB_K1=TRUE, the bitmap parameter codebookSubsetRestriction-3 is configured for the CSI process and each subframe sets (if subframe sets $C_{CSI,0}$ and $C_{CSI,1}$ are configured by higher layers) by higher layer signaling.

For a UE configured in transmission mode 9 or 10, and for a CSI process and UE configured with higher layer parameter eMIMO-Type, and eMIMO-Type is set to 'CLASS B', and more than one CSI-RS resource configured, the bitmap parameter codebookSubsetRestriction is configured for each CSI-RS resource of the CSI process and each subframe sets (if subframe sets $C_{CSI,0}$ and $C_{CSI,1}$ are configured by higher layers) by higher layer signaling.
< . . . >

For a non-BL/CE UE, the set of subbands (S) a UE shall evaluate for CQI reporting spans the entire downlink system bandwidth. A subband is a set of k contiguous PRBs where k is a function of system bandwidth. Note the last subband in set S may have fewer than k contiguous PRBs depending on $N_{RB}^{DL}$. The number of subbands for system bandwidth given by $N_{RB}^{DL}$ is defined by $N=\lceil N_{RB}^{DL}/k \rceil$. The subbands shall be indexed in the order of increasing frequency and non-increasing sizes starting at the lowest frequency.

For transmission modes 1, 2, 3 and 5, as well as transmission modes 8, 9 and 10 without PMI/RI reporting, transmission mode 4 with RI=1, transmission modes 8, 9 and 10 with PMI/RI reporting and RI=1, and transmission modes 9 and 10 without PMI reporting and RI=1, a single 4-bit wideband CQI is reported.

For transmission modes 3 and 4, as well as transmission modes 8, 9 and 10 with PMI/RI reporting, and transmission modes 9 and 10 without PMI reporting, CQI is calculated assuming transmission of one codeword for RI=1 and two codewords for RI>1.

For RI>1 with transmission mode 4, as well as transmission modes 8, 9 and 10 with PMI/RI reporting, and transmission modes 9 and 10 without PMI reporting, PUSCH based triggered reporting includes reporting a wideband CQI which comprises:
  A 4-bit wideband CQI for codeword 0
  A 4-bit wideband CQI for codeword 1

For RI>1 with transmission mode 4, as well as transmission modes 8, 9 and 10 with PMI/RI reporting, and transmission modes 9 and 10 without PMI reporting, PUCCH based reporting includes reporting a 4-bit wideband CQI for codeword 0 and a wideband spatial differential CQI. The wideband spatial differential CQI value comprises:
  A 3-bit wideband spatial differential CQI value for codeword 1 offset level
    Codeword 1 offset level=wideband CQI index for codeword 0–wideband CQI index for codeword 1.
  The mapping from the 3-bit wideband spatial differential CQI value to the offset level is shown in FIG. 13 (a reproduction of Table 7.2-2 from 3GPP TR 36.211 V13.1.0).

7.2.1 Aperiodic CSI Reporting Using PUSCH

The term "UL/DL configuration" in this subclause refers to the higher layer parameter subframeAssignment unless specified otherwise.

A non-BL/CE UE shall perform aperiodic CSI reporting using the PUSCH in subframe n+k on serving cell$_c$, upon decoding in subframe n either:
  an uplink DCI format [4], or
  a Random Access Response Grant,
for serving cell$_c$ if the respective CSI request field is set to trigger a report and is not reserved.

A BL/CE UE shall perform aperiodic CSI reporting using the PUSCH upon decoding either:
  an uplink DCI format [4], or
  a Random Access Response Grant,
for serving cell$_c$ if the respective CSI request field is set to trigger a report and is not reserved.

The subframe(s) in which the PUSCH carrying the corresponding aperiodic CSI reporting triggered by an UL DCI format is transmitted is determined according to subclause 8.0.

If the CSI request field is 1 bit and the UE is configured in transmission mode 1-9 and the UE is not configured with csi-SubframePatternConfig-r12 for any serving cell, a report is triggered for serving cell$_c$ if the CSI request field is set to '1'.

If the CSI request field is 1 bit and the UE is configured in transmission mode 10 and the UE is not configured with csi-SubframePatternConfig-r12 for any serving cell, a report is triggered for a set of CSI process(es) for serving cell$_c$ corresponding to the higher layer configured set of CSI process(es) associated with the value of CSI request field of '01' in FIG. 15 (a reproduction of Table 7.2.1-1B from 3GPP TR 36.211 V13.1.0), if the CSI request field is set to '1'.

If the CSI request field size is 2 bits and the UE is configured in transmission mode 1-9 for all serving cells and the UE is not configured with csi-SubframePatternConfig-r12 for any serving cell, a report is triggered according to the value in FIG. 14 (a reproduction of Table 7.2.1-1A from 3GPP TR 36.211 V13.1.0) corresponding to aperiodic CSI reporting.

If the CSI request field size is 2 bits and the UE is configured in transmission mode 10 for at least one serving cell and the UE is not configured with csi-SubframePatternConfig-r12 for any serving cell, a report is triggered according to the value in FIG. 15 (a reproduction of Table 7.2.1-1B from 3GPP TR 36.211 V13.1.0) corresponding to aperiodic CSI reporting.

If the CSI request field is 1 bit and the UE is configured with the higher layer parameter csi-SubframePatternConfig-r12 for at least one serving cell, a report is triggered for a set of CSI process(es) and/or {CSI process, CSI subframe set}-pair(s) for serving cell$_c$ corresponding to the higher layer configured set of CSI process(es) and/or {CSI process, CSI subframe set}-pair(s) associated with the value of CSI request field of '01' in Table 7.2.1-1C, if the CSI request field is set to '1'.

If the CSI request field size is 2 bits and the UE is configured with the higher layer parameter csi-SubframePatternConfig-r12 for at least one serving cell, a report is triggered according to the value in Table 7.2.1-1C corresponding to aperiodic CSI reporting.

If the CSI request field size is 3 bits and the UE is not configured with the higher layer parameter csi-SubframePatternConfig-r12 for any serving cell, a report is triggered according to the value in Table 7.2.1-1D corresponding to aperiodic CSI reporting.

If the CSI request field size is 3 bits and the UE is configured with the higher layer parameter csi-SubframePatternConfig-r12 for at least one serving cell, a report is triggered according to the value in Table 7.2.1-1E corresponding to aperiodic CSI reporting.

For a given serving cell, if the UE is configured in transmission modes 1-9, the "CSI process" in FIG. 15 (a reproduction of Table 7.2.1-1B from 3GPP TR 36.211 V13.1.0), Table 7.2.1-1C, Table 7.2.1-1D, and Table 7.2.1-1E refers to the aperiodic CSI configured for the UE on the given serving cell. A UE is not expected to be configured by higher layers with more than 5 CSI processes in each of the $1^{st}$ and $2^{nd}$ set of CSI process(es) in FIG. 15 (a reproduction of Table 7.2.1-1B from 3GPP TR 36.211 V13.1.0). A UE is not expected to be configured by higher layers with more than 5 CSI processes and/or {CSI process, CSI subframe set}-pair(s) in each of the $1^{st}$ and $2^{nd}$ set of CSI process(es) and/or {CSI process, CSI subframe set}-pair(s) in Table 7.2.1-1C. A UE is not expected to be configured by higher layers with more than one instance of the same CSI process in each of the higher layer configured sets associated with the value of CSI request field of '01', '10', and '11' in FIG. 15 (a reproduction of Table 7.2.1-1B from 3GPP TR 36.211 V13.1.0) and Table 7.2.1-1C respectively. A UE is not expected to be configured by higher layers with more than 32 CSI processes in each of the $1^{st}$ to $6^{th}$ set of CSI process(es) in Table 7.2.1-1D. A UE is not expected to be configured by higher layers with more than 32 CSI processes and/or {CSI process, CSI subframe set}-pair(s) in each of the $1^{st}$ to $6^{th}$ set of CSI process(es) and/or {CSI process, CSI subframe set}-pair(s) in Table 7.2.1-1E. A UE is not expected to be configured by higher layers with more than one instance of the same CSI process in each of the higher layer configured sets associated with the value of CSI request field of '001', '010', '011', '100', '101', '110' and '111' in Table 7.2.1-1D and Table 7.2.1-1E respectively.

A UE is not expected to receive more than one aperiodic CSI report request for a given subframe.

If a UE is configured with more than one CSI process for a serving cell, the UE on reception of an aperiodic CSI report request triggering a CSI report according to FIG. 15 (a reproduction of Table 7.2.1-1B from 3GPP TR 36.211 V13.1.0) is not expected to update CSI corresponding to the CSI reference resource (defined in subclause 7.2.3) for all CSI processes except the max($N_x - N_u$, 0) lowest-indexed CSI processes for the serving cell associated with the request when the UE has $N_u$ unreported CSI processes associated with other aperiodic CSI requests for the serving cell, where a CSI process associated with a CSI request shall only be counted as unreported in a subframe before the subframe where the PUSCH carrying the corresponding CSI is transmitted, and $N_{CSI-P}$ is the maximum number of CSI processes supported by the UE for the serving cell and:

for FDD serving cell $N_x = N_{CSI-P}$;
for TDD serving cell
   if the UE is configured with four CSI processes for the serving cell, $N_x = N_{CSI-P}$
   if the UE is configured with two or three CSI processes for the serving cell, $N_x = 3$.

If more than one value of $N_{CSI-P}$ is included in the UE-EUTRA-Capability, the UE assumes a value of $N_{CSI-P}$ that is consistent with its CSI process configuration. If more than one consistent value of $N_{CSI-P}$ exists, the UE may assume any one of the consistent values.

If a UE is configured with multiple cell groups, and if the UE receives multiple aperiodic CSI report requests in a subframe for different cell groups triggering more than one CSI report, the UE is not required to update CSI for more than 5 CSI processes from the CSI processes corresponding to all the triggered CSI reports.

If a UE is configured with a PUCCH-SCell, and if the UE receives multiple aperiodic CSI report requests in a subframe for both the primary PUCCH group and the secondary PUCCH group triggering more than one CSI report, the UE is not required to update CSI for more than 5 CSI processes from the CSI processes corresponding to all the triggered CSI reports, in case the total number of serving cells in the primary and secondary PUCCH group is no more than 5. If a UE is configured with more than 5 serving cells, and if the UE receives aperiodic CSI report request in a subframe triggering more than $N_y$ CSI reports, the UE is not required to update CSI for more than $N_y$ CSI processes from the CSI processes corresponding to all the triggered CSI reports, where the value of $N_y$ is given by maxNumberUpdatedCSI-Proc-r13.

< . . . >

For a non-BL/CE UE, when the CSI request field from an uplink DCI format is set to trigger a report, for FDD k=4, and for TDD UL/DL configuration 1-6, k is given in Table 8-2. For TDD UL/DL configuration 0, if the MSB of the UL index is set to 1 and LSB of the UL index is set to 0, k is given in Table 8-2; or if MSB of the UL index is set to 0 and LSB of the UL index is set to 1, k is equal to 7; or if both MSB and LSB of the UL index is set to 1, k is given in Table 8-2.

For TDD, if a UE is configured with more than one serving cell and if the UL/DL configurations of at least two serving cells are different, or if the UE is configured with the parameter EIMTA-MainConfigServCell-r12 for at least one serving cell, or for FDD-TDD and serving cell frame structure type 2, the "TDD UL/DL Configuration" given in Table 8-2 refers to the UL-reference UL/DL configuration (defined in subclause 8.0).

For a non-BL/CE UE, when the CSI request field from a Random Access Response Grant is set to trigger a report and is not reserved, k is equal to $k_1$ if the UL delay field in subclause 6.2 is set to zero, where $k_1$ is given in subclause 6.1.1. The UE shall postpone aperiodic CSI reporting to the next available UL subframe if the UL delay field is set to 1.

For a BL/CE UE, when the CSI request field from a Random Access Response Grant is set to trigger a report and is not reserved, the subframe(s) in which the corresponding aperiodic CSI reporting is transmitted is determined according to subclause 6.1.1.

The minimum reporting interval for aperiodic reporting of CQI and PMI and RI and CRI is 1 subframe. The subband size for CQI shall be the same for transmitter-receiver configurations with and without preceding.

If a UE is not configured for simultaneous PUSCH and PUCCH transmission, when aperiodic CSI report with no transport block associated as defined in subclause 8.6.2 and positive SR is transmitted in the same subframe, the UE shall transmit SR, and, if applicable, HARQ-ACK, on PUCCH resources as described in subclause 10.1

A UE is semi-statically configured by higher layers to feed back CQI and PMI and corresponding RI and CRI on the same PUSCH using one of the following CSI reporting modes given in FIG. 16 (a reproduction of Table 7.2.1-1 from 3GPP TR 36.211 V13.1.0) and described below. For a BL/CE UE the UE shall not transmit the RI for any CSI reporting mode in Table 7.2.1-1.

For non-BL/CE UE and for each of the transmission modes defined in subclause 7.1, the following reporting modes are supported on PUSCH:

Transmission mode 1: Modes 2-0, 3-0, 1-0
Transmission mode 2: Modes 2-0, 3-0, 1-0
Transmission mode 3: Modes 2-0, 3-0, 1-0
Transmission mode 4: Modes 1-2, 2-2, 3-1, 3-2, 1-1
Transmission mode 5: Mode 3-1, 1-1
Transmission mode 6: Modes 1-2, 2-2, 3-1, 3-2, 1-1
Transmission mode 7: Modes 2-0, 3-0, 1-0
Transmission mode 8: Modes 1-2, 2-2, 3-1, 3-2, 1-1 if the UE is configured with PMI/RI reporting; modes 2-0, 3-0, 1-0 if the UE is configured without PMI/RI reporting
Transmission mode 9: Modes 1-2, 2-2, 3-1, 3-2, 1-1 if the UE is configured with PMI/RI reporting and number of CSI-RS ports>1; modes 2-0, 3-0, 1-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to 'CLASS B'.
Transmission mode 10: Modes 1-2, 2-2, 3-1, 3-2, 1-1 if the UE is configured with PMI/RI reporting and number of CSI-RS ports>1; modes 2-0, 3-0, 1-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to 'CLASS B'.

< . . . >

The aperiodic CSI reporting mode is given by the parameter cqi-ReportModeAperiodic which is configured by higher-layer signalling.

For a serving cell with $N_{RB}^{DL} \leq 7$, PUSCH reporting modes are not supported for that serving cell.

For a non-BL/CE UE, RI is only reported for transmission modes 3 and 4, as well as transmission modes 8, 9 and 10 with PMI/RI reporting, and transmission modes 9 and 10 without PMI reporting.

For a BL/CE UE, RI is not reported.

For serving cell$_c$, a UE configured in transmission mode 10 with PMI/RI reporting or without PMI reporting for a CSI process can be configured with a 'RI-reference CSI process' for the CSI process. If the UE is configured with a 'RI-reference CSI process' for the CSI process, the reported RI for the CSI process shall be the same as the reported RI for the configured 'RI-reference CSI process'. The RI for the 'RI-reference CSI process' is not based on any other configured CSI process other than the 'RI-reference CSI process'. The UE is not expected to receive an aperiodic CSI report request for a given subframe triggering a CSI report including CSI associated with the CSI process and not including CSI associated with the configured 'RI-reference CSI process'. If the UE is configured with a 'RI-reference CSI process' for a CSI process and if subframe sets $C_{CSI,0}$ and $C_{CSI,1}$ are configured by higher layers for only one of the CSI processes then the UE is not expected to receive configuration for the CSI process configured with the subframe subsets that have a different set of restricted RIs with precoder codebook subset restriction between the two subframe sets. The UE is not expected to receive configurations for the CSI process and the 'RI-reference CSI process' that have a different:

- Aperiodic CSI reporting mode, and/or
- number of CSI-RS antenna ports, and/or
- set of restricted RIs with precoder codebook subset restriction if subframe sets $C_{CSI,0}$ and $C_{CSI,1}$ are not configured by higher layers for both CSI processes, and/or
- set of restricted RIs with precoder codebook subset restriction for each subframe set if subframe sets $C_{CSI,0}$ and $C_{CSI,1}$ are configured by higher layers for both CSI processes, and/or
- set of restricted RIs with precoder codebook subset restriction if subframe sets $C_{CSI,0}$ and $C_{CSI,1}$ are configured by higher layers for only one of the CSI processes, and the set of restricted RIs for the two subframe sets are the same, and/or
- number of CSI-RS antenna ports for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes, and/or
- set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are not configured by higher layers for both CSI processes, and/or
- set of restricted RIs with precoder codebook subset restriction for each subframe set and for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are configured by higher layers for both CSI processes, and/or
- set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are configured by higher layers for only one of the CSI processes, and the set of restricted RIs for the two subframe sets are the same.

For a non-BL/CE UE, a RI report for a serving cell on an aperiodic reporting mode is valid only for CQI/PMI report or CQI report without PMI reporting for that serving cell on that aperiodic reporting mode.

For a UE configured in transmission mode 9 or 10, and for a CSI process, if a UE is configured with parameter eMIMO-Type configured by higher layers, and eMIMO-Type is set to 'CLASS B' and the number of configured CSI-RS resources is more than one, and the total number of antenna ports across all configured CSI-RS resources is more than 15, the UE on reception of an aperiodic CSI report request triggering a CSI report in uplink subframe n is not expected to update CRI corresponding to the CSI process if CRI for the CSI process has been reported and updated on or after subframe n−5.

Wideband feedback

Mode 1-2 description:

For a UE configured in transmission mode 9 or 10, and for a CSI process, if a UE is configured with higher layer parameter eMIMO-Type, and eMIMO-Type is set to 'CLASS B', and the number of configured CSI-RS resources is more than one, the UE shall report one wideband CRI which is calculated assuming transmission on set S subbands.

For each subband a preferred precoding matrix is selected from the codebook subset assuming transmission only in the subband A UE shall report one wideband CQI value per codeword which is calculated assuming the use of the corresponding selected precoding matrix in each subband and transmission on set S subbands. The UE shall report the selected precoding matrix indicator for each set S subband except with 8 CSI-RS ports configured for transmission modes 9 and 10 or with alternativeCodeBookEnabledFor4TX-r12=TRUE configured for transmission modes 8, 9 and 10, in which case a first precoding matrix indicator $i_1$ is reported for the set S subbands and a second precoding matrix indicator $i_2$ is reported for each set S subband, if the UE is not configured with higher layer parameter eMIMO-Type, or UE reports CRI, or UE is configured in transmission mode 9 or 10, and with higher layer parameter eMIMO-Type, and eMIMO-Type is set to 'CLASS B', and one CSI-RS resource configured, and except with higher layer parameter alternativeCodebookEnabledCLASSB_K1=TRUE configured.

UE is configured in transmission mode 9 or 10, and with higher layer parameter eMIMO-Type, and eMIMO-Type is set to 'CLASS A', in which case a first precoding matrix indicator $i_1$ is reported for the set S subbands and a second precoding matrix indicator $i_2$ is reported for each set S subband.

Subband size is given by Table 7.2.1-3.

For transmission modes 4, 8, 9 and 10, the reported PMI and CQI values are calculated conditioned on the reported RI. For other transmission modes they are reported conditioned on rank 1. If CRI is reported, the reported PMI, CQI, and RI values are calculated conditioned on the reported CRI.

Mode 1-1 description:
- A single precoding matrix is selected from the codebook subset assuming transmission on set S subbands
- A UE shall report a wideband CQI value per codeword which is calculated assuming the use of the single precoding matrix in all subbands and transmission on set S subbands
- The UE shall report the selected single precoding matrix indicator except with 8 CSI-RS ports configured for transmission modes 9 and 10 or with alternativeCodeBookEnabledFor4TX-r12=TRUE configured for transmission modes 8, 9 and 10, in which case a first and second precoding matrix indicator are reported corresponding to the selected single precoding matrix.
- For transmission modes 4, 8, 9 and 10, the reported PMI and CQI values are calculated conditioned on the reported RI. For other transmission modes they are reported conditioned on rank 1.

Mode 1-0 description:
- A UE shall report a wideband CQI value which is calculated assuming transmission on set S subbands
- The wideband CQI represents channel quality for the first codeword, even when RI>1.
- For transmission mode 3 the reported CQI value is calculated conditioned on the reported RI. For other transmission modes they are reported conditioned on rank 1.

< . . . >

UE-selected subband feedback

< . . . >

Mode 2-2 description:
- For a UE configured in transmission mode 9 or 10, and for a CSI process, if a UE is configured with higher layer parameter eMIMO-Type, and eMIMO-Type is set to 'CLASS B', and the number of configured CSI-RS resources is more than one, the UE shall report one wideband CRI which is calculated assuming transmission on set S subbands.
- The UE shall perform joint selection of the set of M preferred subbands of size k within the set of subbands S and a preferred single precoding matrix selected from the codebook subset that is preferred to be used for transmission over the M selected subbands.
- The UE shall report one CQI value per codeword reflecting transmission only over the selected M preferred subbands and using the same selected single precoding matrix in each of the M subbands.
- A single precoding matrix is selected from the codebook subset assuming transmission on set S subbands
- A UE shall report a wideband CQI value per codeword which is calculated assuming the use of the single precoding matrix in all subbands and transmission on set S subbands
- The UE shall report the selected single precoding matrix indicator preferred for the M selected subbands and the selected single precoding matrix indicator for all set S subbands except with,
  8 CSI-RS ports configured for transmission modes 9 and 10 or with alternativeCodeBookEnabledFor4TX-r12=TRUE configured for transmission modes 8, 9 and 10, in which case the UE shall report a first precoding matrix indicator for all set S subbands, a second precoding matrix indicator for all set S subbands and another second precoding matrix indicator for the M selected subbands, if the UE is not configured with higher layer parameter eMIMO-Type, or UE reports CRI, or UE is configured in transmission mode 9 or 10, and with higher layer parameter eMIMO-Type, and eMIMO-Type is set to 'CLASS B', and one CSI-RS resource configured, and except with higher layer parameter alternativeCodebookEnabledCLASSB_K1=TRUE configured.
  UE is configured in transmission mode 9 or 10, and with higher layer parameter eMIMO-Type, and eMIMO-Type is set to 'CLASS A', in which case the UE shall report a first precoding matrix indicator $i_1$ for all set S subbands, a second precoding matrix indicator $i_2$ for all set S subbands and another second precoding matrix indicator $i_2$ for or the M selected subbands.
- For transmission modes 4, 8, 9 and 10, the reported PMI and CQI values are calculated conditioned on the reported RI. For other transmission modes they are reported conditioned on rank 1. If CRI is reported, the reported PMI, CQI, and RI values are calculated conditioned on the reported CRI.

For all UE-selected subband feedback modes the UE shall report the positions of the M selected subbands using a combinatorial index r defined as $$r = \sum_{i=0}^{M-1} \binom{N - s_i}{M - i}$$

where the set $\{s_i\}_{i=0}^{M-1}$, ($1 \le s_i \le N$, $s_i < s_{i+1}$) contains the M sorted subband indices and $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N}{M} - 1\right\}.$$

The CQI value for the M selected subbands for each codeword is encoded differentially using 2-bits relative to its respective wideband CQI as defined by Differential CQI offset level=M selected subbands CQI index−wideband CQI index The mapping from the 2-bit differential CQI value to the offset level is shown in FIG. 17 (a reproduction of Table 7.2.1-4 from 3GPP TR 36.211 V13.1.0).

< . . . >

7.2.2 Periodic CSI Reporting Using PUCCH

A UE is semi-statically configured by higher layers to periodically feed back different CSI components (CQI, PMI, PTI, CRI, and/or RI) on the PUCCH using the reporting modes given in FIG. 19 (a reproduction of Table 7.2.2-1 from 3GPP TR 36.211 V13.1.0) and described below. A UE in transmission mode 10 can be configured by higher layers for multiple periodic CSI reports corresponding to one or more CSI processes per serving cell on PUCCH.

A BL/CE UE configured with CEModeB is not expected to be configured with periodic CSI report.

For a non-BL/CE UE and for each of the transmission modes defined in subclause 7.1, the following periodic CSI reporting modes are supported on PUCCH:

Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: Modes 1-1, 2-1 if the UE is configured with PMI/RI reporting; modes 1-0, 2-0 if the UE is configured without PMI/RI reporting
Transmission mode 9: Modes 1-1, 2-1 if the UE is configured with PMI/RI reporting and number of CSI-RS ports>1; modes 1-0, 2-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to be 'CLASS B'.
Transmission mode 10: Modes 1-1, 2-1 if the UE is configured with PMI/RI reporting and number of CSI-RS ports>1; modes 1-0, 2-0 if the UE is configured without PMI/RI reporting or without PMI reporting or number of CSI-RS ports=1 or the number of CSI-RS ports in each of one or more CSI-RS resources in a CSI process is one when CSI-Reporting-Type is set to be 'CLASS B'.

< . . . >

For a UE configured in transmission mode 1-9, one periodic CSI reporting mode for each serving cell is configured by higher-layer signalling.

For a UE configured in transmission mode 10, one or more periodic CSI reporting modes for each serving cell are configured by higher-layer signalling.

For UE in transmission mode 9 and the UE configured with higher layer parameter eMIMO-Type, the term 'CSI process' in this subclause refers to the CSI configured for the UE.

For a UE configured with transmission mode 9 or 10, and with 8 CSI-RS ports, if the UE is not configured with parameter eMIMO-Type by higher layers, or UE is configured with parameter eMIMO-Type by higher layers, and eMIMO-Type is set to 'CLASS B', and one CSI-RS resource configured, and except with higher layer parameter alternativeCodebookEnabledCLASSB_K1=TRUE configured, or UE is configured with parameter eMIMO-Type by higher layers, and eMIMO-Type is set to 'CLASS B', and more than one CSI-RS resource configured, and at least one CSI-RS resource with 8 CSI-RS ports, mode 1-1 is configured to be either submode 1 or submode 2 via higher-layer signaling using the parameter PUCCH_format1-1_CSI_reporting_mode.

For a UE configured with transmission mode 8, 9 or 10, and with alternativeCodeBookEnabledFor4TX-r12=TRUE configured, if the UE is not configured with higher layer parameter eMIMO-Type, or UE is configured with parameter eMIMO-Type by higher layers, and eMIMO-Type is set to 'CLASS B', and one CSI-RS resource configured, and except with higher layer parameter alternativeCodebookEnabledCLASSB_K1=TRUE configured, or UE is configured with parameter eMIMO-Type by higher layers, and eMIMO-Type is set to 'CLASS B', and more than one CSI-RS resource configured, and at least one CSI-RS resource with 4 CSI-RS ports, mode 1-1 is configured to be either submode 1 or submode 2 via higher-layer signaling using the parameter PUCCH_format1-1_CSI_reporting_mode.

For the UE-selected subband CQI, a CQI report in a certain subframe of a certain serving cell describes the channel quality in a particular part or in particular parts of the bandwidth of that serving cell described subsequently as bandwidth part (BP) or parts. The bandwidth parts shall be indexed in the order of increasing frequency and non-increasing sizes starting at the lowest frequency.

For each serving cell

There are a total of N subbands for a serving cell system bandwidth given by $N_{RB}^{DL}$ where $\lfloor N_{RB}^{DL}/k \rfloor$ subbands are of size k. If $\lceil N_{RB}^{DL}/k \rceil - \lfloor N_{RB}^{DL}/k \rfloor > 0$ then one of the subbands is of size $N_{RB}^{DL} - k \cdot \lfloor N_{RB}^{DL}/k \rfloor$.

A bandwidth part j is frequency-consecutive and consists of $N_j$ subbands where J bandwidth parts span S or $N_{RB}^{DL}$ as given in FIG. 25 (a reproduction of Table 7.2.2-2 from 3GPP TR 36.211 V13.1.0). If J=1 then $N_j$ is $\lceil N_{RB}^{DL}/k/J \rceil$. If J>1 then $N_j$ is either $\lceil N_{RB}^{DL}/k/J \rceil$ or $\lceil N_{RB}^{DL}/k/J \rceil - 1$, depending on $N_{RB}^{DL}$, k and J.

Each bandwidth part j, where 0≤j≤J−1, is scanned in sequential order according to increasing frequency.

For UE selected subband feedback a single subband out of $N_j$ subbands of a bandwidth part is selected along with a corresponding L-bit label indexed in the order of increasing frequency, where $L = \lceil \log_2 \lceil N_{RB}^{DL}/k/J \rceil \rceil$.

The CQI and PMI payload sizes of each PUCCH CSI reporting mode are given in FIG. 26 (a reproduction of Table 7.2.2-3 from 3GPP TR 36.211 V13.1.0).

The following CQI/PMI and RI reporting types with distinct periods and offsets are supported for the PUCCH CSI reporting modes given in FIG. 26 (a reproduction of Table 7.2.2-3 from 3GPP TR 36.211 V13.1.0):

Type 1 report supports CQI feedback for UE selected sub-bands
Type 1a report supports subband CQI and second PMI feedback
Type 2, Type 2b, and Type 2c report supports wideband CQI and PMI feedback
Type 2a report supports wideband PMI feedback
Type 3 report supports RI feedback
Type 4 report supports wideband CQI
Type 5 report supports RI and wideband PMI feedback
Type 6 report supports RI and PTI feedback
Type 7 report support CRI and RI feedback
Type 8 report supports CRI, RI and wideband PMI feedback
Type 9 report supports CRI, RI and PTI feedback
Type 10 report supports CRI feedback For a UE configured in transmission mode 1-9 and for each serving cell, or for a UE configured in transmission mode 10 and for each CSI process in each serving cell, the periodicity $N_{pd}$ (in subframes) and offset $N_{OFFSET,CQI}$ (in subframes) for CQI/PMI reporting are determined based on the parameter cqi-pmi-ConfigIndex ($I_{CQI/PMI}$) given in FIG. 20 (a reproduction of Table 7.2.2-1A from 3GPP TR 36.211 V13.1.0) for FDD or for FDD-TDD with primary cell frame structure 1 and FIG. 22 (a reproduction of Table 7.2.2-1C from 3GPP TR 36.211 V13.1.0) for TDD or for FDD-TDD and primary cell frame structure type 2. The periodicity $M_{RI}$ and relative offset $N_{OFFSET,RI}$ for RI reporting are determined based on the parameter ri-ConfigIndex ($I_{RI}$) given in FIG. 21 (a reproduction of Table 7.2.2-1B from 3GPP TR 36.211 V13.1.0). For a UE configured in transmission mode 9 and for each serving cell, or for a UE configured in transmission mode 10 and for each CSI process in each serving cell, if the UE is configured with parameter eMIMO-Type by higher layers, and eMIMO-Type is set to 'CLASS B', and the number of configured CSI-RS resources is more than one, when RI reporting is configured, the periodicity $M_{CRI}$ for CRI reporting is determined based on the parameter cri-ConfigIndex ($I_{CRI}$) given in FIG. 23 (a reproduction of Table 7.2.2-1D from 3GPP TR 36.211 V13.1.0). When the number of antenna ports in each configured CSI-RS resource is one, the periodicity $M_{CRI}$ and relative offset $N_{OFFSET,CRI}$ for CRI reporting are determined based on the parameter cri-ConfigIndex ($I_{CRI}$) given in FIG. 24 (a reproduction of Table 7.2.2-1E from 3GPP TR 36.211 V13.1.0). The parameters cqi-pmi-ConfigIndex, ri-ConfigIndex, and cri-ConfigIndex are configured by higher layer signalling. The relative reporting offset for RI $N_{OFFSET,RI}$ takes values from the set $\{0, -1, \ldots, -(N_{pd}-1)\}$. If a UE is configured to report for more than one CSI subframe set then parameter cqi-pmi-ConfigIndex, ri-ConfigIndex and cri-ConfigIndex respectively correspond to the CQI/PMI, RI, and CRI periodicity and relative reporting offset for subframe set 1 and cqi-pmi-ConfigIndex2, ri-ConfigIndex2 and cri-ConfigIndex2 respectively correspond to the CQI/PMI, RI, and CRI periodicity and relative reporting offset for subframe set 2. For a UE configured with transmission mode 10, the parameters cqi-pmi-ConfigIndex, ri-ConfigIndex, cri-ConfigIndex, cqi-pmi-ConfigIndex2, ri-ConfigIndex2, and cri-ConfigIndex2 can be configured for each CSI process. A BL/CE UE is not expected to be configured with the parameter ri-ConfigIndex.

In the case where wideband CQI/PMI reporting is configured:

The reporting instances for wideband CQI/PMI are subframes satisfying $$(10 \times n_f + \lfloor n_s/2 \rfloor - N_{OFFSET,CQI}) \bmod (N_{pd}) = 0.$$

For a UE configured in transmission mode 9 or 10, and UE configured with the parameter eMIMO-Type by higher layers, and eMIMO-Type set to 'CLASS A', the reporting interval of wideband first PMI reporting is an integer multiple H' of period $N_{pd}$ (in subframes).

The reporting instances for wideband first PMI are subframes satisfying $$(10 \times n_f + \lfloor n_s/2 \rfloor - N_{OFFSET,CQI}) \bmod (H' \cdot N_{pd}) = 0.$$

In case RI reporting is configured, the reporting interval of the RI reporting is an integer multiple $M_{RI}$ of period $N_{pd}$ (in subframes).

The reporting instances for RI are subframes satisfying $$(10 \times n_f + \lfloor n_s/2 \rfloor - N_{OFFSET,CQI} - N_{OFFSET,RI}) \bmod (N_{pd} \cdot M_{RI}) = 0.$$

In case CRI reporting is configured,
if the number of antenna ports in each configured CSI-RS resource is one,
the reporting interval of the CRI reporting is an integer multiple $M_{CRI}$ of period $N_{pd}$ (in subframes)

The reporting instances for CRI are subframes satisfying $$(10 \times n_f + \lfloor n_s/2 \rfloor - N_{OFFSET,CQI} - N_{OFFSET,CRI}) \bmod (N_{pd} \cdot M_{CRI}) = 0.$$

otherwise
the reporting interval of the CRI reporting is an integer multiple $M_{CRI}$ of period $N_{pd} \cdot M_{RI}$ (in subframes).

The reporting instances for CRI are subframes satisfying $$(10 \times n_f + \lfloor n_s/2 \rfloor - N_{OFFSET,CQI} - N_{OFFSET,RI}) \bmod (N_{pd} \cdot M_{RI} \cdot M_{CRI}) = 0.$$

In the case where both wideband CQI/PMI and subband CQI (or subband CQI/second PMI for transmission modes 9 and 10) reporting are configured:

The reporting instances for wideband CQI/PMI and subband CQI (or subband CQI/second PMI for transmission modes 9 and 10) are subframes satisfying $$(10 \times n_f + \lfloor n_s/2 \rfloor - N_{OFFSET,CQI}) \bmod N_{pd} = 0.$$

When PTI is not transmitted (due to not being configured) or the most recently transmitted PTI is equal to 1 for a UE configured in transmission modes 8 and 9, or for a UE configured in transmission mode 10 without a 'RI-reference CSI process' for a CSI process, or the transmitted PTI is equal to 1 reported in the most recent RI reporting instance for a CSI process when a UE is configured in transmission mode 10 with a 'RI-reference CSI process' for the CSI process, or the transmitted PTI is equal to 1 for a 'RI-reference CSI process' reported in the most recent RI reporting instance for a CSI process when a UE is configured in transmission mode 10 with the 'RI-reference CSI process' for the CSI process, and the most recent type 6 report for the CSI process is dropped:

The wideband CQI/wideband PMI (or wideband CQI/wideband second PMI for transmission modes 8, 9 and 10) report has period $H \cdot N_{pd}$, and is reported on the subframes satisfying $(10 \times n_f + \lfloor n_s/2 \rfloor - N_{OFFSET,CQI}) \bmod (H \cdot N_{pd}) = 0$. The integer H is defined as $H = J \cdot K + 1$, where J is the number of bandwidth parts.

Between every two consecutive wideband CQI/wideband PMI (or wideband CQI/wideband second PMI for transmission modes 8, 9 and 10) reports, the remaining J·K reporting instances are used in sequence for subband CQI (or subband CQI/second PMI for transmission modes 9 and 10) reports on K full cycles of bandwidth parts except when the gap between two consecutive wideband CQI/PMI reports contains less than J·K reporting instances due to a system frame number transition to 0, in which case the UE shall not transmit the remainder of the subband CQI (or subband CQI/second PMI for transmission modes 9 and 10) reports which have not been transmitted before the second of the two wideband CQI/wideband PMI (or wideband CQI/wideband second PMI for transmission modes 8, 9 and 10) reports. Each full cycle of bandwidth parts shall be in increasing order starting from bandwidth part 0 to bandwidth part J−1. The parameter K is configured by higher-layer signalling.

When the most recently transmitted PTI is 0 for a UE configured in transmission modes 8 and 9 or for a UE configured in transmission mode 10 without a 'RI-reference CSI process' for a CSI process, or the transmitted PTI is 0 reported in the most recent RI reporting instance for a CSI process when a UE is configured in transmission mode 10 with a 'RI-reference CSI process' for the CSI process, or the transmitted PTI is 0 for a 'RI-reference CSI process' reported in the most recent RI reporting instance for a CSI process when a UE is configured in transmission mode 10 with the 'RI-reference CSI process' for the CSI process, and the most recent type 6 report for the CSI process is dropped:

The wideband first precoding matrix indicator report has period $H' \cdot N_{pd}$, and is reported on the subframes satisfying $(10 \times n_f + \lfloor n_s/2 \rfloor - N_{OFFSET,CQI}) \bmod (H' \cdot N_{pd}) = 0$, where H' is signalled by higher layers.

Between every two consecutive wideband first precoding matrix indicator reports, the remaining reporting instances are used for a wideband second precoding matrix indicator with wideband CQI as described below In case RI reporting is configured, the reporting interval of RI is $M_{RI}$ times the wideband CQI/PMI period $H \cdot N_{pd}$, and RI is reported on the same PUCCH cyclic shift resource as both the wideband CQI/PMI and subband CQI reports.

The reporting instances for RI are subframes satisfying $(10 \times n_f + \lfloor n_s/2 \rfloor - N_{OFFSET,CQI} - N_{OFFSET,RI}) \bmod (H \cdot N_{pd} \cdot M_{RI}) = 0$ In case CRI reporting is configured, if the number of antenna ports in each configured CSI-RS resource is one, the reporting interval of the CRI reporting is $M_{CRI}$ times the wideband CQI/PMI period $H \cdot N_{pd}$, The reporting instances for CRI are subframes satisfying $(10 \times n_f + \lfloor n_s/2 \rfloor - N_{OFFSET,CQI} - N_{OFFSET,CRI}) \bmod (H \cdot N_{pd} \cdot M_{CRI}) = 0.$ otherwise the reporting interval of the CRI reporting is $M_{CRI}$ times the RI period $H \cdot N_{pd} \cdot M_{RI}$ (in subframes).

The reporting instances for CRI are subframes satisfying $(10 \times n_f + \lfloor n_s/2 \rfloor - N_{OFFSET,CQI} - N_{OFFSET,RI}) \bmod (H \cdot N_{pd} \cdot M_{RI} \cdot M_{CRI}) = 0$

< . . . >

For TDD or FDD-TDD and primary cell frame structure type 2 periodic CQI/PMI reporting, the following periodicity values apply for a serving $cell_c$ depending on the TDD UL/DL configuration of the primary cell {3}, where the UL/DL configuration corresponds to the eimta-HARQ-ReferenceConfig-r12 for the primary cell if the UE is configured with the parameter EIMTA-MainConfigServCell-r12 for the primary cell:

The reporting period of $N_{pd}=1$ is applicable for the serving $cell_c$ only if TDD UL/DL configuration of the primary cell belongs to {0, 1, 3, 4, 6}, and where all UL subframes of the primary cell in a radio frame are used for CQI/PMI reporting.

The reporting period of $N_{pd}=5$ is applicable for the serving $cell_c$ only if TDD UL/DL configuration of the primary cell belongs to {0, 1, 2, 6}.

The reporting periods of $N_{pd}=\{10, 20, 40, 80, 160\}$ are applicable for the serving $cell_c$ for any TDD UL/DL configuration of the primary cell.

< . . . >

An CRI or RI or PTI or any precoding matrix indicator reported for a serving cell in a periodic reporting mode is valid only for CSI reports for that serving cell on that periodic CSI reporting mode.

For serving $cell_c$, a UE configured in transmission mode 10 with PMI/RI reporting or without PMI reporting for a CSI process can be configured with a 'RI-reference CSI process'. The RI for the 'RI-reference CSI process' is not based on any other configured CSI process other than the 'RI-reference CSI process'. If the UE is configured with a 'RI-reference CSI process' for a CSI process and if subframe sets $C_{CSI,0}$ and $C_{CSI,1}$ are configured by higher layers for only one of the CSI processes then the UE is not expected to receive configuration for the CSI process configured with the subframe subsets that have a different set of restricted RIs with precoder codebook subset restriction between the two subframe sets. The UE is not expected to receive configurations for the CSI process and the 'RI-reference CSI process' that have a different:

periodic CSI reporting mode (including sub-mode if configured), and/or number of CSI-RS antenna ports,and/or set of restricted RIs with precoder codebook subset restriction if subframe sets $C_{CSI,0}$ and $C_{CSI,1}$ are not configured by higher layers for both CSI processes, and/or set of restricted RIs with precoder codebook subset restriction for each subframe set if subframe sets $C_{CSI,0}$ and $C_{CSI,1}$ are configured by higher layers for both CSI processes, and/or set of restricted RIs with precoder codebook subset restriction if subframe sets $C_{CSI,0}$ and $C_{CSI,1}$ are configured by higher layers for only one of the CSI processes, and the set of restricted RIs for the two subframe sets are the same, and/or number of CSI-RS antenna ports for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes, and/or set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are not configured by higher layers for both CSI processes, and/or set of restricted RIs with precoder codebook subset restriction for each subframe set and for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are configured by higher layers for both CSI processes, and/or set of restricted RIs with precoder codebook subset restriction for any two CSI-RS resources for the two CSI processes, if a UE is configured with higher layer parameter eMIMO-Type, and eMIMO-Type is set to 'CLASS B', and the number of configured CSI-RS resources is more than one for at least one of the two CSI processes and if subframe sets $C_{CSI,0}$ and $C_{CSI,1}$ are configured by higher layers for only one of the CSI processes, and the set of restricted RIs for the two subframe sets are the same.

If a UE is configured for CRI reporting,

For the calculation of CQI/PMI/RI conditioned on the last reported CRI, in the absence of a last reported CRI the UE shall conduct the CQI/PMI/RI calculation conditioned on the lowest possible CRI. If reporting for more than one CSI subframe set is configured. CQI/PMI/RI is conditioned on the last reported CRI linked to the same subframe set as the CSI report.

For the calculation of CQI/PMI conditioned on the last reported RI and CRI, in the absence of a last reported RI and CRI, the UE shall conduct the CQI/PMI calculation conditioned on the lowest possible RI associated with the lowest possible CRI and as given by the bitmap parameter codebookSubsetRestriction and the parameter alternativeCodeBookEnabledFor4TX-r12 if configured. If reporting for more than one CSI subframe set is configured, CQI/PMI is conditioned on the last reported RI associated with the last reported CRI and linked to the same subframe set as the CSI report otherwise, For the calculation of CQI/PMI conditioned on the last reported RI, in the absence of a last reported RI the UE shall conduct the CQI/PMI calculation conditioned on the lowest possible RI as given by the bitmap parameter codebookSubsetRestriction and the parameter alternativeCodeBookEnabledFor4TX-r12 if configured. If reporting for more than one CSI subframe set is configured, CQI/PMI is conditioned on the last reported RI linked to the same subframe set as the CSI report.

For a non-BL/CE UE, the periodic CSI reporting modes are described as following:

< . . .>

Mode 2-1 description:

In the subframe where RI is reported for transmission mode 4, transmission mode 8 except with alternativeCodeBookEnabledFor4TX-r12=TRUE configured, transmission modes 9 and 10 with 2 CSI-RS ports, and transmission modes 9 and 10 with 4 CSI-RS ports except with alternativeCodeBookEnabledFor4TX-r12=TRUE configured, and for transmission modes 9 and 10 with higher layer parameter eMIMO-Type configured, eMIMO-Type set to 'CLASS B', one CSI-RS resource configured, with higher layer parameter alternativeCodebookEnabledCLASSB_K1=TRUE:

If a UE is configured with CRI reporting,

If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the last reported periodic CRI.

otherwise,

If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands.

The UE shall report a type 3 report consisting of one RI.

In the subframe where RI and PTI are reported, for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting then:

If a UE is configured with CRI reporting,

If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the last reported periodic CRI.

If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI) conditioned on the last reported periodic CRI.

otherwise,

If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands.

If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI).

The PTI for the CSI process shall be equal to 1 if the RI reported jointly with the PTI is greater than 2 for transmission modes 8, 9, 10 with alternativeCodeBookEnabledFor4TX-r12=TRUE configured.

The UE shall report a type 6 report consisting of one RI and the PTI.

In the subframe where RI and CRI is reported for transmission modes 9 and 10 with parameter eMIMO-Type configured by higher layers, and eMIMO-Type is set to 'CLASS B', and the number of configured CSI-RS resources is more than one:
   A UE shall determine a CRI assuming transmission on set S subbands.
   If a UE is configured in transmission mode 10 with a 'RI-reference CSI process' for a CSI process, the RI for the CSI process shall be the same as the RI in the most recent CSI report comprising RI for the configured 'RI-reference CSI process' irrespective of subframe sets if configured; otherwise, the UE shall determine a RI assuming transmission on set S subbands conditioned on the reported CRI for the CSI process.
   If each of the maximum number of ports in the configured CSI-RS resources is 2, or 4 except with alternativeCodeBookEnabledFor4TX-r12=TRUE configured,
     The UE shall report a type 7 report consisting of one RI and one CRI.
   otherwise,
     If a UE is configured in transmission mode 10 with a 'RI-reference CSI process' for a CSI process, the PTI for the CSI process shall be the same as the PTI in the most recent type 6 report for the configured 'RI-reference CSI process'; otherwise, the UE shall determine a precoder type indication (PTI) conditioned on the reported CRI for the CSI process.
     If the configured CSI-RS resource corresponding to the determined CRI comprises 2 CSI-RS ports or 4 CSI-RS ports except with alternativeCodeBookEnabledFor4TX-r12=TRUE configured, PTI is fixed to zero.
     The PTI for the CSI process shall be equal to 1 if the RI reported jointly with the PTI is greater than 2 for transmission modes 9, 10 with alternativeCodeBookEnabledFor4TX-r12=TRUE configured.
     The UE shall report a type 9 report consisting of one CRI, RI, and the PTI.

In the subframe where wideband CQI/PMI is reported for all transmission modes except with
   UE is configured with higher layer parameter eMIMO-Type, and eMIMO-Type is set to 'CLASS A', or
   8 CSI-RS ports configured for transmission modes 9 and 10, or with alternativeCodeBookEnabledFor4TX-r12=TRUE configured for transmission modes 8, 9 and 10, if the UE is not configured with higher layer parameter eMIMO-Type, or UE is configured with CRI reporting, or UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured:
     A single precoding matrix is selected from the codebook subset assuming transmission on set S subbands.
     A UE shall report a type 2 report on each respective successive reporting opportunity consisting of:
        A wideband CQI value which is calculated assuming the use of a single precoding matrix in all subbands and transmission on set S subbands.
        The selected single PMI (wideband PMI).
        When RI>1, an additional 3-bit wideband spatial differential CQI, which is shown in FIG. 13 (a reproduction of Table 7.2-2 from 3GPP TR 36.211 V13.1.0).
   If the UE is configured with CRI reporting,
     If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the PMI and CQI values for the CSI process are calculated conditioned on the reported periodic RI for the configured 'RI-reference CSI process' in the most recent RI reporting instance for the CSI process and the last reported periodic CRI for the CSI process; otherwise the PMI and CQI values are calculated conditioned on the last reported periodic RI and the last reported periodic CRI.
   otherwise,
     For transmission modes 4, 8, 9 and 10,
        If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the PMI and CQI values for the CSI process are calculated conditioned on the reported periodic RI for the configured 'RI-reference CSI process' in the most recent RI reporting instance for the CSI process; otherwise the PMI and CQI values are calculated conditioned on the last reported periodic RI.
     For other transmission modes the PMI and CQI values are calculated conditioned on transmission rank 1.
In the subframe where the wideband first PMI is reported for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:
   A set of precoding matrices corresponding to the wideband first PMI is selected from the codebook subset assuming transmission on set S subbands.

A UE shall report a type 2a report on each respective successive reporting opportunity consisting of the wideband first PMI corresponding to the selected set of precoding matrices.

If the UE is configured with CRI reporting,
  If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, the wideband first PMI value for the CSI process is calculated conditioned on the reported periodic RI for the configured 'RI-reference CSI process' in the most recent RI reporting instance for the CSI process and the last reported periodic CRI for the CSI process; otherwise with the last reported PTI=0, the wideband first PMI value is calculated conditioned on the last reported periodic RI and the last reported periodic CRI.

otherwise,
  If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, the wideband first PMI value for the CSI process is calculated conditioned on the reported periodic RI for the configured 'RI-reference CSI process' in the most recent RI reporting instance for the CSI process; otherwise with the last reported PTI=0, the wideband first PMI value is calculated conditioned on the last reported periodic RI.

In the subframe where wideband CQI/second PMI is reported, for transmission modes 9 and 10 with 8 CSI-RS ports configured and higher layer parameter eMIMO-Type not configured, or for transmission modes 9 and 10 with 8 CSI-RS ports or 4 CSI-RS ports with alternativeCodeBookEnabledFor4TX-r12=TRUE in the selected CSI-RS resource and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9, and 10 with alternativeCodeBookEnabledFor4TX-r12=TRUE configured without CRI reporting:

A single precoding matrix is selected from the codebook subset assuming transmission on set S subbands.

A UE shall report a type 2b report on each respective successive reporting opportunity consisting of:
  A wideband CQI value which is calculated assuming the use of the selected single precoding matrix in all subbands and transmission on set S subbands.
  The wideband second PMI corresponding to the selected single precoding matrix.

When RI>1, an additional 3-bit wideband spatial differential CQI, which is shown in FIG. 13 (a reproduction of Table 7.2-2 from 3GPP TR 36.211 V13.1.0).

If the UE is configured with CRI reporting,
  If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process, The wideband second PMI value for the CSI process is calculated conditioned on the reported periodic RI for the configured 'RI-reference CSI process' in the most recent RI reporting instance for the CSI process and the last reported wideband first PMI for the CSI process and the last reported periodic CRI for the CSI process, The wideband CQI value is calculated conditioned on the selected precoding matrix for the CSI process and the reported periodic RI for the configured 'RI-reference CSI process' in the most recent RI reporting instance for the CSI process and the last reported periodic CRI for the CSI process.

Otherwise, with the last reported PTI=1,
The wideband second PMI value is calculated conditioned on the last reported periodic RI and the wideband first PMI and the last reported periodic CRI.
The wideband CQI value is calculated conditioned on the selected precoding matrix and the last reported periodic RI and the last reported periodic CRI.

otherwise,
  If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process, The wideband second PMI value for the CSI process is calculated conditioned on the reported periodic RI for the configured 'RI-reference CSI process' in the most recent RI reporting instance for the CSI process and the last reported wideband first PMI for the CSI process, The wideband CQI value is calculated conditioned on the selected precoding matrix for the CSI process and the reported periodic RI for the configured 'RI-reference CSI process' in the most recent RI reporting instance for the CSI process.

Otherwise, with the last reported PTI=1,
The wideband second PMI value is calculated conditioned on the last reported periodic RI and the wideband first PMI.
The wideband CQI value is calculated conditioned on the selected precoding matrix and the last reported periodic RI.

If the last reported first PMI was computed under an RI assumption that differs from the last reported periodic RI, or in the absence of a last reported first PMI, the conditioning of the second PMI value is not specified.

In the subframe where CQI for the selected subband is reported for all transmission modes except with
- UE is configured with higher layer parameter eMIMO-Type, and eMIMO-Type is set to 'CLASS A', or
- 8 CSI-RS ports configured for transmission modes 9 and 10, or with alternativeCodeBookEnabledFor4TX-r12=TRUE configured for transmission modes 8, 9 and 10, if the UE is not configured with higher layer parameter eMIMO-Type, or UE is configured with CRI reporting, or UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured:

The UE shall select the preferred subband within the set of $N_j$ subbands in each of the J bandwidth parts where J is given in FIG. 25 (a reproduction of Table 7.2.2-2 from 3GPP TR 36.211 V13.1.0).

The UE shall report a type 1 report per bandwidth part on each respective successive reporting opportunity consisting of:

CQI value for codeword 0 reflecting transmission only over the selected subband of a bandwidth part determined in the previous step along with the corresponding preferred subband L-bit label.

When RI>1, an additional 3-bit subband spatial differential CQI value for codeword 1 offset level Codeword 1 offset level=subband CQI index for codeword 0−subband CQI index for codeword 1.

Assuming the use of the most recently reported single precoding matrix in all subbands and transmission on the selected subband within the applicable bandwidth part.

The mapping from the 3-bit subband spatial differential CQI value to the offset level is shown in FIG. 13 (a reproduction of Table 7.2-2 from 3GPP TR 36.211 V13.1.0).

If the UE is configured with CRI reporting,
F If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the subband selection and CQI values for the CSI process are calculated conditioned on the last reported periodic wideband PMI for the CSI process and the reported periodic RI for the configured 'RI-reference CSI process' in the most recent RI reporting instance for the CSI process and the last reported periodic CRI for the CSI process; otherwise the subband selection and CQI values are calculated conditioned on the last reported periodic wideband PMI, RI and CRI.

otherwise,
For transmission modes 4, 8, 9 and 10,
If a UE is configured in transmission mode 10 with a 'RI-reference CSI process' for a CSI process, and the most recent type 3 report for the CSI process is dropped, and a type 3 report for the 'RI-reference CSI process' is reported in the most recent RI reporting instance for the CSI process, the subband selection and CQI values for the CSI process are calculated conditioned on the last reported periodic wideband PMI for the CSI process and the reported periodic RI for the configured 'RI-reference CSI process' in the most recent RI reporting instance for the CSI process; otherwise the subband selection and CQI values are calculated conditioned on the last reported periodic wideband PMI and RI.

For other transmission modes the subband selection and CQI values are calculated conditioned on the last reported PMI and transmission rank 1.

In the subframe where wideband CQI/second PMI is reported, for transmission modes 9 and 10 with 8 CSI-RS ports configured and higher layer parameter eMIMO-Type not configured, or for transmission modes 9 and 10 with 8 CSI-RS ports configured and UE is configured with CRI reporting, or for transmission modes 9 and 10 with 8 CSI-RS ports or 4 CSI-RS ports with alternativeCodeBookEnabledFor4TX-r12=TRUE in the selected CSI-RS resource and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:

A single precoding matrix is selected from the codebook subset assuming transmission on set S subbands.

The UE shall report a type 2b report on each respective successive reporting opportunity consisting of:

A wideband CQI value which is calculated assuming the use of the selected single precoding matrix in all subbands and transmission on set S subbands.

The wideband second PMI corresponding to the selected single precoding matrix.

When RI>1, an additional 3-bit wideband spatial differential CQI, which is shown in FIG. 13 (a reproduction of Table 7.2-2 from 3GPP TR 36.211 V13.1.0).

If the UE is configured with CRI reporting,
If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, The wideband second PMI value for the CSI process is calculated conditioned on the reported periodic RI for the configured 'RI-reference CSI process' in the most recent RI reporting instance for the CSI process and the last reported wideband first PMI for the CSI process and the last reported periodic CRI for the CSI process.

The wideband CQI value is calculated conditioned on the selected precoding matrix for the CSI process and the reported periodic RI for the configured 'RI-reference CSI process' in the most recent RI reporting instance for the CSI process and the last reported periodic CRI for the CSI process.

otherwise, with the last reported PTI=0,

The wideband second PMI value is calculated conditioned on the last reported periodic RI and the wideband first PMI and the last reported periodic CRI.

The wideband CQI value is calculated conditioned on the selected preceding matrix and the last reported periodic RI process and the last reported periodic CRI.

otherwise,

If a UE is configured in transmission mode 10 with a 'RI-reference CSI process' for a CSI process, and the most recent type 6 report for the CSI process is dropped, and a type 6 report for the 'RI-reference CSI process' with PTI=0 is reported in the most recent RI reporting instance for the CSI process, The wideband second PMI value for the CSI process is calculated conditioned on the reported periodic RI for the configured 'RI-reference CSI process' in the most recent RI reporting instance for the CSI process and the last reported wideband first PMI for the CSI process.

The wideband CQI value is calculated conditioned on the selected precoding matrix for the CSI process and the reported periodic RI for the configured 'RI-reference CSI process' in the most recent RI reporting instance for the CSI process.

Otherwise, with the last reported PTI=0,

The wideband second PMI value is calculated conditioned on the last reported periodic RI and the wideband first PMI.

The wideband CQI value is calculated conditioned on the selected preceding matrix and the last reported periodic RI.

If the last reported first PMI was computed under an RI assumption that differs from the last reported periodic RI, or in the absence of a last reported first PMI, the conditioning of the second PMI value is not specified.

In the subframe where subband CQI/second PMI for the selected subband is reported, for transmission modes 9 and 10 with 8 CSI-RS ports or 4 CSI-RS ports with alternativeCodeBookEnabledFor4TX-r12=TRUE in the selected CSI-RS resource and higher layer parameter eMIMO-Type not configured, or for transmission modes 9 and 10 with 8 CSI-RS ports configured and UE is configured with CRI reporting, or for transmission modes 9 and 10 with 8 CSI-RS ports configured and UE is configured with higher layer parameter eMIMO-Type, and eMIMO-Type is set to 'CLASS B', and one CSI-RS resource configured, and except with higher layer parameter alternativeCodebookEnabledCLASSB_K1=TRUE configured, or for transmission modes 9 and 10 with higher layer parameter eMIMO-Type configured, and eMIMO-Type set to 'CLASS A', or for transmission modes 8, 9 and 10 with alternativeCodeBookEnabledFor4TX-r12=TRUE configured without CRI reporting:

The UE shall select the preferred subband within the set of $N_j$ subbands in each of the J bandwidth parts where J is given in FIG. 25 (a reproduction of Table 7.2.2-2 from 3GPP TR 36.211 V13.1.0).

The UE shall report a type 1a report per bandwidth part on each respective successive reporting opportunity consisting of:

CQI value for codeword 0 reflecting transmission only over the selected subband of a bandwidth part determined in the previous step along with the corresponding preferred subband L-bit label.

When RI>1, an additional 3-bit subband spatial differential CQI value for codeword 1 offset level Codeword 1 offset level=subband CQI index for codeword 0−subband CQI index for codeword 1.

Assuming the use of the preceding matrix corresponding to the selected second PMI and the most recently reported first PMI and transmission on the selected subband within the applicable bandwidth part.

The mapping from the 3-bit subband spatial differential CQI value to the offset level is shown in FIG. 13 (a reproduction of Table 7.2-2 from 3GPP TR 36.211 V13.1.0).

A second PMI of the preferred precoding matrix selected from the codebook subset assuming transmission only over the selected subband within the applicable bandwidth part determined in the previous step.

If the UE is configured with CRI reporting,

If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process.

The subband second PMI values for the CSI process are calculated conditioned on the reported periodic RI for the configured 'RI-reference CSI process' in the most recent RI reporting instance for the CSI process and the last reported wideband first PMI for the CSI process and the last reported periodic CRI for the CSI process.

The subband selection and CQI values are calculated conditioned on the selected precoding matrix for the CSI process and the reported periodic RI for the configured 'RI-reference CSI process' in the most recent RI reporting instance for the CSI process and the last reported periodic CRI for the CSI process.

Otherwise, with the last reported PTI=1
  The subband second PMI values are calculated conditioned on the last reported periodic RI and the wideband first PMI and the last reported periodic CRI.
  The subband selection and CQI values are calculated conditioned on the selected precoding matrix and the last reported periodic RI and the last reported periodic CRI.
otherwise,
  If a UE is configured in transmission mode 10 with a 'RI-reference CSI process' for a CSI process, and the most recent type 6 report for the CSI process is dropped, and a type 6 report for the 'RI-reference CSI process' with PTI=1 is reported in the most recent RI reporting instance for the CSI process,
    The subband second PMI values for the CSI process are calculated conditioned on the reported periodic RI for the configured 'RI-reference CSI process' in the most recent RI reporting instance for the CSI process and the last reported wideband first PMI for the CSI process.
    The subband selection and CQI values are calculated conditioned on the selected precoding matrix for the CSI process and the reported periodic RI for the configured 'RI-reference CSI process' in the most recent RI reporting instance for the CSI process.
  Otherwise, with the last reported PTI=1
    The subband second PMI values are calculated conditioned on the last reported periodic RI and the wideband first PMI.
    The subband selection and CQI values are calculated conditioned on the selected precoding matrix and the last reported periodic RI.
  If the last reported first PMI was computed under an RI assumption that differs from the last reported periodic RI, or in the absence of a last reported first PMI, the conditioning of the second PMI value is not specified.

7.2.3 Channel Quality Indicator (CQI) Definition

The CQI indices and their interpretations are given in FIG. 28 (a reproduction of Table 7.2.3-1 from 3GPP TR 36.211 V13.1.0) for reporting CQI based on QPSK, 16QAM and 64QAM. The CQI indices and their interpretations are given in Table 7.2.3-2 for reporting CQI based on QPSK, 16QAM, 64QAM and 256QAM. The CQI indices and their interpretations are given in Table 7.2.3-3 for reporting CQI based on QPSK and 16QAM.

For a non-BL/CE UE, based on an unrestricted observation interval in time unless specified otherwise in this subclause, and an unrestricted observation interval in frequency, the UE shall derive for each CQI value reported in uplink subframe n the highest CQI index between 1 and 15 in FIG. 28 (a reproduction of Table 7.2.3-1 from 3GPP TR 36.211 V13.1.0) or Table 7.2.3-2 which satisfies the following condition, or CQI index 0 if CQI index 1 does not satisfy the condition:
  A single PDSCH transport block with a combination of modulation scheme and transport block size corresponding to the CQI index, and occupying a group of downlink physical resource blocks termed the CSI reference resource, could be received with a transport block error probability not exceeding 0.1.

For a BL/CE UE, based on an unrestricted observation interval in time and frequency, the UE shall derive for each CQI value the highest CQI index between 1 and 10 in Table 7.2.3-3 which satisfies the following condition, or CQI index 0 if CQI index 1 does not satisfy the condition:
  A single PDSCH transport block with a combination of modulation scheme and transport block size corresponding to the CQI index, and occupying a group of downlink physical resource blocks termed the CSI reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers and parameter eMIMO-Type is not configured by higher layers, the UE shall derive the channel measurements for computing the CQI value reported in uplink subframe n based on only the Channel-State information (CSI) reference signals (CSI-RS) defined in [3] for which the UE is configured to assume non-zero power for the CSI-RS. For a non-BL/CE UE in transmission mode 9 when the parameter pmi-RI-Report is not configured by higher layers or in transmission modes 1-8 the UE shall derive the channel measurements for computing CQI based on CRS. For a BL/CE UE the UE shall derive the channel measurements for computing CQI based on CRS.

For a UE in transmission mode 10, when parameter eMIMO-Type is not configured by higher layers, the UE shall derive the channel measurements for computing the CQI value reported in uplink sublimate n and corresponding to a CSI process, based on only the iron-zero power CSI-RS (defined in [3]) within a configured CSI-RS resource associated with the CSI process.

For a UE in transmission mode 9 and the UE configured with parameter eMIMO-Type by higher layers, the term 'CSI process' in this clause refers to the CSI configured for the UE.

For a UE in transmission mode 9 or 10 and for a CSI process, if the UE is configured with parameter eMIMO-Type by higher layers, and eMIMO-Type is set to 'CLASS A', and one CSI-RS resource configured, or the UE is configured with parameter eMIMO-Type by higher layers, and eMIMO-Type is set to 'CLASS B', and parameter channelMeasRestriction is not configured by higher layers, the UE shall derive the channel measurements for computing the CQI value reported in uplink subframe n and corresponding to the CSI process, based on only the non-zero power CSI-RS (defined in [3]) within a configured CSI-RS resource associated with the CSI process. If the UE is configured with parameter CSI-Reporting-Type by higher layers, and CSI-Reporting-Type is set to 'CLASS B' and the number of configured CSI-RS resources is K>1, and parameter channelMeasRestriction is not configured by higher layers, the UE shall derive the channel measurements for computing the CQI value using only the configured CSI-RS resource indicated by the CRI.

For a UE in transmission mode 9 or 10 and for a CSI process, if the UE is configured with parameter eMIMO- Type by higher layers, and eMIMO-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS (defined in [3]) within a configured CSI-RS resource associated with the CSI process. If the UE is configured with parameter CSI-Reporting-Type by higher layers, and CSI-Reporting-Type is set to 'CLASS B' and the number of configured CSI-RS resources is K>1, and parameter channelMeasRestriction is configured by higher layers, the UE shall derive the channel measurements for computing the CQI value using only the most recent, no later than the CSI reference resource, non-zero power CSI-RS within the configured CSI-RS resource indicated by the CRI.

For a UE in transmission mode 10, when parameter eMIMO-Type is not configured by higher layers, the UE shall derive the interference measurements for computing the CQI value reported in uplink subframe n and corresponding to a CSI process, based on only the configured CSI-IM resource associated with the CSI process.

For a UE in transmission mode 10 and for a CSI process, when parameters eMIMO-Type and interferenceMeasRestriction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process. If the UE is configured with parameter CSI-Reporting-Type by higher layers, and CSI-Reporting-Type is set to 'CLASS B' and the number of configured CSI-RS resources is K>1, and interferenceMeasRestriction is configured, the UE shall derive interference measurement for computing the CQI value based on only the most recent, no later than the CSI reference resource, the configured CSI-IM resource associated with the CSI-RS resource indicated by the CRI. If interferenceMeasRestriction is not configured, the UE shall derive the interference measurement for computing the CQI value based on the CSI-IM associated with the CSI-RS resource indicated by the CRI.

If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement.

For a UE configured with the parameter EIMTA-MainConfigServCell-r12 for a serving cell, configured CSI-IM resource(s) within only downlink subframe(s) of a radio frame that are indicated by UL/DL configuration of the serving cell can be used to derive the interference measurement for the serving cell.

For a LAA Scell,
for channel measurements, if the UE averages CRS/CSI-RS measurements from multiple subframes
the UE should not average CSI-RS measurement in subframe n1 with CSI-RS measurement in a later subframe n2, if any OFDM symbol of subframe n1 or any subframe from subframe n1+1 to subframe n2, is not occupied.
the UE should not average CRS measurement in subframe n1 with CRS measurement in a later subframe n2, if any OFDM symbol of the second slot of subframe n1 or any OFDM symbol of any subframe from subframe n1+1 to subframe n2−1, or any of the first 3 OFDM symbols in subframe n2, is not occupied.

for interference measurements, the UE shall derive the interference measurements for computing the CQI value based on only measurements in subframes with occupied OFDM symbols.

A combination of modulation scheme and transport block size corresponds to a CQI index if:
the combination could be signalled for transmission on the PDSCH in the CSI reference resource according to the relevant Transport Block Size table, and
the modulation scheme is indicated by the CQI index, and
the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource for a serving cell is defined as follows:
For a non-BL/CE UE, in the frequency domain, the CSI reference resource is defined by the group of downlink physical resource blocks corresponding to the band to which the derived CQI value relates. For a BL/CE UE, in the frequency domain, the CSI reference resource includes all downlink physical resource blocks for any of the narrowband to which the derived CQI value relates.

In the time domain and for a non-BL/CE UE,
for a UE configured in transmission mode 1-9 or transmission mode 10 with a single configured CSI process for the serving cell, the CSI reference resource is defined by a single downlink or special subframe $n-n_{CQI\_ref}$,
where for periodic CSI reporting $n_{CQI\_ref}$ is the smallest value greater than or equal to 4, such that it corresponds to a valid downlink or valid special subframe,
where for aperiodic CSI reporting, if the UE is not configured with the higher layer parameter csi-SubframePatternConfig-r12,
$n_{CQI\_ref}$ is such that the reference resource is in the same valid downlink or valid special subframe as the corresponding CSI request in an uplink DCI format.
$n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant.
where for aperiodic CSI reporting, and the UE configured with the higher layer parameter csi-SubframePatternConfig-r12,
for the UE configured in transmission mode 1-9, $n_{CQI\_ref}$ is the smallest value greater than or equal to 4 and subframe $n-n_{CQI\_ref}$ corresponds to a valid downlink or valid special subframe, where subframe $n-n_{CQI\_ref}$ is received on or after the subframe with the corresponding CSI request in an uplink DCI format;
$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in an Random Access Response Grant;
if there is no valid value for $n_{CQI\_ref}$ based on the above conditions, then $n_{CQI\_ref}$ is the smallest value such that the reference resource is in a valid downlink or valid special subframe $n-n_{CQI\_ref}$ prior to the subframe with the corresponding CSI request, where subframe $n-n_{CQI\_ref}$ is the lowest indexed valid downlink or valid special subframe within a radio frame;

for the UE configured in transmission mode 10,
$n_{CQI\_ref}$ is the smallest value greater than or equal to 4, such that it corresponds to a valid downlink or valid special subframe, and the corresponding CSI request is in an uplink DCI format;

$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in a Random Access Response Grant;

for a UE configured in transmission mode 10 with multiple configured CSI processes for the serving cell, the CSI reference resource for a given CSI process is defined by a single downlink or special subframe $n-n_{CQI\_ref}$,
where for FDD serving cell and periodic or aperiodic CSI reporting $n_{CQI\_ref}$ is the smallest value greater than or equal to 5, such that it corresponds to a valid downlink or valid special subframe, and for aperiodic CSI reporting the corresponding CSI request is in an uplink DCI format;
where for FDD serving cell and aperiodic CSI reporting $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.
where for TDD serving cell, and 2 or 3 configured CSI processes, and periodic or aperiodic CSI reporting, $n_{CQI\_ref}$ is the smallest value greater than or equal to 4, such that it corresponds to a valid downlink or valid special subframe, and for aperiodic CSI reporting the corresponding CSI request is in an uplink DCI format;
where for TDD serving cell, and 2 or 3 configured CSI processes, and aperiodic CSI reporting, $n_{CQI\_ref}$ is equal to 4 and subframe $n-n_{CQI\_ref}$ corresponds to a valid downlink or valid special subframe, where subframe $n-n_{CQI\_ref}$ is received after the sublimate with the corresponding CSI request in a Random Access Response Grant;
where for TDD serving cell, and 4 configured CSI processes, and periodic or aperiodic CSI reporting, $n_{CQI\_ref}$ is the smallest value greater than or equal to 5, such that it corresponds to a valid downlink or valid special subframe, and for aperiodic CSI reporting the corresponding CSI request is in an uplink DCI format;
where for TDD serving cell, and 4 configured CSI processes, and aperiodic CSI reporting, $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

In the time domain and for a BL/CE UE, the CSI reference resource is defined by a set of $R^{CSI}$ BL/CE consecutive downlink or special subframes where the last subframe is subframe $n-n_{CQI\_ref}$,
where for periodic CSI reporting $n_{CQI\_ref}$ is $\geq 4$;
where for aperiodic CSI reporting $n_{CQI\_ref}$ is $\geq 4$;
where each subframe in the CSI reference resource is a valid downlink or valid special subframe;
where $R^{CSI}$ is given by the higher layer parameter csi-NumRepetitionCE.

A subframe in a serving cell shall be considered to be a valid downlink or a valid special subframe if:
it is configured as a downlink subframe or a special subframe for that UE, and
in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and
except for a non-BL/CE UE in transmission mode 9 or 10, it is not an MBSFN subframe, and
it does not contain a DwPTS field in case the length of DwPTS is $7680 \cdot T_s$ and less, and
it does not fall within a configured measurement gap for that UE, and
for periodic CSI reporting, it is an element of the CSI subframe set linked to the periodic CSI report when that UE is configured with CSI subframe sets, and
for a UE configured in transmission mode 10 with multiple configured CSI processes, and aperiodic CSI reporting for a CSI process, it is an element of the CSI subframe set linked to the downlink or special subframe with the corresponding CSI request in an uplink DCI format, when that UE is configured with CSI subframe sets for the CSI process and UE is not configured with the higher layer parameter csi-SubframePatternConfig-r12, and
for a UE configured in transmission mode 1-9, and aperiodic CSI reporting, it is an element of the CSI subframe set associated with the corresponding CSI request in an uplink DCI format, when that UE is configured with CSI subframe sets by the higher layer parameter csi-SubframePatternConfig-r12, and
for a UE configured in transmission mode 10, and aperiodic CSI reporting for a CSI process, it is an element of the CSI subframe set associated with the corresponding CSI request in an uplink DCI format, when that UE is configured with CSI subframe sets by the higher layer parameter csi-SubframePatternConfig-r12 for the CSI process.
except if the serving cell is a LAA Scell, and at least one OFDM symbol in the subframe is not occupied.
except if the serving cell is a LAA Scell, and $n'_s \neq n_s$ as described in sub clause 6.10.1.1 in [3].
except if the serving cell is a LAA Scell, and for a UE configured in transmission mode 9 or 10, the configured CSI-RS resource associated with the CSI process is not in the subframe.

For a non-BL/CE UE, if there is no valid downlink or no valid special subframe for the CSI reference resource in a serving cell, CSI reporting is omitted for the serving cell in uplink subframe n.

In the layer domain, the CSI reference resource is defined by any RI and PMI on which the CQI is conditioned.

In the CSI reference resource, the UE shall assume the following for the purpose of deriving the CQI index, and if also configured, PMI and RI:

The first 3 OFDM symbols are occupied by control signalling

No resource elements used by primary or secondary synchronization signals or PBCH or EPDCCH CP length of the non-MBSFN subframes Redundancy Version 0

If CSI-RS is used for channel measurements, the ratio of PDSCH EPRE to CSI-RS EPRE is as given in subclause 7.2.5

For transmission mode 9 CSI reporting of a non-BL/CE UE:

CRS REs are as in non-MBSFN subframes;

If the UE is configured for PMI/RI reporting or without PMI reporting, the UE-specific reference signal overhead is consistent with the most recent reported rank if more than one CSI-RS port is configured, and is consistent with rank 1 transmission if only one CSI-RS port is configured; and PDSCH signals on antenna ports $\{7 \ldots 6+\upsilon\}$ for $\upsilon$ layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in subclause 6.3.3.2 of [3], $P \in \{1, 2, 4, 8, 12, 16\}$ is the number of CSI-RS ports configured, and if only one CSI-RS port is configured, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports $\{15 \ldots 14+P\}$ would have a ratio of EPRE to CSI-RS EPRE equal to the ratio given in subclause 7.2.5.

For transmission mode 10 CSI reporting, if a CSI process is configured without PMI/RI reporting:

If the number of antenna ports of the associated CSI-RS resource is one, a PDSCH transmission is on single-antenna port, port 7. The channel on antenna port $\{7\}$ is inferred from the channel on antenna port $\{15\}$ of the associated CSI-RS resource.

CRS REs are as in non-MBSFN subframes. The CRS overhead is assumed to be the same as the CRS overhead corresponding to the number of CRS antenna ports of the serving cell;

The UE-specific reference signal overhead is 12 REs per PRB pair.

Otherwise,

If the number of antenna ports of the associated CSI-RS resource is 2, the PDSCH transmission scheme assumes the transmit diversity scheme defined in subclause 7.1.2 on antenna ports $\{0, 1\}$ except that the channels on antenna ports $\{0, 1\}$ are inferred from the channels on antenna port $\{15, 16\}$ of the associated CSI resource respectively.

If the number of antenna ports of the associated CSI-RS resource is 4, the PDSCH transmission scheme assumes the transmit diversity scheme defined in subclause 7.1.2 on antenna ports $\{0, 1, 2, 3\}$ except that the channels on antenna ports $\{0, 1, 2, 3\}$ are inferred from the channels on antenna ports $\{15, 16, 17, 18\}$ of the associated CSI-RS resource respectively.

The UE is not expected to be configured with more than 4 antenna ports for the CSI-RS resource associated with the CSI process configured without PMI/RI reporting.

The overhead of CRS REs is assuming the same number of antenna ports as that of the associated CSI-RS resource.

UE-specific reference signal overhead is zero.

For transmission mode 10 CSI reporting, if a CSI process is configured with PMI/RI reporting or without PMI reporting:

CRS REs are as in non-MBSFN subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports $\{7 \ldots 6+\upsilon\}$ for $\upsilon$ layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in subclause 6.3.3.2 of [3], $P \in \{1, 2, 4, 8, 12, 16\}$ is the number of antenna ports of the associated CSI-RS resource, and if P=1, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports $\{15 \ldots 14+P\}$ would have a ratio of EPRE to CSI-RS EPRE equal to the ratio given in subclause 7.2.5

Assume no REs allocated for CSI-RS and zero-power CSI-RS

Assume no REs allocated for PRS

The PDSCH transmission scheme given by FIG. 27 (a reproduction of Table 7.2.3-0 from 3GPP TR 36.211 V13.1.0) depending on the transmission mode currently configured for the UE (which may be the default mode).

If CRS is used for channel measurements, the ratio of PDSCH EPRE to cell-specific RS EPRE is as given in subclause 5.2 with the exception of $\rho_A$ which shall be assumed to be $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one;

$\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

< . . . >

7.2.4 Precoding Matrix Indicator (PMI) Definition

For transmission modes 4, 5 and 6, precoding feedback is used for channel dependent codebook based precoding and relies on UEs reporting precoding matrix indicator (PMI). For transmission mode 8, the UE shall report PMI if configured with PMI/RI reporting. For transmission modes 9 and 10, the non-BL/CE UE shall report PMI if configured with PMI/RI reporting and the number of CSI-RS ports is larger than 1. A UE shall report PMI based on the feedback modes described in 7.2.1 and 7.2.2. For other transmission modes, PMI reporting is not supported.

For 2 antenna ports, except with UE configured with higher layer parameter eMIMO-Type, and eMIMO-Type is set to 'CLASS B', and one CSI-RS resource configured, and higher layer parameter alternativeCodebookEnabledCLASSB_K1=TRUE, each PMI value corresponds to a codebook index given in Table 6.3.4.2.3-1 of [3] as follows:

For 2 antenna ports $\{0, 1\}$ or $\{15, 16\}$ and an associated RI value of 1, a PMI value of $n \in \{0, 1, 2, 3\}$ corresponds to the codebook index n given in Table 6.3.4.2.3-1 of [3] with $\upsilon = 1$.

For 2 antenna ports $\{0, 1\}$ or $\{15, 16\}$ and an associated RI value of 2, a PMI value of $n \in \{0, 1\}$ corresponds to the codebook index n+1 given in Table 6.3.4.2.3-1 of [3] with $\upsilon = 2$.

For 4 antenna ports $\{0, 1, 2, 3\}$ or $\{15, 16, 17, 18\}$, except with UE configured with higher layer parameter eMIMO-Type, and eMIMO-Type is set to 'CLASS B', and one CSI-RS resource configured, and higher layer parameter alternativeCodebookEnabledCLASSB_K1=TRUE configured, each PMI value corresponds to a codebook index given in Table 6.3.4.2.3-2 of [3] or a pair of codebook indices given in Table 7.2.4-0A, 7.2.4-0B, 7.2.4-0C, or 7.2.4-0D as follows:

A PMI value of $n \in \{0, 1, \ldots, 15\}$ corresponds to the codebook index n given in Table 6.3.4.2.3-2 of [3] with $\upsilon$ equal to the associated RI value except with alternativeCodeBookEnabledFor4TX-r12=TRUE configured.

If alternativeCodeBookEnabledFor4TX-r12=TRUE is configured, each PMI value corresponds to a pair of codebook indices given in Table 7.2.4-0A, 7.2.4-0B, 7.2.4-0C, or 7.2.4-0D, where the quantities $\varphi_n$, $\varphi'_n$, and $\upsilon'_m$ in Table 7.2.4-0A and Table 7.2.4-0B are given by $\varphi_n = e^{j\pi n/2}$ $\varphi'_n = e^{j 2\pi n/32}$ $\upsilon'_m = [1 \ e^{j 2\pi m/32}]^T$ A first PMI value of $i_1 \in \{0, 1, \ldots, f(\upsilon)-1\}$ and a second PMI value of $i_2 \in \{0, 1, \ldots, g(\upsilon)-1\}$ correspond to the codebook indices $i_1$ and $i_2$ respectively given in Table 7.2.4-0j with $\upsilon$ equal to the associated RI value and where $j=\{A, B, C, D\}$ respectively when $\upsilon=\{1, 2, 3, 4\}$, $f(\upsilon)=\{16, 16, 1, 1\}$ and $g(\upsilon)=\{16, 16, 16, 16\}$.

The quantity $W_n^{\{s\}}$ in Table 7.2.4-0C and Table 7.2.4-0D denotes the matrix defined by the columns given by the set $\{s\}$ from the expression $W_n = I - 2u_n u_n^H / u_n^H u_n$ where I is the 4×4 identity matrix and the vector $u_n$ is given by Table 6.3.4.2.3-2 in [3] and $n = i_2$.

In some cases codebook subsampling is supported. The sub-sampled codebook for PUCCH mode 1-1 submode 2 is defined in Table 7.2.2-1G for first and second precoding matrix indicators $i_1$ and $i_2$. Joint encoding of rank and first precoding matrix indicator for PUCCH mode 1-1 submode 1 is defined in Table 7.2.2-1H. The sub-sampled codebook for PUCCH mode 2-1 is defined in Table 7.2.2-1I for PUCCH Reporting Type 1a.

< . . . >

7.2.5 Channel-State Information—Reference Signal (CSI-RS) Definition

For a serving cell and UE configured in transmission mode 9 and not configured with higher layer parameter eMIMO-Type, the UE can be configured with one CSI-RS resource configuration.

For a serving cell and UE configured in transmission mode 9 and configured with higher layer parameter eMIMO-Type, and eMIMO-Type is set to 'CLASS A', the UE can be configured with one CSI-RS resource configuration.

For a serving cell and UE configured in transmission mode 9 and configured with higher layer parameter eMIMO-Type, and eMIMO-Type is set to 'CLASS B', the UE can he configured with one or more CSI-RS resource configuration(s).

For a serving cell and UE configured in transmission mode 10, the UE can be configured with one or more CSI-RS resource configuration(s). The following parameters for which the UE shall assume non-zero transmission power for CSI-RS are configured via higher layer signaling for each CSI-RS resource configuration:

CSI-RS resource configuration identity, if the UE is configured in transmission mode 10, Number of CSI-RS ports. The allowable values and port mapping are given in subclause 6.10.5 of [3].

CSI RS Configuration (see Table 6.10.5.2-1 and Table 6.10.5.2-2 in [3])

CSI RS subframe configuration $I_{CSI-RS}$. The allowable values are given in subclause 6.10.5.3 of [3].

UE assumption on reference PDSCH transmitted power for CSI feedback $P_c$, if the UE is configured in transmission mode 9.

UE assumption on reference PDSCH transmitted power for CSI feedback $P_c$ for each CSI process, if the UE is configured in transmission mode 10. If CSI subframe sets $C_{CSI,0}$ and $C_{CSI,1}$ are configured by higher layers for a CSI process, $P_c$ is configured for each CSI subframe set of the CSI process.

Pseudo-random sequence generator parameter, $n_{ID}$. The allowable values are given in [11].

CDM type parameter, if the UE is configured with higher layer parameter eMIMO-Type, and eMIMO-Type is set to 'CLASS A' for a CSI process. The allowable values are given in subclause 6.10.5.3 of [3].

Higher layer parameter qcl-CRS-Info-r11 for Quasi co-location type B UE assumption of CRS antenna ports and CSI-RS antenna ports with the following parameters, if the UE is configured in transmission mode 10:
qcl-ScramblingIdentity-r11.
crs-PortsCount-r11.
mbsfn-SubframeConfigList-r11.

$P_c$ □ is the assumed ratio of PDSCH EPRE to CSI-RS EPRE when UE derives CSI feedback and takes values in the range of [−8, 15] dB with 1 dB step size, where the PDSCH EPRE corresponds to the symbols for which the ratio of the PDSCH EPRE to the cell-specific RS EPRE is denoted by $\rho_A$, as specified in Table 5.2-2 and Table 5.2-3.

A UE should not expect the configuration of CSI-RS and PMCH in the same subframe of a serving cell.

For frame structure type 2 serving cell and 4 CRS ports, the UE is not expected to receive a CSI RS Configuration index (see Table 6.10.5.2-1 and Table 6.10.5.2-2 in [3]) belonging to the set [20-31] for the normal CP case or the set [16-27] for the extended CP case.

A UE may assume the CSI-RS antenna ports of a CSI-RS resource configuration are quasi co-located (as defined in [3]) with respect to delay spread, Doppler spread, Doppler shift, average gain, and average delay.

A UE in transmission mode 10 and with quasi co-location type B, may assume the antenna ports 0-3 associated with qcl-CRS-Info-r11 corresponding to a CSI-RS resource configuration and antenna ports 15-30 corresponding to the CSI-RS resource configuration are quasi co-located (as defined in [3]) with respect to Doppler shift, and Doppler spread.

A UE configured in transmission mode 10, and configured with higher layer parameter eMIMO-Type, and eMIMO-Type is set to 'CLASS B', and the number of configured CSI-RS resources is more than one for a CSI process, and with quasi co-location type B, is not expected to receive CSI-RS resource configurations for the CSI process that have different values of the higher layer parameter qcl-CRS-Info-r11.

A BL/CE UE configured with CEModeA or CEModeB is not expected to be configured with non-zero transmission power CSI-RS.

7.2.6 Channel-State Information—Interference Measurement (CSI-IM) Resource Definition For a serving cell and UE configured in transmission mode 10, the UE can be configured with one or more CSI-IM resource configuration(s). The following parameters are configured via higher layer signaling for each CSI-IM resource configuration:

Zero-power CSI RS Configuration (see Table 6.10.5.2-1 and Table 6.10.5.2-2 in [3])

Zero-power CSI RS subframe configuration $I_{CSI-RS}$. The allowable values are given in subclause 6.10.5.3 of [3].

For a serving cell, if a UE is not configured with the higher layer parameter csi-SubframePatternConfig-r12, the UE is not expected to receive CSI-IM resource configuration(s) that are not all completely overlapping with one zero-power CSI-RS resource configuration which can be configured for the UE.

A UE is not expected to receive a CSI-IM resource configuration that is not completely overlapping with one of the zero-power CSI-RS resource configurations defined in subclause 7.2.7.

For a serving cell, if a UE is not configured with CSI subframe sets $C_{CSI,0}$ and $C_{CSI,1}$ for any CSI process, and the UE is configured with four CSI-IM resources, then the UE is not expected to be configured with CSI processes that are associated with all of the four CSI-IM resources.

A UE should not expect the configuration of CSI-IM resource and PMCH in the same subframe of a serving cell.

7.2.7 Zero Power CSI-RS Resource Definition

For a serving cell and UE configured in transmission mode 1-9 and UE not configured with csi-SubframePatternConfig-r12 for the serving cell, the UE can be configured with one zero-power CSI-RS resource configuration. For a serving cell and UE configured in transmission mode 1-9 and UE configured with csi-SubframePatternConfig-r12 for the serving cell, the UE can be configured with up to two zero-power CSI-RS resource configurations. For a serving cell and UE configured in transmission mode 10, the UE can be configured with one or more zero-power CSI-RS resource configuration(s).

For a serving cell, the UE can be configured with up to 5 additional zero-power CSI-RS resource configurations according to the higher layer parameter ds-ZeroTxPowerCSI-RS-r12.

The following parameters are configured via higher layer signaling for each zero-power CSI-RS resource configuration:

Zero-power CSI RS Configuration list (16-bit bitmap ZeroPowerCSI-RS in [3])

Zero-power CSI RS subframe configuration $I_{CSI-RS}$. The allowable values are given in subclause 6.10.5.3 of [3].

A UE should not expect the configuration of zero-power CSI-RS and PMCH in the same subframe of a serving cell.

For frame structure type 1 serving cell, the UE is not expected to receive the 16-bit bitmap ZeroPowerCSI-RS with any one of the 6 LSB bits set to 1 for the normal CP case, or with any one of the 8 LSB bits set to 1 for the extended CP case.

For frame structure type 2 serving cell and 4 CRS ports, the UE is not expected to receive the 16-bit bitmap ZeroPowerCSI-RS with any one of the 6 LSB bits set to 1 for the normal CP case, or with any one of the 8 LSB bits set to 1 for the extended CP case.

A BL/CE UE configured with CEModeA or CEModeB is not expected to be configured with zero-power CSI-RS.

In order to maintain a radio link between the UE and the network, a radio link monitoring (RLM) measurement would be performed to guarantee the quality of the serving cell is above certain level, e.g. at least the UE can receive a control channel reliably from the network. The UE would periodically, e.g. every 10 ms, measure a CRS and generate a sample for the RLM, subject to some restrictions, e.g., discontinuous reception (DRX). 3GPP TS 36.213 v13.1.1. and TS 36.133 v13.4.0 are quoted below and provide:

4.2.1 Radio Link Monitoring

The downlink radio link quality of the primary cell shall be monitored by the UE for the purpose of indicating out-of-sync/in-sync status to higher layers.

If the UE is configured with a SCG [11], the downlink radio link quality of the PSCell [11] of the SCG shall be monitored by the UE for the purpose of indicating out-of-sync/in-sync status to higher layers.

In non-DRX mode operation, the physical layer in the UE shall every radio frame assess the radio link quality, evaluated over the previous time period defined in [10], against thresholds ($Q_{out}$ and $Q_{in}$) defined by relevant tests in [10].

In DRX mode operation, the physical layer in the UE shall at least once every DRX period assess the radio link quality, evaluated over the previous time period defined in [10], against thresholds ($Q_{out}$ and $Q_{in}$) defined by relevant tests in [10].

If higher-layer signalling indicates certain subframes for restricted radio link monitoring, the radio link quality shall not be monitored in any subframe other than those indicated.

The physical layer in the UE shall in radio frames where the radio link quality is assessed indicate out-of-sync to higher layers when the radio link quality is worse than the threshold $Q_{out}$.

When the radio link quality is better than the threshold $Q_{in}$, the physical layer in the UE shall in radio frames where the radio link quality is assessed indicate in-sync to higher layers.

< . . . >

7.6 Radio Link Monitoring
7.6.1 Introduction

The UE shall meet the radio link monitoring requirements specified for PSCell in section 7.6 provided that the UE is configured with the parameters T313, N313 and N314 defined in [2].

The UE shall monitor the downlink link quality based on the cell-specific reference signal in order to detect the downlink radio link quality of the PCell and PSCell as specified in [3].

The UE shall estimate the downlink radio link quality and compare it to the thresholds $Q_{out}$ and $Q_{in}$ for the purpose of monitoring downlink radio link quality of the PCell and PSCell.

The threshold $Q_{out}$ is defined as the level at which the downlink radio link cannot be reliably received and shall correspond to 10% block error rate of a hypothetical PDCCH transmission taking into account the PCFICH errors with transmission parameters specified in FIG. 29 (a reproduction of Table 7.6.1-1 from 3GPP TS 36.133 V13.4.0).

The threshold $Q_{in}$ is defined as the level at which the downlink radio link quality can be significantly more reliably received than at $Q_{out}$ and shall correspond to 2% block error rate of a hypothetical PDCCH transmission taking into account the PCFICH errors with transmission parameters specified in FIG. 30 (a reproduction of Table 7.6.1-2 from 3GPP TS 36.133 V13.4.0).

When higher-layer signalling indicates certain subframes for restricted radio link monitoring, the radio link quality shall be monitored as specified in [3].

The requirements in sections 7.6.2.1, 7.6.2.2 and 7.6.2.3 shall also apply when a time domain measurement resource restriction pattern for performing radio link monitoring measurements is configured by higher layers (TS 36.331 [2]), with or without CRS assistance information, provided that also the following additional condition is fulfilled:

The time domain measurement resource restriction pattern figured for the measured cell indicates at least one subframe per radio frame for performing the radio link monitoring measurements, When the CRS assistance information is provided, the transmission bandwidth [30] in all intra-frequency cells in the CRS assistance information [2] is the same or larger than the transmission bandwidth of the PCell for which radio link monitoring is performed.

When the CRS assistance information is provided, the requirements in Section 7.6 shall also be met when the number of transmit antenna ports [16] of one or more cells whose CRS assistance information is provided [2] is different from the number of transmit antenna ports of the cell for which radio link monitoring is performed.

NOTE: If the UE is not provided with the CRS assistance information (TS 36.331 [2]) or the CRS assistance data is not valid throughout the entire evaluation period, then similar Release 8 and 9 requirements apply for time domain measurements restriction under colliding CRS with ABS configured in non-MBSFN subframes.

In addition to guarantee the quality of serving cell, UE may be configured with radio resource management (RRM) measurement, to evaluate the quality of neighbor cell, so as to decide whether the serving cell is a good choice or not. Network may hand over to a UE to another cell if it found another cell is a better choice to serve the UE. UE may be configured with intra-frequency (same frequency as that of serving cell) RRM measurement or inter-frequency (different frequency from that of serving cell) measurement. UE may need a measurement gap for inter-frequency measurement as a center frequency may need to be retuned to the frequency where measurement is perform and data reception may not be available during the gap. Some more details are quotations from 3GPP TS 36.133, 3GPP TS 36.331, and 3GPP TS 36.321 can be found below:

5.5 Measurements
5.5.1 Introduction

The UE reports measurement information in accordance with the measurement configuration as provided by E-UTRAN. E-UTRAN provides the measurement configuration applicable for a UE in RRC_CONNECTED by means of dedicated signalling, i.e. using the RRCConnectionReconfiguration message.

The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-RAT measurements of UTRA frequencies.

Inter-RAT measurements of GERAN frequencies.

Inter-RAT measurements of CDMA2000 HRPD or CDMA2000 1×RTT or WLAN frequencies.

The measurement configuration includes the following parameters:

1. Measurement objects: The objects on which the UE shall perform the measurements.

For intra-frequency and inter-frequency measurements a measurement object is a single E-UTRA carrier frequency. Associated with this carrier frequency, E-UTRAN can configure a list of cell specific offsets, a list of 'blacklisted' cells and a list of 'whitelisted' cells. Blacklisted cells are not considered in event evaluation or measurement reporting.

For inter-RAT UTRA measurements a measurement object is a set of cells on a single UTRA carrier frequency.

For inter-RAT GERAN measurements a measurement object is a set of GERAN carrier frequencies.

For inter-RAT CDMA2000 measurements a measurement object is a set of cells on a single (HRPD or 1×RTT) carrier frequency.

For inter-RAT WLAN measurements a measurement object is a set of WLAN identifiers and optionally a set of WLAN frequencies.

NOTE 1: Some measurements using the above mentioned measurement objects, only concern a single cell, e.g. measurements used to report neighbouring cell system information, PCell UE Rx-Tx time difference, or a pair of cells, e.g. SSTD measurements between the PCell and the PSCell.

2. Reporting configurations: A list of reporting configurations where each reporting configuration consists of the following:
    Reporting criterion: The criterion that triggers the UE to send a measurement report. This can either be periodical or a single event description.
    Reporting format: The quantities that the UE includes in the measurement report and associated information (e.g. number of cells to report).
3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.
4. Quantity configurations: One quantity configuration is configured per RAT type. The quantity configuration defines the measurement quantities and associated filtering used for all event evaluation and related reporting of that measurement type. One filter can be configured per measurement quantity.
5. Measurement gaps: Periods that the UE may use to perform measurements, i.e. no (UL, DL) transmissions are scheduled.

E-UTRAN only configures a single measurement object for a given frequency, i.e. it is not possible to configure two or more measurement objects for the same frequency with different associated parameters, e.g. different offsets and/or blacklists. E-UTRAN may configure multiple instances of the same event e.g. by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects.

Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:
1. The serving cell(s)—these are the PCell and one or more SCells, if configured for a UE supporting CA.
2. Listed cells—these are cells listed within the measurement object(s) or, for inter-RAT WLAN, the WLANs matching the WLAN identifiers configured in the measurement object or the WLAN the UE is connected to.
3. Detected cells—these are cells that are not listed within the measurement object(s) but are detected by the UE on the carrier frequency(ies) indicated by the measurement object(s).

For E-UTRA, the UE measures and reports on the serving cell(s), listed cells, detected cells and, for RSSI and channel occupancy measurements, the UE measures and reports on any reception on the indicated frequency. For inter-RAT UTRA, the UE measures and reports on listed cells and optionally on cells that are within a range for which reporting is allowed by E-UTRAN. For inter-RAT GERAN, the UE measures and reports on detected cells. For inter-RAT CDMA2000, the UE measures and reports on listed cells. For inter-RAT WLAN, the UE measures and reports on listed cells.

NOTE 2: For inter-RAT UTRA and CDMA2000, the UE measures and reports also on detected cells for the purpose of SON.

NOTE 3: This specification is based on the assumption that typically CSG cells of home deployment type are not indicated within the neighbour list. Furthermore, the assumption is that for non-home deployments, the physical cell identity is unique within the area of a large macro cell (i.e. as for UTRAN).

Whenever the procedural specification, other than contained in sub-clause 5.5.2, refers to a field it concerns a field included in the VarMeasConfig unless explicitly stated otherwise i.e. only the measurement configuration procedure covers the direct UE action related to the received measConfig.

5.5.2 Measurement Configuration
5.5.2.1 General
    E-UTRAN applies the procedure as follows:
        to ensure that, whenever the UE has a measConfig, it includes a measObject for each serving frequency;
        to configure at most one measurement identity using a reporting configuration with the purpose set to reportCGI;
        for serving frequencies, set the EARFCN within the corresponding measObject according to the band as used for reception/transmission;
    The UE shall:
    1> if the received measConfig includes the measObjectToRemoveList:
        2> perform the measurement object removal procedure as specified in 5.5.2.4;
    1> if the received measConfig includes the measObjectToAddModList:
        2> perform the measurement object addition/modification procedure as specified in 5.5.2.5;
    1> if the received measConfig includes the reportConfigToRemoveList:
        2> perform the reporting configuration removal procedure as specified in 5.5.2.6;
    1> if the received measConfig includes the reportConfigToAddModList:
        2> perform the reporting configuration addition/modification procedure as specified in 5.5.2.7;
    1> if the received measConfig includes the quantityConfig:
        2> perform the quantity configuration procedure as specified in 5.5.2.8;
    1> if the received measConfig includes the measIdToRemoveList:
        2> perform the measurement identity removal procedure as specified in 5.5.2.2;
    1> if the received measConfig includes the measIdToAddModList:
        2> perform the measurement identity addition/modification procedure as specified in 5.5.2.3;
    1> if the received measConfig includes the measGapConfig:
        2> perform the measurement gap configuration procedure as specified in 5.5.2.9;
    1> if the received measConfig includes the s-Measure:
        2> set the parameter s-Measure within VarMeasConfig to the lowest value of the RSRP ranges indicated by the received value of s-Measure;

1> if the received measConfig includes the preRegistrationInfoHRPD:
   2> forward the preRegistrationInfoHRPD to CDMA2000 upper layers;
1> if the received measConfig includes the speedStatePars:
   2> set the parameter speedStatePars within VarMeasConfig to the received value of speedStatePars;
1> if the received measConfig includes the allowInterruptions:
   2> set the parameter allowInterruptions within VarMeasConfig to the received value of allowInterruptions;

5.5.2.2 Measurement Identity Removal
The UE shall:
1> for each measId included in the received measIdToRemoveList that is part of the current UE configuration in VarMeasConfig:
   2> remove the entry with the matching measId from the measIdList within the VarMeasConfig;
   2> remove the measurement reporting entry for this measId from the VarMeasReportList, if included;
   2> stop the periodical reporting timer or timer T321, whichever one is running, and reset the associated information (e.g. timeToTrigger) for this measId;
NOTE: The UE does not consider the message as erroneous if the measIdToRemoveList includes any measId value that is not part of the current UE configuration.

5.5.2.2a Measurement Identity Autonomous Removal
The UE shall:
1> for each measId included in the measIdList within VarMeasConfig:
   2> if the associated reportConfig concerns an event involving a serving cell while the concerned serving cell is not configured; or
   2> if the associated reportConfig concerns an event involving a WLAN mobility set while the concerned WLAN mobility set is not configured:
      1. 3> remove the measId from the measIdList within the VarMeasConfig;
      2. 3> remove the measurement reporting entry for this measId from the VarMeasReportList, if included;
      3. 3> stop the periodical reporting timer if running, and reset the associated information (e.g. timeToTrigger) for this measId;
NOTE 1: The above UE autonomous removal of measId's applies only for measurement events A1, A2, A6, and also applies for events A3 and A5 if configured for PSCell and W2 and W3, if configured.
NOTE 2: When performed during re-establishment, the UE is only configured with a primary frequency (i.e. the SCell(s) and WLAN mobility set are released, if configured).

5.5.2.3 Measurement Identity Addition/Modification
E-UTRAN applies the procedure as follows:
configure a measId only if the corresponding measurement object, the corresponding reporting configuration and the corresponding quantity configuration, are configured;
The UE shall:
1> for each measId included in the received measIdToAddModList:
   2> if an entry with the matching measId exists in the measIdList within the VarMeasConfig:
      4. 3> replace the entry with the value received for this measId;
   2> else:
      5. 3> add a new entry for this measId within the VarMeasConfig;
   2> remove the measurement reporting entry for this measId from the VarMeasReportList, if included;
   2> stop the periodical reporting timer or timer T321, whichever one is running, and reset the associated information (e.g. timeToTrigger) for this measId;
   2> if the triggerType is set to periodical and the purpose is set to reportCGI in the reportConfig associated with this measId:
      6. 3> if the measObject associated with this measId concerns E-UTRA:
         4> if the si-RequestForHO is included in the reportConfig associated with this measId:
            5> if the UE is a category 0 UE according to TS 36.306 [5]:
               6> start timer T321 with the timer value set to 190 ms for this measId;
            5> else:
               6> start timer T321 with the timer value set to 150 ms for this measId;
         4> else:
            5> start timer T321 with the timer value set to 1 second for this measId;
      7. 3> else if the measObject associated with this measId concerns UTRA:
         4> if the si-RequestForHO is included in the reportConfig associated with this measId:
            5> for UTRA FDD, start timer T321 with the timer value set to 2 seconds for this measId;
            5> for UTRA TDD, start timer T321 with the timer value set to [1 second] for this measId;
         4> else:
            5> start timer T321 with the timer value set to 8 seconds for this measId;
      8. 3> else:
         4> start timer T321 with the timer value set to 8 seconds for this measId;

5.5.2.4 Measurement Object Removal
The UE shall:
1> for each measObjectId included in the received measObjectToRemoveList that is part of the current UE configuration in VarMeasConfig:
   2> remove the entry with the matching measObjectId from the measObjectList within the VarMeasConfig;
   2> remove all measId associated with this measObjectId from the measIdList within the VarMeasConfig, if any;
   2> if a measId is removed from the measIdList:
      9. 3> remove the measurement reporting entry for this measId from the VarMeasReportList, if included;
      10. 3> stop the periodical reporting timer or timer T321, whichever one is running, and reset the associated information (e.g. timeToTrigger) for this measId;
NOTE: The UE does not consider the message as erroneous if the measObjectToRemoveList includes any measObjectId value that is not part of the current UE configuration.

5.5.2.5 Measurement Object Addition/Modification
The UE shall:
1> for each measObjectId included in the received measObjectToAddModList:

2> if an entry with the matching measObjectId exists in the measObjectList within the VarMeasConfig, for this entry:
11. 3> reconfigure the entry with the value received for this measObject, except for the fields cellsToAddModList, blackCellsToAddModList, whiteCellsToAddModList, altTTT-CellsToAddModList; cellsToRemoveList, blackCellsToRemoveList, whiteCellsToRemoveList, altTTT-CellsToRemoveList, measSubframePatternConfigNeigh, measDS-Config, wlan-ToAddModList and wlan-ToRemoveList;
12. 3> if the received measObject includes the cellsToRemoveList:
   4> for each cellIndex included in the cellsToRemoveList:
      5> remove the entry with the matching cellIndex from the cellsToAddModList;
13. 3> if the received measObject includes the cellsToAddModList:
   4> for each cellIndex value included in the cellsToAddModList:
      5> if an entry with the matching cellIndex exists in the cellsToAddModList:
         6> replace the entry with the value received for this cellIndex;
      5> else:
         6> add a new entry for the received cellIndex to the cellsToAddModList;
14. 3> if the received measObject includes the blackCellsToRemoveList:
   4> for each cellIndex included in the blackCellsToRemoveList:
      5> remove the entry with the matching cellIndex from the blackCellsToAddModList;
NOTE 1: For each cellIndex included in the blackCellsToRemoveList that concerns overlapping ranges of cells, a cell is removed from the black list of cells only if all cell indexes containing it are removed.
15. 3> if the received measObject includes the blackCellsToAddModList:
   4> for each cellIndex included in the blackCellsToAddModList:
      5> if an entry with the matching cellIndex is included in the blackCellsToAddModList:
         6> replace the entry with the value received for this cellIndex;
      5> else:
         6> add a new entry for the received cellIndex to the blackCellsToAddModList;
16. 3> if the received measObject includes the whiteCellsToRemoveList:
   4> for each cellIndex included in the whiteCellsToRemoveList:
      5> remove the entry with the matching cellIndex from the whiteCellsToAddModList;
NOTE 2: For each cellIndex included in the whiteCellsToRemoveList that concerns overlapping ranges of cells, a cell is removed from the white list of cells only if all cell indexes containing it are removed.
17. 3> if the received measObject includes the whiteCellsToAddModList:
   4> for each cellIndex included in the whiteCellsToAddModList:
      5> if an entry with the matching cellIndex is included in the whiteCellsToAddModList:
         6> replace the entry with the value received for this cellIndex;
      5> else:
         6> add a new entry for the received cellIndex to the whiteCellsToAddModList;
18. 3> if the received measObject includes the altTTT-CellsToRemoveList:
   4> for each cellIndex included in the altTTT-CellsToRemoveList:
      5> remove the entry with the matching cellIndex from the altTTT-CellsToAddModList:
NOTE 3: For each cellIndex included in the altTTT-CellsToRemoveList that concerns overlapping ranges of cells, a cell is removed from the list of cells only if all cell indexes containing it are removed.
19. 3> if the received measObject includes the altTTT-CellsToAddModList:
   4> for each cellIndex value included in the altTTT-CellsToAddModList:
      5> if an entry with the matching cellIndex exists in the altTTT-CellsToAddModList:
         6> replace the entry with the value received for this cellIndex;
      5> else:
         6> add a new entry for the received cellIndex to the altTTT-CellsToAddModList;
20. 3> if the received measObject includes measSubframePatternConfigNeigh:
   4> set measSubframePatternConfigNeigh within the VarMeasConfig to the value of the received field
21. 3> if the received measObject includes measDS-Config:
   4> if measDS-Config is set to setup:
      5> if the received measDS-Config includes the measCSI-RS-ToRemoveList:
         6> for each measCSI-RS-Id included in the measCSI-RS-ToRemoveList:
            7> remove the entry with the matching measCSI-RS-Id from the measCSI-RS-ToAddModList;
      5> if the received measDS-Config includes the measCSI-RS-ToAddModList, for each measCSI-RS-Id value included in the measCSI-RS-ToAddModList:
         6> if an entry with the matching measCSI-RS-Id exists in the measCSI-RS-ToAddModList:
            7> replace the entry with the value received for this measCSI-RS-Id;
         6> else:
            7> add a new entry for the received measCSI-RS-Id to the measCSI-RS-ToAddModList;
      5> set other fields of the measDS-Config within the VarMeasConfig to the value of the received fields;
      5> perform the discovery signals measurement timing configuration procedure as specified in 5.5.2.10;
   4> else:
      5> release the discovery signals measurement configuration;
22. 3> for each measId associated with this measObjectId in the measIdList within the VarMeasConfig, if any:
   4> remove the measurement reporting entry for this measId from the VarMeasReportList, if included;

4> stop the periodical reporting timer or timer T321, whichever one is running, and reset the associated information (e.g. timeToTrigger) for this measId;
23. 3> if the received measObject includes the wlan-ToAddModList:
  4> for each WLAN-Identifiers included in the wlan-ToAddModList:
    5> add a new entry for the received WLAN-Identifiers to the wlan-ToAddModList;
24. 3> if the received measObject includes the wlan-ToRemoveList:
  4> for each WLAN-Identifiers included in the wlan-ToRemoveList:
    5> remove the new entry with the matching WLAN-Identifiers from the wlan-ToAddModList;
NOTE 3a: Matching of WLAN-Identifiers requires that all WLAN identifier fields should be same.
2> else:
  25. 3> add a new entry for the received measObject to the measObjectList within VarMeasConfig;
NOTE 4: UE does not need to retain cellForWhichToReportCGI in the measObject after reporting cgi-Info.

5.5.2.6 Reporting Configuration Removal

The UE shall:
1> for each reportConfigId included in the received reportConfigToRemoveList that is part of the current UE configuration in VarMeasConfig:
  2> remove the entry with the matching reportConfigId from the reportConfigList within the VarMeasConfig;
  2> remove all measId associated with the reportConfigId from the measIdList within the VarMeasConfig, if any;
  2> if a measId is removed from the measIdList:
    26. 3> remove the measurement reporting entry for this measId from the VarMeasReportList, if included;
    27. 3> stop the periodical reporting timer or timer T321, whichever one is running, and reset the associated information (e.g. timeToTrigger) for this measId;
NOTE: The UE does not consider the message as erroneous if the reportConfigToRemoveList includes any reportConfigId value that is not part of the current UE configuration.

5.5.2.7 Reporting Configuration Addition/Modification

The UE shall:
1> for each reportConfigId included in the received reportConfigToAddModList:
  2> if an entry with the matching reportConfigId exists in the reportConfigList within the VarMeasConfig, for this entry:
    28. 3> reconfigure the entry with the value received for this reportConfig;
    29. 3> for each measId associated with this reportConfigId included in the measIdList within the VarMeasConfig, if any:
      4> remove the measurement reporting entry for this measId from in VarMeasReportList, if included;
      4> stop the periodical reporting timer or timer T321, whichever one is running, and reset the associated information (e.g. timeToTrigger) for this measId;
  2> else:
    30. 3> add a new entry for the received reportConfig to the reportConfigList within the VarMeasConfig;

5.5.2.8 Quantity Configuration

The UE shall:
1> for each RAT for which the received quantityConfig includes parameter(s):
  2> set the corresponding parameter(s) in quantityConfig within VarMeasConfig to the value of the received quantityConfig parameter(s);
1> for each measId included in the measIdList within VarMeasConfig:
  2> remove the measurement reporting entry for this measId from the VarMeasReportList, if included;
  2> stop the periodical reporting timer or timer T321, whichever one is running, and reset the associated information (e.g. timeToTrigger) for this measId;

5.5.2.9 Measurement Gap Configuration

The UE shall:
1> if measGapConfig is set to setup:
  2> if a measurement gap configuration is already setup, release the measurement gap configuration;
  2> setup the measurement gap configuration indicated by the measGapConfig in accordance with the received gapOffset, i.e., the first subframe of each gap occurs at an SFN and subframe meeting the following condition (SFN and subframe of MCG cells):

$$\text{SFN mod } T = \text{FLOOR}(\text{gapOffset}/10);$$

$$\text{subframe} = \text{gapOffset mod } 10;$$

31. with T=MGRP/10 as defined in TS 36.133 [16];
NOTE: The UE applies a single gap, which timing is relative to the MCG cells, even when configured with DC.
1> else:
  2> release the measurement gap configuration;

5.5.2.10 Discovery Signals Measurement Timing Configuration

The UE shall setup the discovery signals measurement timing configuration (DMTC) in accordance with the received dmtc-PeriodOffset, i.e., the first subframe of each DMTC occasion occurs at an SFN and subframe of the PCell meeting the following condition:

$$\text{SFN mod } T = \text{FLOOR}(\text{dmtc-Offset}/10);$$

$$\text{subframe} = \text{dmtc-Offset mod } 10;$$

with T=dmtc-Periodicity/10;
On the concerned frequency, the UE shall not consider discovery signals transmission in subframes outside the DMTC occasion.

5.5.2.11 RSSI Measurement Timing Configuration

The UE shall setup the RSSI measurement timing configuration (RMTC) in accordance with the received rmtc-Period, rmtc-SubframeOffset if configured otherwise determined by the UE randomly, i.e. the first symbol of each RMTC occasion occurs at first symbol of an SFN and subframe of the PCell meeting the following condition:

$$\text{SFN mod } T = \text{FLOOR}(\text{rmtc-SubframeOffset}/10);$$

$$\text{subframe} = \text{rmtc-SubframeOffset mod } 10;$$

with T=rmtc-Period/10;

On the concerned frequency, the UE shall not consider RSSI measurements outside the configured RMTC occasion which lasts for measDuration for RSSI and channel occupancy measurements.

5.5.3 Performing Measurements
5.5.3.1 General

For all measurements, except for UE Rx-Tx time difference measurements, RSSI, UL PDCP Packet Delay per QCI measurement, channel occupancy measurements, and except for WLAN measurements of Band, Carrier Info, Available Admission Capacity, Backhaul Bandwidth, Channel Utilization, and Station Count, the UE applies the layer 3 filtering as specified in 5.5.3.2, before using the measured results for evaluation of reporting criteria or for measurement reporting.

The UE shall:
1> whenever the UE has a measConfig, perform RSRP and RSRQ measurements for each serving cell as follows:
  2> for the PCell, apply the time domain measurement resource restriction in accordance with measSubframePatternPCell, if configured;
  2> if the UE supports CRS based discovery signals measurement:
    32. 3> for each SCell in deactivated state, apply the discovery signals measurement timing configuration in accordance with measDS-Config, if configured within the measObject corresponding to the frequency of the SCell;
1> if the UE has a measConfig with rs-sinr-Config configured, perform RS-SINR (as indicated in the associated reportConfig) measurements as follows:
  2> perform the corresponding measurements on the frequency indicated in the associated measObject using available idle periods or using autonomous gaps as necessary;
1> for each measId included in the measIdList within VarMeasConfig:
  2> if the purpose for the associated reportConfig is set to reportCGI:
    33. 3> if si-RequestForHO is configured for the associated reportConfig:
      4> perform the corresponding measurements on the frequency and RAT indicated in the associated measObject using autonomous gaps as necessary;
    34. 3> else:
      4> perform the corresponding measurements on the frequency and RAT indicated in the associated measObject using available idle periods or using autonomous gaps as necessary;
NOTE 1: if autonomous gaps are used to perform measurements, the UE is allowed to temporarily abort communication with all serving cell(s), i.e. create autonomous gaps to perform the corresponding measurements within the limits specified in TS 36.133 [16]. Otherwise, the UE only supports the measurements with the purpose set to reportCGI only if E-UTRAN has provided sufficient idle periods.
    35. 3> try to acquire the global cell identity of the cell indicated by the cellForWhichToReportCGI in the associated measObject by acquiring the relevant system information from the concerned cell;
    36. 3> if the cell indicated by the cellForWhichToReportCGI included in the associated measObject is an E-UTRAN cell:
      4> try to acquire the CSG identity, if the CSG identity is broadcast in the concerned cell;
      4> try to acquire the trackingAreaCode in the concerned cell;
      4> try to acquire the list of additional PLMN Identities, as included in the plmn-IdentityList, if multiple PLMN identities are broadcast in the concerned cell;
      4> if the includeMultiBandInfo is configured:
        5> try to acquire the freqBandIndicator in the SystemInformationBlockType1 of the concerned cell;
        5> try to acquire the list of additional frequency band indicators, as included in the multiBandInfoList, if multiple frequency band indicators are included in the SystemInformationBlockType1 of the concerned cell;
        5> try to acquire the freqBandIndicatorPriority, if the freqBandIndicatorPriority is included in the SystemInformationBlockType1 of the concerned cell;
NOTE 2: The 'primary' PLMN is part of the global cell identity.
    37. 3> if the cell indicated by the cellForWhichToReportCGI included in the associated measObject is a UTRAN cell:
      4> try to acquire the LAC, the RAC and the list of additional PLMN Identities, if multiple PLMN identities are broadcast in the concerned cell;
      4> try to acquire the CSG identity, if the CSG identity is broadcast in the concerned cell;
    38. 3> if the cell indicated by the cellForWhichToReportCGI included in the associated measObject is a GERAN cell:
      4> try to acquire the RAC in the concerned cell;
    39. 3> if the cell indicated by the cellForWhichToReportCGI included in the associated measObject is a CDMA2000 cell and the cdma2000-Type included in the measObject is typeHRPD:
      4> try to acquire the Sector ID in the concerned cell;
    40. 3> if the cell indicated by the cellForWhichToReportCGI included in the associated measObject is a CDMA2000 cell and the cdma2000-Type included in the measObject is type1xRTT:
      4> try to acquire the BASE ID, SID and NID in the concerned cell;
  2> if the ul-DelayConfig is configured for the associated reportConfig:
    41. 3> ignore the measObject;
    42. 3> configure the PDCP layer to perform UL PDCP Packet Delay per QCI measurement;
  2> else:
    43. 3> if a measurement gap configuration is setup; or
    44. 3> if the UE does not require measurement gaps to perform the concerned measurements:
      4> if s-Measure is not configured; or
      4> if s-Measure is configured and the PCell RSRP, after layer 3 filtering, is lower than this value; or
      4> if measDS-Config is configured in the associated measObject:
        5> if the UE supports CSI-RS based discovery signals measurement; and 5> if the eventId in the associated reportConfig is set to eventC1 or eventC2, or if reportStrongestCSI-RSs is included in the associated reportConfig:
6> perform the corresponding measurements of CSI-RS resources on the frequency indicated in the concerned measObject, applying the discovery signals measurement timing configuration in accordance with measDS-Config in the concerned measObject;
6> if reportCRS-Meas is included in the associated reportConfig, perform the corresponding measurements of neighbouring cells on the frequencies indicated in the concerned measObject as follows:
7> for neighbouring cells on the primary frequency, apply the time domain measurement resource restriction in accordance with measSubframePatternConfigNeigh, if configured in the concerned measObject;
7> apply the discovery signals measurement timing configuration in accordance with measDS-Config in the concerned measObject;
5> else:
6> perform the corresponding measurements of neighbouring cells on the frequencies and RATS indicated in the concerned measObject as follows:
7> for neighbouring cells on the primary frequency, apply the time domain measurement resource restriction in accordance with measSubframePatternConfigNeigh, if configured in the concerned measObject;
7> if the UE supports CRS based discovery signals measurement, apply the discovery signals measurement timing configuration in accordance with measDS-Config, if configured in the concerned measObject;
4> if the ue-RxTxTimeDiffPeriodical is configured in the associated reportConfig:
5> perform the UE Rx-Tx time difference measurements on the PCell;
4> if the reportSSTD-Meas is set to true in the associated reportConfig:
5> perform SSTD measurements between the PCell and the PSCell;
4> if the measRSSI-ReportConfig is configured in the associated reportConfig:
5> perform the RSSI and channel occupancy measurements on the frequency indicated in the associated measObject;
2> perform the evaluation of reporting criteria as specified in 5.5.4;
NOTE 3: The s-Measure defines when the UE is required to perform measurements. The UE is however allowed to perform measurements also when the PCell RSRP exceeds s-Measure, e.g., to measure cells broadcasting a CSG identity following use of the autonomous search function as defined in TS 36.304 [4].
NOTE 4: The UE may not perform the WLAN measurements it is configured with e.g. due to connection to another WLAN based on user preferences as specified in TS 23.402 [75] or due to turning off WLAN.

5.5.3.2 Layer 3 Filtering

The UE shall:
1> for each measurement quantity that the UE performs measurements according to 5.5.3.1:

NOTE 1: This does not include quantities configured solely for UE Rx-Tx time difference, SSTD measurements and RSSI, channel occupancy measurements, WLAN measurements of Band, Carrier Info, Available Admission Capacity, Backhaul Bandwidth, Channel Utilization, and Station Count, and UL PDCP Packet Delay per QCI measurement i.e. for those types of measurements the UE ignores the triggerQuantity and reportQuantity.
2> filter the measured result, before using for evaluation of reporting criteria or for measurement reporting, by the following formula:

$$F_n = (1-a) \cdot F_{n-1} + a \cdot M_n$$

where
$M_n$ is the latest received measurement result from the physical layer;
$F_n$ is the updated filtered measurement result, that is used for evaluation of reporting criteria or for measurement reporting;
$F_{n-1}$ is the old filtered measurement result, where $F_0$ is set to $M_1$ when first measurement result from the physical layer is received; and
$a = \frac{1}{2}^{(k/4)}$, where k is the filterCoefficient for the corresponding measurement quantity received by the quantityConfig;
2> adapt the filter such that the time characteristics of the filter are preserved at different input rates, observing that the filterCoefficient k assumes a sample rate equal to 200 ms;
NOTE 2: If k is set to 0, no layer 3 filtering is applicable.
NOTE 3: The filtering is performed in the same domain as used for evaluation of reporting criteria or for measurement reporting, i.e., logarithmic filtering for logarithmic measurements.
NOTE 4: The filter input rate is implementation dependent, to fulfill the performance requirements set in [16]. For further details about the physical layer measurements, see TS 36.133 [16].

5.5.4 Measurement Report Triggering 5.5.4.1 General

If security has been activated successfully, he UE shall:
1> for each measId included in the measIdList within VarMeasConfig:
2> if the corresponding reportConfig includes a purpose set to reportStrongestCellsForSON:
45. 3> consider any neighbouring cell detected on the associated frequency to be applicable;
2> else if the corresponding reportConfig includes a purpose set to reportCGI:
46. 3> consider any neighbouring cell detected on the associated frequency/set of frequencies (GERAN) which has a physical cell identity matching the value of the cellForWhichToReportCGI included in the corresponding measObject within the VarMeasConfig to be applicable;
2> else:
47. 3> if the corresponding measObject concerns E-UTRA:
4> if the ue-RxTxTimeDiffPeriodical is configured in the corresponding reportConfig:
5> consider only the PCell to be applicable;
4> else if the reportSSTD-Meas is set to true in the corresponding reportConfig:
5> consider the PSCell to be applicable;
4> else if the eventA1 or eventA2 is configured in the corresponding reportConfig:

5> consider only the serving cell to be applicable;
4> else if eventC1 or eventC2 is configured in the corresponding reportConfig; or if reportStrongestCSI-RSs is included in the corresponding reportConfig:
5> consider a CSI-RS resource on the associated frequency to be applicable when the concerned CSI-RS resource is included in the measCSI-RS-ToAddModList defined within the VarMeasConfig for this measId;
4> else if measRSSI-RepostConfig is configured in the corresponding reportConfig:
5> consider the resource indicated by the rmtc-Config on the associated frequency to be applicable;
4> else:
5> if useWhiteCellList is set to TRUE:
6> consider any neighbouring cell detected on the associated frequency to be applicable when the concerned cell is included in the whiteCellsToAddModList defined within the VarMeasConfig for this measId;
5> else:
6> consider any neighbouring cell detected on the associated frequency to be applicable when the concerned cell is not included in the blackCellsToAddModList defined within the VarMeasConfig for this measId;
5> for events involving a serving cell on one frequency and neighbours on another frequency, consider the serving cell on the other frequency as a neighbouring cell;
4> if the corresponding reportConfig includes alternativeTimeToTrigger and if the UE supports alternativeTimeToTrigger:
5> use the value of alternativeTimeToTrigger as the time to trigger instead of the value of timeToTrigger in the corresponding reportConfig for cells included in the altTTT-CellsToAddModList of the corresponding measObject;

48. 3> else if the corresponding measObject concerns UTRA or CDMA2000:
4> consider a neighbouring cell on the associated frequency to be applicable when the concerned cell is included in the cellsToAddModList defined within the VarMeasConfig for this measId (i.e. the cell is included in the whitelist);

NOTE 0: The UE may also consider a neighbouring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).

49. 3> else if the corresponding measObject concerns GERAN:
4> consider a neighbouring cell on the associated set of frequencies to be applicable when the concerned cell matches the ncc-Permitted defined within the VarMeasConfig for this measId;

50. 3> else if the corresponding measObject concerns WLAN:
4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;

2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):

51. 3> include a measurement reporting entry within the VarMeasReportList for this measId;
52. 3> set the numberOfReportsSent defined within the VarMeasReportList for this measId to 0;
53. 3> include the concerned cell(s) in the cellsTriggeredList defined within the VarMeasReportList for this measId;
54. 3> if the UE supports T312 and if use T312 is included for this event and if T310 is running:
4> if T312 is not running:
5> start timer T312 with the value configured in the corresponding measObject;
55. 3> initiate the measurement reporting procedure, as specified in 5.5.5;

2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):

56. 3> set the numberOfReportsSent defined within the VarMeasReportList for this measId to 0;
57. 3> include the concerned cell(s) in the cellsTriggeredList defined within the VarMeasReportList for this measId;
58. 3> if the UE supports T312 and if use T312 is included for this event and if T310 is running:
4> if T312 is not running:
5> start timer T312 with the value configured in the corresponding measObject;
59. 3> initiate the measurement reporting procedure, as specified in 5.5.5;

2> if the triggerType is set to event and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

60. 3> remove the concerned cell(s) in the cellsTriggeredList defined within the VarMeasReportList for this measId;
61. 3> if the UE supports T312 and if use T312 is included for this event and if T310 is running:
4> if T312 is not running:
5> start timer T312 with the value configured in the corresponding measObject;

62. 3> if reportOnLeave is set to TRUE for the corresponding reporting configuration or if a6-ReportOnLeave is set to TRUE for the corresponding reporting configuration:
    4> initiate the measurement reporting procedure, as specified in 5.5.5;
63. 3> if the cellsTriggeredList defined within the VarMeasReportList for this measId is empty:
    4> remove the measurement reporting entry within the VarMeasReportList for this measId;
    4> stop the periodical reporting timer for this measId, if running;

2> if the triggerType is set to event and if the entry condition applicable for this event, i.e. the event corresponding with the eventId of the corresponding reportConfig within VarMeasConfig, is fulfilled for one or more applicable CSI-RS resources for all measurements after layer 3 filtering taken during timeToTrigger defined for this event within the VarMeasConfig, while the VarMeasReportList does not include an measurement reporting entry for this measId (i.e. a first CSI-RS resource triggers the event):
64. 3> include a measurement reporting entry within the VarMeasReportList for this measId;
65. 3> set the numberOfReportsSent defined within the VarMeasReportList for this measId to 0;
66. 3> include the concerned CSI-RS resource(s) in the csi-RS-TriggeredList defined within the VarMeasReportList for this measId;
67. 3> initiate the measurement reporting procedure, as specified in 5.5.5;

2> if the triggerType is set to event and if the entry condition applicable for this event, i.e. the event corresponding with the eventId of the corresponding reportConfig within VarMeasConfig, is fulfilled for one or more applicable CSI-RS resources not included in the csi-RS-TriggeredList for all measurements after layer 3 filtering taken during timeToTrigger defined for this event within the VarMeasConfig (i.e. a subsequent CSI-RS resource triggers the event):
68. 3> set the numberOfReportsSent defined within the VarMeasReportList for this measId to 0;
69. 3> include the concerned CSI-RS resource(s) in the csi-RS-TriggeredList defined within the VarMeasReportList for this measId;
70. 3> initiate the measurement reporting procedure, as specified in 5.5.5;

2> if the triggerType is set to event and if the leaving condition applicable for this event is fulfilled for one or more of the CSI-RS resources included in the csi-RS-TriggeredList defined within the VarMeasReportList for this measId for all measurements after layer 3 filtering taken during timeToTrigger defined within the VarMeasConfig for this event:
71. 3> remove the concerned CSI-RS resource(s) in the csi-RS-TriggeredList defined within the VarMeasReportList for this measId;
72. 3> if c1-ReportOnLeave is set to TRUE for the corresponding reporting configuration or if c2-ReportOnLeave is set to TRUE for the corresponding reporting configuration:
    4> initiate the measurement reporting procedure, as specified in 5.5.5;
73. 3> if the csi-RS-TriggeredList defined within the VarMeasReportList for this measId is empty:
    4> remove the measurement reporting entry within the VarMeasReportList for this measId;
    4> stop the periodical reporting timer for this measId, if running;

2> if measRSSI-ReportConfig is included and if a (first) measurement result is available:
74. 3> include a measurement reporting entry within the VarMeasReportList for this measId;
75. 3> set the numberOfReportsSent defined within the VarMeasReportList for this measId to 0;
76. 3> initiate the measurement reporting procedure as specified in 5.5.5 immediately when RSSI sample values are reported by the physical layer after the first L1 measurement duration;

2> else if the purpose is included and set to reportStrongestCells or to reportStrongestCellsForSON and if a (first) measurement result is available:
77. 3> include a measurement reporting entry within the VarMeasReportList for this measId;
78. 3> set the numberOfReportsSent defined within the VarMeasReportList for this measId to 0;
79. 3> if the purpose is set to reportStrongestCells and reportStrongestCSI-RSs is not included:
    4> if the triggerType is set to periodical and the corresponding reportConfig includes the ul-DelayConfig:
        5> initiate the measurement reporting procedure, as specified in 5.5.5, immediately after a first measurement result is provided by lower layers;
    4> else if the reportAmount exceeds 1:
        5> initiate the measurement reporting procedure, as specified in 5.5.5, immediately after the quantity to be reported becomes available for the PCell;
    4> else (i.e. the reportAmount is equal to 1):
        5> initiate the measurement reporting procedure, as specified in 5.5.5, immediately after the quantity to be reported becomes available for the PCell and for the strongest cell among the applicable cells, or becomes available for the pair of PCell and the PSCell in case of SSTD measurements;
80. 3> else:
    4> initiate the measurement reporting procedure, as specified in 5.5.5, when it has determined the strongest cells on the associated frequency;

2> upon expiry of the periodical reporting timer for this measId:
81. 3> initiate the measurement reporting procedure, as specified in 5.5.5;

2> if the purpose is included and set to reportCGI and if the UE acquired the information needed to set all fields of cgi-Info for the requested cell:
82. 3> include a measurement reporting entry within the VarMeasReportList for this measId;
83. 3> set the numberOfReportsSent defined within the VarMeasReportList for this measId to 0:
84. 3> stop timer T321;
85. 3> initiate the measurement reporting procedure, as specified in 5.5.5;

2> upon expiry of the T321 for this measId:
86. 3> include a measurement reporting entry within the VarMeasReportList for this measId;
87. 3> set the numberOfReportsSent defined within the VarMeasReportList for this measId to 0;

88. 3> initiate the measurement reporting procedure, as specified in 5.5.5;

NOTE 2: The UE does not stop the periodical reporting with triggerType set to event or to periodical while the corresponding measurement is not performed due to the PCell RSRP being equal to or better than s-Measure or due to the measurement gap not being setup.

NOTE 3: If the UE is configured with DRX, the UE may delay the measurement reporting for event triggered and periodical triggered measurements until the Active Time, which is defined in TS 36.321 [6].

5.5.4.2 Event A1 (Serving Becomes Better than Threshold)

The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the primary or secondary cell that is configured on the frequency indicated in the associated measObjectEUTRA to be the serving cell;

$Ms-Hys>Thresh$   Inequality A1-1 (Entering condition)

$Ms+Hys<Thresh$   Inequality A1-2 (Leaving condition)

The variables in the formula are defined as follows:
Ms is the measurement result of the serving cell, not taking into account any offsets.
Hys is the hysteresis parameter for this event (i.e. hysteresis as defined within reportConfigEUTRA for this event).
Thresh is the threshold parameter for this event (i.e. a1-Threshold as defined within reportConfigEUTRA for this event).
Ms is expressed in dBm in case of RSRP, or in dB in case of RSRQ and RS-SINR.
Hys is expressed in dB.
Thresh is expressed in the same unit as Ms.

5.5.4.3 Event A2 (Serving Becomes Worse than Threshold)

The UE shall:
1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the primary or secondary cell that is configured on the frequency indicated in the associated measObjectEUTRA to be the serving cell;

$Ms+Hys<Thresh$   Inequality A2-1 (Entering condition)

$Ms-Hys>Thresh$   Inequality A2-2 (Leaving condition)

The variables in the formula are defined as follows:
Ms is the measurement result of the serving cell, not taking into account any offsets.
Hys is the hysteresis parameter for this event (i.e. hysteresis as defined within reportConfigEUTRA for this event).
Thresh is the threshold parameter for this event (i.e. a2-Threshold as defined within reportConfigEUTRA for this event).
Ms is expressed in dBm in case of RSRP, or in dB in case of RSRQ and RS-SINR.
Hys is expressed in dB.
Thresh is expressed in the same unit as Ms.

5.5.4.4 Event A3 (Neighbour Becomes Offset Better than PCell/PSCell)

The UE shall:
1> consider the entering condition for this event to be satisfied when condition A3-1, as specified below, is fulfilled;
1> consider the leaving condition for this event to be satisfied when condition A3-2, as specified below, is fulfilled;
1> if usePSCell of the corresponding reportConfig is set to true:
2> use the PSCell for Mp, Ofp and Ocp;
1> else:
2> use the PCell for Mp, Ofp and Ocp;

NOTE The cell(s) that triggers the event is on the frequency indicated in the associated measObject which may be different from the frequency used by the PCell/PSCell.

$Mn+Ofn+Ocn-Hys>Mp+Ofp+Ocp+Off$   Inequality A3-1 (Entering condition)

$Mn+Ofn+Ocn+Hys<Mp+Ofp+Ocp+Off$   Inequality A3-2 (Leaving condition)

The variables in the formula are defined as follows:
Mn is the measurement result of the neighbouring cell, not taking into account any offsets.
Ofn is the frequency specific offset of the frequency of the neighbour cell (i.e. offsetFreq as defined within measObjectEUTRA corresponding to the frequency of the neighbour cell).
Ocn is the cell specific offset of the neighbour cell (i.e. cellIndividualOffset as defined within measObjectEUTRA corresponding to the frequency of the neighbour cell), and set to zero if not configured for the neighbour cell.
Mp is the measurement result of the PCell/PSCell, not taking into account any offsets.
Ofp is the frequency specific offset of the frequency of the PCell/PSCell (i.e. offsetFreq as defined within measObjectEUTRA corresponding to the frequency of the PCell/PSCell).
Ocp is the cell specific offset of the PCell/PSCell (i.e. cellIndividualOffset as defined within measObjectEUTRA corresponding to the frequency of the PCell/PSCell), and is set to zero if not configured for the PCell/PSCell.
Hys is the hysteresis parameter for this event (i.e. hysteresis as defined within reportConfigEUTRA for this event).
Off is the offset parameter for this event (i.e. a3-Offset as defined within reportConfigEUTRA for this event).
Mn, Mp are expressed in dBm in case of RSRP, or in dB in case of RSRQ and RS-SINR.
Ofn, Ocn, Ofp, Ocp, Hys, Off are expressed in dB.

< . . . >

5.3 DL-SCH Data Transfer 5.3.1 DL Assignment Reception

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or Temporary C-RNTI, the MAC entity shall for each TTI during which it monitors PDCCH and for each Serving Cell:

if a downlink assignment for this TTI and this Serving Cell has been received on the PDCCH for the MAC entity's C-RNTI, or Temporary C-RNTI:
  if this is the first downlink assignment for this Temporary C-RNTI:
    consider the NDI to have been toggled.
  if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
    consider the NDI to have been toggled regardless of the value of the NDI.
  indicate the presence of a downlink assignment and deliver the associated HARQ information to the HARQ entity for this TTI.
else, if this Serving Cell is the SpCell and a downlink assignment for this TTI has been received for the SpCell on the PDCCH of the SpCell for the MAC entity's Semi-Persistent Scheduling C-RNTI:
  if the NDI in the received HARQ information is 1:
    consider the NDI not to have been toggled;
    indicate the presence of a downlink assignment and deliver the associated HARQ information to the HARQ entity for this TTI.
  else, if the NDI in the received HARQ information is 0:
    if PDCCH contents indicate SPS release:
      clear the configured downlink assignment (if any);
      if the timeAlignmentTimer associated with the pTAG is running:
        indicate a positive acknowledgement for the downlink SPS release to the physical layer.
    else:
      store the downlink assignment and the associated HARQ information as configured downlink assignment;
      initialise (if not active) or re-initialise (if already active) the configured downlink assignment to start in this TTI and to recur according to rules in subclause 5.10.1;
      set the HARQ Process ID to the HARQ Process ID associated with this TTI;
      consider the NDI bit to have been toggled;
      indicate the presence of a configured downlink assignment and deliver the stored HARQ information to the HARQ entity for this TTI.
else, if this Serving Cell is the SpCell and a downlink assignment for this TTI has been configured for the SpCell and there is no measurement gap in this TTI and there is no Sidelink Discovery Gap for Reception in this TTI; and
if this TTI is not an MBSFN subframe of the SpCell or the MAC entity is configured with transmission mode tm9 or tm10 on the SpCell:
  instruct the physical layer to receive, in this TTI, transport block on the DL-SCH according to the configured downlink assignment and to deliver it to the HARQ entity;
  set the HARQ Process ID to the HARQ Process ID associated with this TTI;
  consider the NDI bit to have been toggled;
  indicate the presence of a configured downlink assignment and deliver the stored HARQ information to the HARQ entity for this TTI.

For configured downlink assignments, the HARQ Process ID associated with this TTI is derived from the following equation:

HARQ Process ID=[floor(CURRENT_TTI/semiPersistSchedIntervalDL)] modulo numberOfConfSPS-Processes, where CURRENT_TTI=[(SFN*10)+subframe number].

When the MAC entity needs to read BCCH, the MAC entity may, based on the scheduling information from RRC:
  if a downlink assignment for this TTI has been received on the PDCCH for the SI-RNTI;
    if the redundancy version is not defined in the PDCCH format:
      the redundancy version of the received downlink assignment for this TTI is determined by $RV_K$=ceiling(3/2*k) modulo 4, where k depends on the type of system information message: for SystemInformationBlockType1 message, k=(SFN/2) modulo 4, where SFN is the system frame number; for SystemInformation messages, k=i modulo 4, i=0,1, ..., $n_s^w$−1, where i denotes the subframe number within the SI window $n_s^w$;
    indicate a downlink assignment and redundancy version for the dedicated broadcast HARQ process to the HARQ entity for this TTI.

When the MAC entity has SC-RNTI and/or G-RNTI, the MAC entity shall for each TTI during which it monitors PDCCH for SC-RNTI as specified in [8] and for G-RNTI as specified in subclause 5.7a and for each Serving Cell:
  if a downlink assignment for this TTI and this Serving Cell has been received on the PDCCH for the MAC entity's SC-RNTI or G-RNTI:
    attempt to decode the received data.
  if the data which the MAC entity attempted to decode was successfully decoded for this TB:
    deliver the decoded MAC PDU to the disassembly and demultiplexing entity.
< . . . >
8.1.2.1 UE Measurement Capability If the UE requires measurement gaps to identify and measure inter-frequency and/or inter-RAT cells, in order for the requirements in the following subsections to apply the E-UTRAN must provide a single measurement gap pattern with constant gap duration for concurrent monitoring of all frequency layers and RATS.
  During the measurement gaps the UE:
    shall not transmit any data
    is not expected to tune its receiver on any of the E-UTRAN carrier frequencies of PCell and any SCell.
    is not expected to tune its receiver on any of the E-UTRAN carrier frequencies of PCell, PSCell, and SCell.
  If the UE supporting dual connectivity is configured with PSCell, during the total interruption time as shown in FIG. 32 (a reproduction of Figure 8.1.2.1-1 from 3GPP TS 36.133 V13.4.0), the UE shall not transmit and receive any data in SCG.
  In the uplink subframe occurring immediately after the measurement gap,
    if the following conditions are met then it is up to UE implementation whether or not the UE can transmit data:
      all the serving cells belong to E-UTRAN TDD;
      if the subframe occurring immediately before the measurement gap is an uplink subframe.
    Otherwise the UE shall not transmit any data.

In determining the above UE behaviour in the uplink subframe occurring immediately after the measurement gap the UE shall treat a special subframe as an uplink subframe if the special subframe occurs immediately before the measurement gap, Inter-frequency and inter-RAT measurement requirements within this clause rely on the UE being configured with one measurement gap pattern unless the UE has signaled that it is capable of conducting such measurements without gaps. UEs shall only support those measurement gap patterns listed in FIG. 31 (a reproduction of Table 8.1.2.1-1 from 3GPP TS 36.133 V13.4.0) that are relevant to its measurement capabilities.

ProSe capable UE is allowed to perform ProSe transmissions during the measurement gaps that are not used for measurements if the requirements specified in section 8 for inter-frequency and inter-RAT measurements are fulfilled.

NOTE 1: When inter-frequency RSTD measurements are configured and the UE requires measurement gaps for performing such measurements, only Gap Pattern 0 can be used. For defining the inter-frequency and inter-RAT requirements $T_{inter1}$=30 ms shall be assumed.

NOTE 2: A measurement gap starts at the end of the latest subframe occurring immediately before the measurement gap among MCG serving cells subframes.

NOTE 3: MGL is the time from of tuning to end of retuning, which is aligned between MCG and SCG.

NOTE 4: The total interruption time on SCG is 6 subframes for synchronous dual connectivity, and the total interruption time on SCG is 7 subframes for asynchronous dual connectivity. As shown in FIG. 32 (a reproduction of Figure 8.1.2.1-1 from 3GPP TS 36.133 V13.4.0), MCG subframes from i+1 to i+6 are included in total interruption time together with SCG subframes from j+1 to j+6 for synchronous dual connectivity and j+1 to j+7 for asynchronous dual connectivity.

NOTE 5: asynchronous dual connectivity as shown in Figure 8.1.2.1-1 (b), subframe j is regarded as the subframe occurring immediately before the measurement gap for SCG, similarly, subframe j+8 is regarded as the sublimate occurring immediately after the measurement gap for SCG.

A UE that is capable of identifying and measuring inter-frequency and/or inter-RAT cells without gaps shall follow requirements as if Gap Pattern Id #0 had been used and the minimum available time Tinter1 of 60 ms shall be assumed for the corresponding requirements.

If the UE supporting E-UTRA carrier aggregation when configured with up to four SCCs is performing measurements on cells on PCC, inter-frequency measurements, or inter-RAT measurements, and interruption occurs on PCell or any activated SCell or both due to measurements performed on cells on an SCC with a deactivated SCell according to section 8.3, then the UE shall meet the requirements specified for each measurement in Section 8 and Section 9.

If the UE supporting E-UTRA dual connectivity when configured with a PSCell is performing measurements on cells on PCC, inter-frequency measurements, or inter-RAT measurements, then the UE shall meet the requirements specified for each measurement in Section 8 and Section 9.

A UE which indicate support for Increased UE carrier monitoring E-UTRA according to the capabilities in [2, 31] and which is capable of identifying and measuring inter-frequency and/or inter-RAT cells without gaps, shall be able to monitor maximum number of layers as defined in 8.1.2.1.1.1a, and apply the MeasScaleFactor [2] defining the relaxation to the requirements for the configured carriers according to section 8.1.2.1.1a.

When it comes to NR, backward compatibility is not necessarily required. Numerology can be adjusted so that a reducing symbol number of a TTI would not be the only tool to change TTI length. Using LTE numerology, as an example, it comprises 14 OFDM symbol in 1 ms and a subcarrier spacing of 1.5 KHz. When the subcarrier spacing goes to 30 KHz, under the assumption of the same Fast Fourier Transform (FFT) size and the same Cyclic Prefix (CP) structure, there would be 28 OFDM symbols in 1 ms. Equivalently, the TTI become 0.5 ms if the number of OFDM symbol in a TTI is kept the same. This implies the design between different TTI lengths can be kept common with good scalability performed on the subcarrier spacing. Of course, there would always be a trade-off for the subcarrier spacing selection, e.g., FFT size, definition/number of Physical Resource Block (PRB), the design of CP, or supportable system bandwidth. While NR considers a larger system bandwidth and a larger coherence bandwidth, the inclusion of a larger sub carrier spacing is contemplated.

As disclosed above, it is very difficult to fulfill all the diverse requirements with a single numerology. Therefore, in early 3GPP RAN1 meetings, it was acknowledged that more than one numerology would be adopted. Considering the standardization and implementation efforts as well as the multiplexing capability among different numerologies, it would be beneficial to have some relationship between the different numerologies such as an integral multiple relationship. Several numerology families were raised during the 3GPP meetings with one numerology family being based on LTE 15 KHz, and other numerologies (see Alt. 2~4 disclosed below) which allows power N of 2 symbols in 1 ms:

For NR, it is necessary to support more than one values of subcarrier-spacing
Values of subcarrier-spacing are derived from a particular value of subcarrier-spacing multiplied by N where N is an integer
Alt. 1: Subcarrier-spacing values include 15 kHz subcarrier-spacing (i.e., LTE based numerology)
Alt. 2: Subcarrier-spacing values include 17.5 kHz subcarrier-spacing with uniform symbol duration including CP length
Alt. 3: Subcarrier-spacing values include 17.06 kHz subcarrier-spacing with uniform symbol duration including CP length
Alt. 4: Subcarrier-spacing values 21.33 kHz
Note: other alternatives are not precluded
For Further Study (FFS): the exact value of a particular value and possible values of N
The values of possible subcarrier-spacing will be further narrowed-down in RAN1 #85.

Also, whether there would be restriction on the multiplier of a given numerology family was also discussed during 3GPP RAN1 meetings. The power of 2 (Alt. 1 disclosed below) drew some interest because it can multiplex different numerologies easier without introducing much overhead when different numerologies are multiplexed in time domain:

RAN1 will continue further study and conclude between following alternatives in the next meeting
Alt. 1:
The subcarrier spacing for the NR scalable numerology should scale as $$f_{sc}=f_0*2^m$$

where
$f_0$ is FFS
m is an integer chosen a set of possible values

Alt. 2:
  The subcarrier spacing for the NR scalable numerology should scale as $f_{sc} = f_0 * M$ where
    $f_0$ is FFS
    M is an integer chosen from a set of possible positive values.

Usually, RAN1 works in a band agnostic manner so that a scheme/feature would be assumed to be applicable for all frequency bands. In the following RAN4, a group would derive relevant test case considering whether some combinations are unrealistic or whether deployment can be done reasonably. This rule would still be assumed in NR, but some companies do see that there would be restrictions as the frequency range of NR is quite high:

For the study of NR, RAN1 assumes that multiple (but not necessarily all) OFDM numerologies can apply to the same frequency range
    Note: RAN1 does not assume to apply very low value of subcarrier spacing to very high carrier frequency.

The above-discussed use cases for NR have diverse requirements in terms of data rates, latency, and coverage. Enhanced mobile broadband (eMBB) is expected to support peak data rate (20 Gbps for downlink and 10 Gbps for uplink) and user experienced data rates in the order of three times International Mobile Telecommunications (IMT)-Advanced. On the other hand, in case of Ultra Reliable Low Latency Communication (URLLC), the tighter requirements are put on ultra-low latency (0.5 ms for UL and DL each for user plane latency) and high reliability (1-10-5 within 1 ms). Finally, massive Machine Type Communications (mMTC) requires high connection density (1,000,000 devices/km2 in urban environment), large coverage in harsh environments ([164 dB] Maximum Coupling Loss (MCL)), and extremely long-life battery (15 years) for low cost devices.

One option provides FDM/TDM of different types for subframes and/or subbands with different subcarrier numerologies (i.e., different subcarrier-spacing values and correspondingly different OFDM symbol lengths) in a single system bandwidth where the different subcarrier values are chosen according to the use-case specific requirements. In this case, a UE may be configured with a single subcarrier numerology or multiple subcarrier numerologies, possibly depending upon UE capability, UE category, and UE-supported use cases.

Figure 33:
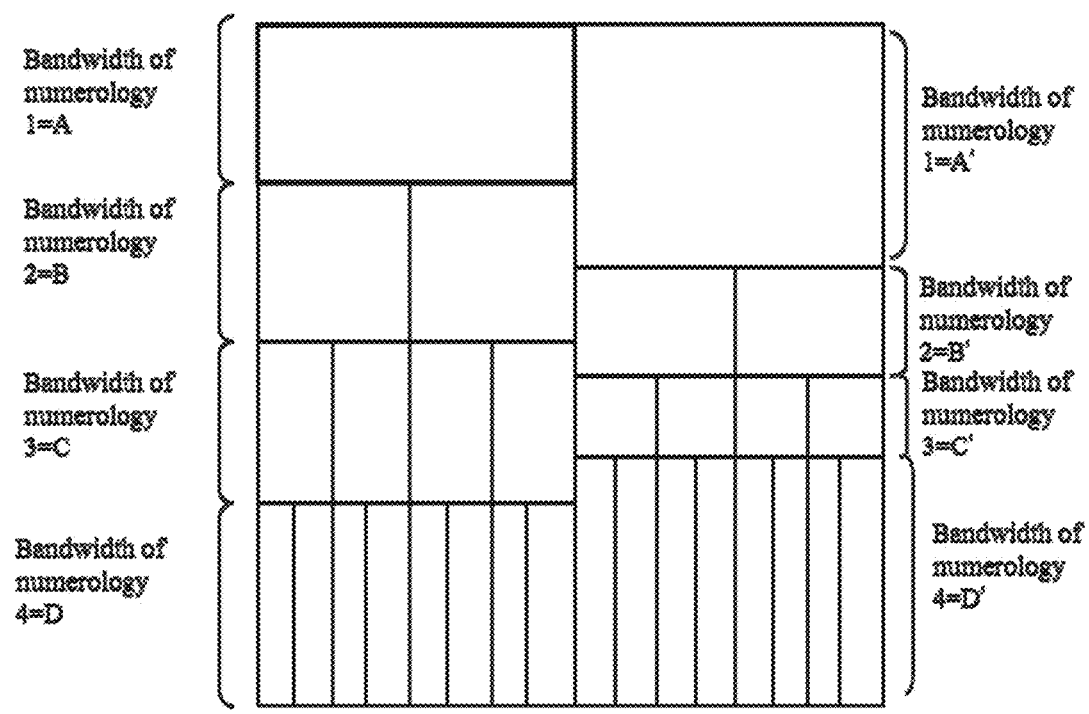
FIG. 33 is an illustration of one exemplary embodiment.

The network may provide a given numerology with certain bandwidth and in a certain frequency location within the whole system bandwidth, e.g. 100 MHz or 200 MHz. The bandwidth and frequency location may be adjusted according to certain conditions such as the amount of traffic required for each numerology, as shown in FIG. 33. It is noted that FIG. 33 is an example for illustration purposes and the bandwidth for a given numerology may be non-contiguous in frequency domain as well. For data transmission associated with a resource allocation, the UE does not need a precise numerology bandwidth, as the UE can receive data on the allocated resource with a proper numerology, without knowing the numerology outside the allocated resource. Therefore, a bandwidth assumed to derive a resource allocation for a numerology may not contain the numerology in every resource block across the bandwidth. The UE may need to perform measurement across a certain bandwidth and how to determine the numerology applied on a given resource block need to be figured out.

In a first aspect of one exemplary embodiment, a UE performs a measurement with a specific numerology. In one embodiment, the specific numerology is different from a numerology used by the UE for data reception.

In a second aspect of one exemplary embodiment, different types of measurement are performed with different numerologies. In one aspect, some types of measurement would be performed on a first numerology and some types of measurement would be performed on a second numerology. In another aspect, the first numerology is a specific numerology where UE detect synchronization signal. In yet another aspect, the second numerology is a numerology configured for data transmission.

In a third aspect of one exemplary embodiment, two bandwidths are configured for a UE. A first bandwidth is utilized for deriving resource allocation for data reception. A second bandwidth is utilized for performing measurements.

In a fourth aspect of one exemplary embodiment, within a frequency resource, a data channel and a reference signal for measurement have different numerologies. More specifically, the reference signal utilizes a single numerology across the whole system bandwidth. The data channel for different UEs on different frequency resources use different numerologies.

In a fifth aspect of one exemplary embodiment, a UE performs a measurement with a corresponding numerology according to its knowledge, and the network would drop or ignore the result derived from the wrong numerology knowledge.

In a sixth aspect of one exemplary embodiment, there is a restriction on the numerology that a network can transmit within a bandwidth for deriving a resource allocation in a subframe when a reference signal for measurement is transmitted. For example, in a subframe when a reference signal is transmitted, the network should transmit a numerology configured for the UE over the bandwidth used to derive the resource allocation for the UE. Alternatively, in a subframe when a reference signal is not transmitted, the network can transmit another numerology different from the numerology configured for the UE on a resource block within the bandwidth used to derive resource allocation for the UE so long as the UE does not perform data reception on that resource block.

In a seventh aspect of one exemplary embodiment, the UE performs a measurement assuming all possible numerologies. In one embodiment, the UE would generate measurement result according to all possible numerology and decide which numerology is the correct one. And the results associated with the correct numerology is considered/transmitted in the following reporting for the measurement.

As those skilled in the art will appreciate, it is contemplated that any of above-disclosed aspects can be combined to form new methods.

In one embodiment, a UE receives data with a first numerology and performs a measurement with a second numerology. In one alternative, the first numerology and the second numerology are different numerologies. In another alternative, the first numerology is configured by the network. In yet another alternative, the resource used to transmit the first numerology is allocated by the network. In another alternative, the second numerology is a predefined numerology. More specifically, the predefined numerology is the numerology used to perform synchronization, e.g. the default numerology.

In one embodiment, the measurement is performed on specific time frequency resource. More specifically, the time frequency resource is derived from a synchronization signal.

Alternatively, the time frequency resource is the same as the time frequency resource for a synchronization signal transmission. In another alternative, the time frequency resource is derived from the system information, e.g. the information on the Physical Broadcast Channel (PBCH). In another alternative, the time frequency resource is the same as the time frequency resource for the system information transmission, e.g. the time frequency resource for PBCH transmission.

In one embodiment, data reception may not be available when the UE performs measurement on the second numerology. More specifically, the UE does not monitor a down link control channel when the measurement is performed. Alternatively, the UE is configured with a measurement gap when the measurement is performed. In one alternative, the measurement is radio link monitoring (RLM) measurement. Alternatively, the measurement is a radio resource management (RRM) measurement. In another alternative, the RRM measurement is an intra-frequency RRM measurement.

In another embodiment, a first type of measurement is performed with a first numerology, and a second type of measurement is performed with a second numerology. In one embodiment, the first numerology and the second numerology are different. In one embodiment, the first numerology is a predefined numerology.

More specifically, the predefined numerology is the numerology used to perform synchronization, e.g. default numerology. In one embodiment, the first measurement would be performed on a specific time frequency resource. In another embodiment, the time frequency resource is derived from a synchronization signal. In one embodiment, the time frequency resource is the same as the time frequency resource for the synchronization signal transmission. Alternatively, the time frequency resource is derived from system information, e.g. the information on PBCH. More specifically, the time frequency resource is the same as the time frequency resource for the system information transmission, e.g. the time frequency resource for PBCH transmission. In one embodiment, the first type of measurement is a radio link monitoring (RLM) measurement. In another embodiment, the first type of measurement is a radio resource management (RRM) measurement.

In one embodiment, the second numerology is a numerology configured for data reception. Alternatively, the second type of measurement is a channel state information (CSI) measurement. In another alternative, the second type of measurement is performed in the time domain resource where CSI-RS is configured. In yet another embodiment, the second type of measurement is performed across the whole system bandwidth. Alternatively, the second type of measurement is performed across a bandwidth configured by the network.

In another embodiment, a reference signal is transmitted with a single numerology across the whole system bandwidth. More specifically, the single numerology is transmitted regardless of the numerology used for the data channel within a same frequency resource. For example, within a same frequency resource, the reference signal and the data channel have different numerology.

In one embodiment, the reference signal and data channel are multiplexed in a time domain, e.g. transmitted on different symbols separately. For example, a control channel would use the single numerology and multiplex with the reference signal on the same symbol(s). In another embodiment, the data channel and reference signal are multiplexed in the same resource, e.g. on the same symbol(s). For example, there would be some room left unused in the frequency region where the numerology of data channel and numerology of reference signal are different. For example, the UE should be rate-matching around the unused resource (e.g., does not receive the unused resource) when performing rate-matching for the data channel.

Figure 34:
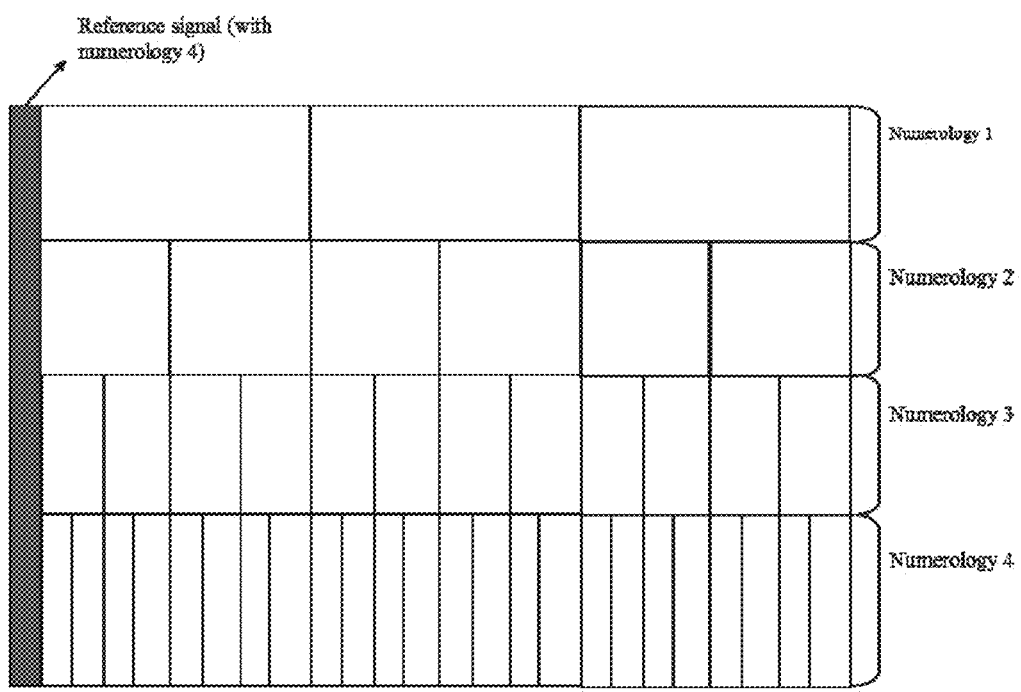
FIG. 34 is an illustration of one exemplary embodiment.
Figure 35:
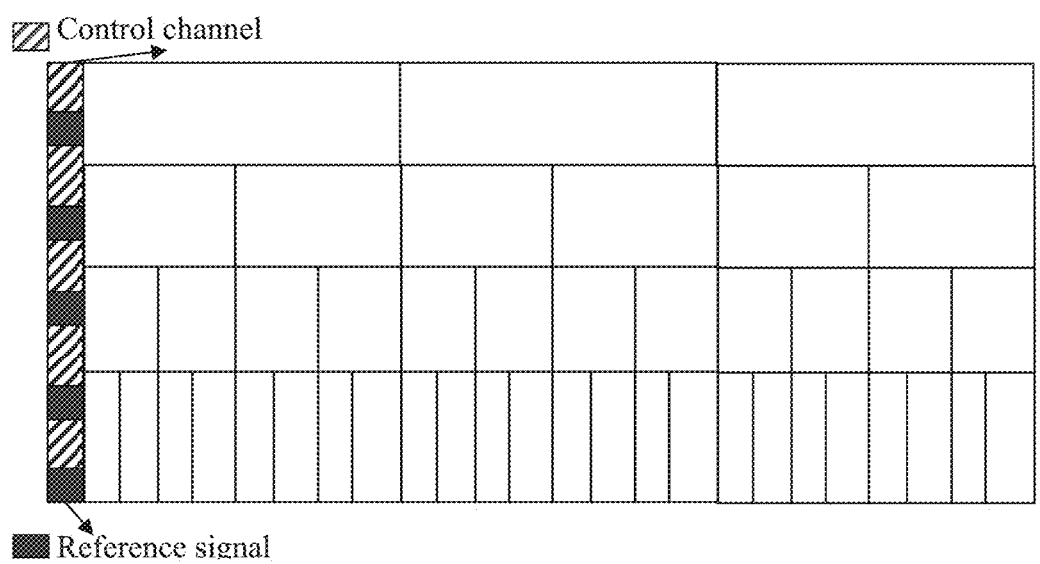
FIG. 35 is an illustration of one exemplary embodiment.
Figure 36:
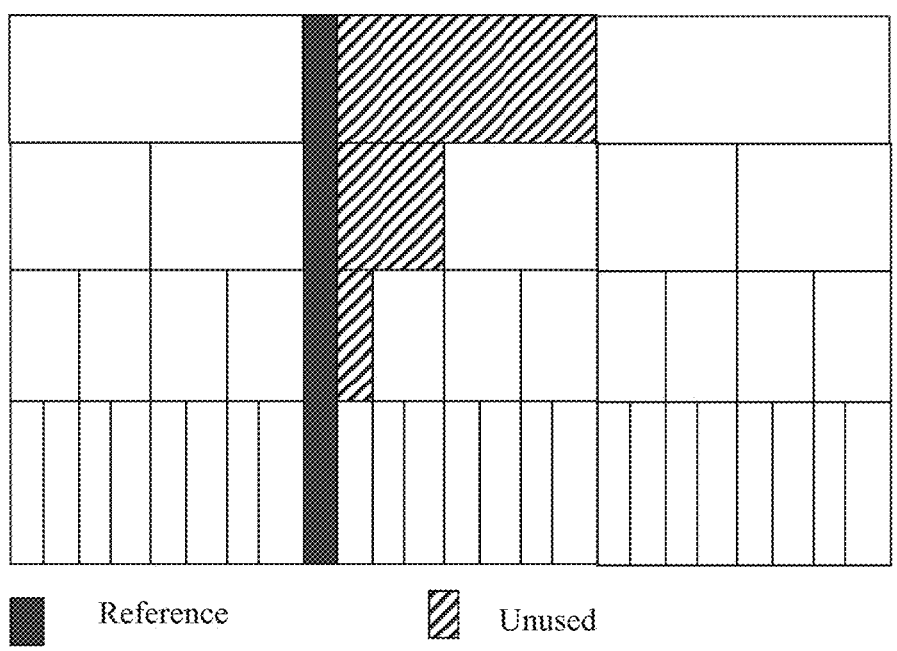
FIG. 36 is an illustration of one exemplary embodiment.

Some illustrations for this embodiment are given in FIGS. 34-36. It is noted that in FIGS. 34-36, the reference signal is transmitted with numerology 4 for illustration purposes and it is possible to use any other numerology among all the supported numerologies. Also, in FIG. 34, the control symbol has the same number for all frequency regions with the data channel of different numerology. It is also possible that different frequency regions have a different number of control symbols, e.g., a same control symbol number per data numerology region. In one embodiment, the UE performs a measurement with the reference signal. In one embodiment, the measurement may be CSI measurement.

In another embodiment, a UE is configured with two bandwidths. The first bandwidth derives resource allocation, and the second bandwidth is used to perform a measurement. In one embodiment, the measurement is CSI measurement. In one embodiment, the UE performs a CSI measurement within the second bandwidth. In another embodiment, the second bandwidth is a maximum bandwidth for a numerology configured for the UE.

In one embodiment, the UE is configured with a third bandwidth, which is a total system bandwidth for a cell. In one embodiment, the first bandwidth and the second bandwidth are within the third bandwidth. In an alternate embodiment, the first bandwidth and the second bandwidth overlap each other. In yet another embodiment, the second bandwidth is within the first bandwidth. That is, the second bandwidth is a resource subset of the first bandwidth.

Figure 37:
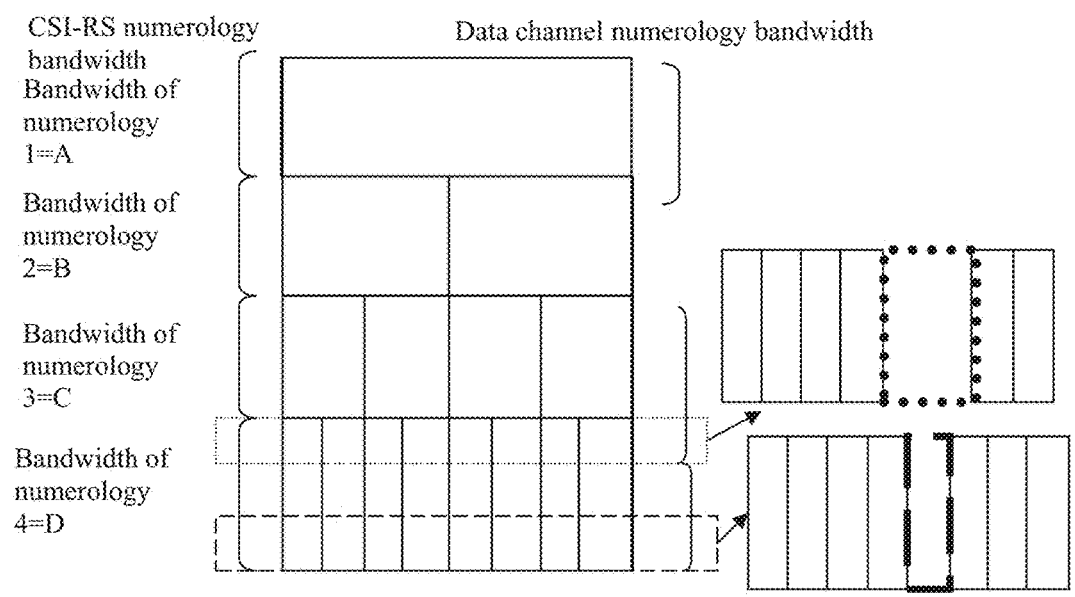
FIG. 37 is an illustration of one exemplary embodiment.

In another embodiment, CSI-RS may be transmitted with multiple nu n ecologies. In one embodiment, the CSI-RS numerology bandwidth follows a configured bandwidth in RRC. In another embodiment, the configured bandwidth in RRC describes the bandwidth locations for some or all of the numerologies. In some frequency resources, the numerology for the reference signal and the data channel are different. In one embodiment, to receive data for a given numerology, different rate-matching behaviors are required for different resources if the reference signal numerology in the different resources are different. FIG. 37 illustrates one example.

Figure 38:
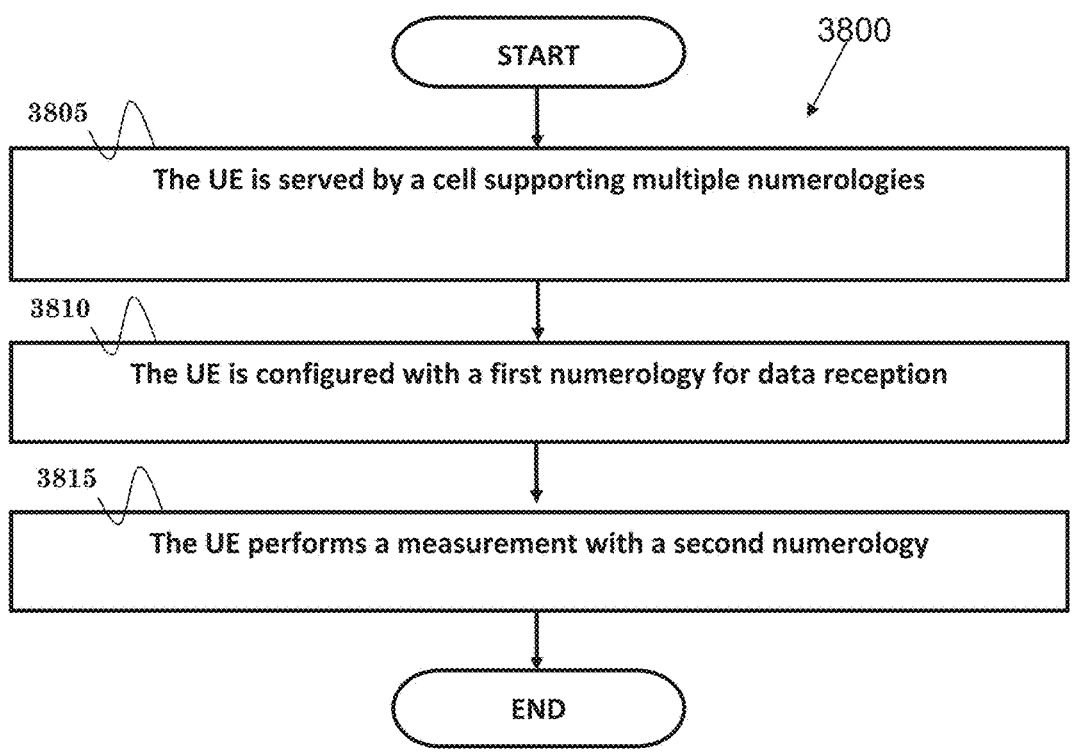
FIG. 38 is a flow diagram for one exemplary embodiment from the perspective of a user equipment (UE).

FIG. 38 is a flow chart 3800 according to one exemplary embodiment from the perspective of a UE. In step 3805, the UE is served by a cell supporting multiple numerologies. In step 3810, the UE is configured with a first numerology for data reception. In step 3815, the UE performs a measurement with a second numerology.

In one embodiment, the first and second numerologies are different. In one embodiment, the second numerology is a predefined numerology. The predefined numerology may be a fixed numerology, default numerology, a numerology used to acquire synchronization, or a numerology the UE uses to receive a synchronization signal.

In one embodiment, the UE performs a measurement of a specific time frequency resource. In one alternative, the specific time frequency is derived from a synchronization signal. Alternatively, the specific time frequency resource is in the same TTI as the synchronization signal. In another alternative, the specific time frequency resource is the time frequency resource synchronization signal transmitted. In yet another alternative, the specific time frequency resource is derived from the system information. Alternatively, the specific time frequency resource is in the same TTI as the system information. Alternatively, the specific time frequency resource is the time frequency resource system information transmitted.

In one embodiment, the system information is a master information block (MIB). Alternatively, the system information is a system information block (SIB).

In the various embodiments, the specific time frequency resource is the time frequency resource used to transmit a physical broadcast channel (PBCH).

In the various embodiments, the UE does not monitor a downlink control channel when the measurement is performed. In another embodiment, the UE is configured with measurement gap for the measurement.

In one embodiment, the measurement is a radio link monitoring (RLM) measurement. Alternatively, the measurement is a radio resource management (RRM) measurement. In another embodiment, the RRM measurement is an intra-frequency RRM measurement.

Figure 39:
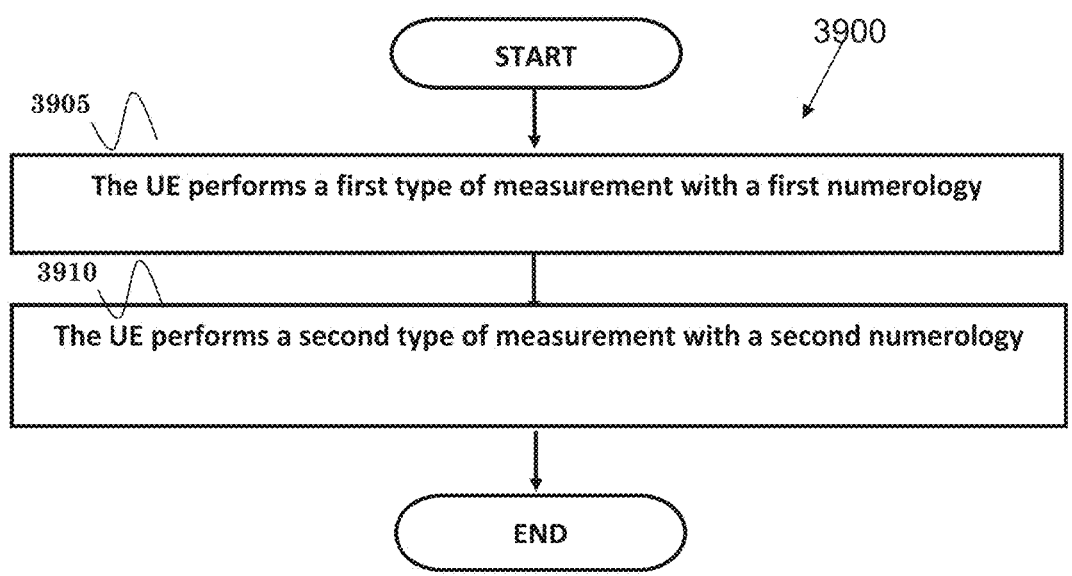
FIG. 39 is a flow diagram for one exemplary embodiment from the perspective of a UE.

FIG. 39 is a flow chart 3900 according to another exemplary embodiment from the perspective of a UE. In step 3905, the UE performs a first type of measurement with a first numerology. In step 3910, the UE performs a second type of measurement with a second numerology.

In one embodiment, the first numerology is a predefined numerology. The predefined numerology is a fixed numerology, default numerology, a numerology used to acquire synchronization, or a numerology the UE uses to receive a synchronization signal.

In one embodiment, the UE performs a measurement of a specific time frequency resource. In one alternative, the specific time frequency is derived from a synchronization signal. Alternatively, the specific time frequency resource is in the same TTI as the synchronization signal. In another alternative, the specific time frequency resource is the time frequency resource synchronization signal transmitted. In yet another alternative, the specific time frequency resource is derived from the system information. Alternatively, the specific time frequency resource is in the same TTI as the system information. Alternatively, the specific time frequency resource is the time frequency resource system information transmitted.

In one embodiment, the system information is a master information block (MIB). Alternatively, the system information is a system information block (SIB).

In various embodiments, the specific time frequency resource is the time frequency resource used to transmit a physical broadcast channel (PBCH).

In various embodiments, the second numerology is a numerology configured for data reception.

In various embodiments, the second type of measurement is performed across the whole system bandwidth of the serving cell. Alternatively, the second type of measurement is performed across a configured bandwidth portion. In one embodiment, a bandwidth of the bandwidth portion is equal to a maximum bandwidth of the second numerology.

In one embodiment, the first type of measurement is a RLM measurement, RRM measurement, or a CSI measurement. In another embodiment, the second type of measurement is a CSI measurement.

In the various embodiments, the first and second numerologies are transmitted on different frequencies. Alternatively, the first and second numerologies are transmitted on different resource blocks.

Figure 40:
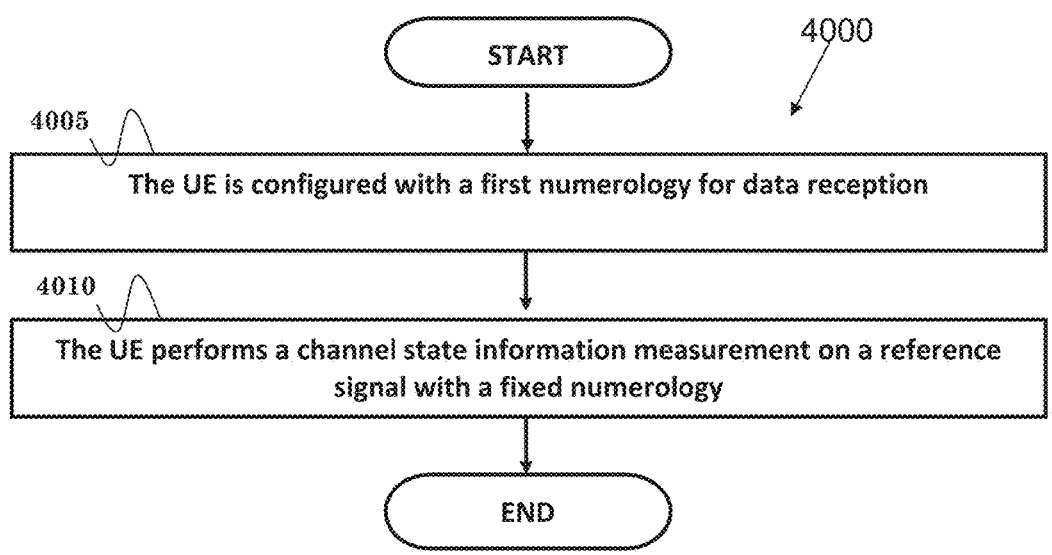
FIG. 40 is a flow diagram for one exemplary embodiment from the perspective of a UE.

FIG. 40 is a flow chart 4000 according to one exemplary embodiment from the perspective of a UE. In step 4005, the UE is configured with a first numerology for data reception.

In step 4010, the UE performs a CSI measurement on a reference signal with a fixed numerology.

In one embodiment, the data channel and the reference signal are transmitted on a same resource block. Alternatively, the data channel and the reference signal are transmitted on different symbols.

In another aspect, one method is directed to transmitting channel and reference signals. In this method, a cell supports multiple numerologies. The cell transmits a first data channel in a first frequency resource with a first numerology. The cell transmits a second data channel in a second frequency resource with a second numerology. The cell transmits a reference signal in the first frequency resource and the second frequency resource with a third numerology.

In one embodiment, the third numerology is the same as the first numerology. Alternatively, the third numerology is the same as the second numerology. In one embodiment, the first numerology is different from the second numerology. In another embodiment, the first numerology, the second numerology, and the third numerology are different.

In various embodiments, the reference signal is for CSI measurement, RLM measurement, or RRM measurement. In one embodiment, the reference signal transmitted across the whole system bandwidth of the cell. In another embodiment, the reference signal is transmitted across a configured bandwidth.

In one embodiment, the first data channel and the second data channel are transmitted to different UEs.

Another method of performing a measurement is disclosed herein. In this method, a UE is served by a cell supporting multiple numerologies. The UE is configured with a first bandwidth for deriving a resource allocation for a first numerology. The UE is configured with a second resource for performing a measurement, wherein the measurement is a CSI measurement.

In another embodiment, the UE is configured with a third bandwidth which is a total system bandwidth for the cell. In one embodiment, the first bandwidth is a maximum bandwidth for the first numerology. In one embodiment, the second bandwidth is smaller than the first bandwidth. In another embodiment, the second bandwidth is a subset of the first bandwidth.

Another method is directed to performing a measurement. In this method, a UE is served by a cell supporting multiple numerologies. The UE is configured with a first numerology for data reception. The UE receives data with a first numerology on a first set of resource blocks and a second set of resource blocks, in which the first set of resource blocks corresponds to the first numerology and the second set of resource blocks corresponds to a second numerology. Additionally, a reference signal in the second resource block is transmitted with the second numerology.

In one alternate embodiment, the measurement is a CSI measurement. In another embodiment, the reference signal transmitted on the first set of resource blocks is transmitted with the first numerology. In yet another method, the UE applies different rate-matching methods for a data channel on the first set of resource blocks and on the second set of resource blocks.

Referring back to FIGS. 3 and 4, in one embodiment, the device 300 includes a program code 312 stored in memory 310. The CPU 308 could execute program code 312 to enable the UE (i) to be served by a cell supporting multiple numerologies; (ii) to be configured with a first numerology for data reception; and (iii) to perform a measurement with a second numerology.

In another embodiment, the CPU 308 could execute program code 312 to enable the UE (i) to perform a first type of measurement with a first numerology; and (ii) to perform a second type of measurement with a second numerology.

In yet another embodiment, the CPU 308 could execute program code 312 to enable the UE (i) to be configured with a first numerology for data reception; and (ii) to perform a CSI measurement on a reference signal with a fixed numerology.

Furthermore, the CPU 308 can execute the program code 312 to perform all of the above-described actions and steps or others methods described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may b practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not he interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for performing a measurement, the method comprising:
   configuring, by a user equipment (UE), a first numerology for data reception, wherein the first numerology corresponds to a first subcarrier spacing; and
   performing, by the UE, a measurement with a second numerology, wherein the measurement is a radio link monitoring (RLM) measurement, a radio resource management (RRM) measurement, or an intra-frequency RRM measurement, and the second numerology corresponds to a second subcarrier spacing and the second numerology is a numerology used to acquire synchronization.

2. The method of claim 1, wherein the UE is served by a cell supporting different numerologies.

3. The method of claim 1, wherein the UE performs the measurement on a specific time frequency resource, wherein the specific time frequency resource is in a same transmission time interval as a synchronization signal.

4. The method of claim 1, wherein data reception is unavailable when the UE performs a measurement on the second numerology.

5. The method of claim 1, wherein the UE does not monitor a downlink control channel when the measurement is performed.

6. The method of claim 1, further comprising:
configuring, by the UE, a measurement gap for the intra-frequency RRM measurement.

7. A method for performing a measurement, the method comprising:
performing, by the UE, a first type of measurement with a first numerology, wherein the first type of measurement is a radio link monitoring (RLM) measurement or a radio resource management (RRM) measurement, and the first numerology corresponds to a first subcarrier spacing; and
performing, by the UE, a second type of measurement with a second numerology, wherein the second type of measurement is a Channel State Information (CSI) measurement, and the second numerology corresponds to a second subcarrier spacing and the second numerology is a numerology used to acquire synchronization.

8. The method of claim 7, wherein the first numerology is a predefined numerology, a fixed numerology, a default numerology, a numerology used to acquire synchronization, or a numerology the UE received synchronization signal.

9. The method of claim 7, wherein the first type of measurement and the second type of measurement are performed on different bandwidth portions.

10. A method of performing a measurement, the method comprising:
configuring, by the UE, a first numerology for data reception, wherein the first numerology corresponds to a first subcarrier spacing; and
performing, by the UE, a channel state information (CSI) measurement on a reference signal with a fixed numerology, wherein the fixed numerology corresponds to a second subcarrier spacing and the fixed numerology is a numerology used to acquire synchronization.

11. The method of claim 10, wherein the data channel and the reference signal are transmitted on a same resource block.

12. The method of claim 10, wherein the data channel and the reference signal are transmitted on different symbols.

13. The method of claim 10, wherein the UE is configured with a first bandwidth for deriving resource allocation for the first numerology.

14. The method of claim 13, wherein the first bandwidth is a maximum bandwidth for the first numerology.

15. The method of claim 10, wherein the UE is configured with a second bandwidth for performing measurement.

16. The method of claim 10, wherein the UE is configured with a third bandwidth which is a system bandwidth of a cell serving the UE.

* * * * *